United States Patent [19]

Nichols et al.

[11] Patent Number: 4,977,582

[45] Date of Patent: Dec. 11, 1990

[54] SYNCHRONIZATION OF NON-CONTINUOUS DIGITAL BIT STREAMS

[75] Inventors: Robert K. Nichols, Glen Ellyn; Bruce R. Zelle, Naperville, both of Ill.

[73] Assignee: AT&T Bell Laboratories, Murray Hill, N.J.

[21] Appl. No.: 175,696

[22] Filed: Mar. 31, 1988

[51] Int. Cl.$^5$ ............................................. H04L 7/06
[52] U.S. Cl. .................................. 375/118; 370/108
[58] Field of Search ............... 375/106, 110, 113, 118, 375/111, 112, 117; 370/108, 100, 102, 105

[56] References Cited

U.S. PATENT DOCUMENTS

| | | | |
|---|---|---|---|
| 4,118,738 | 10/1978 | Arnstein | 375/118 |
| 4,119,796 | 10/1978 | Jones | 375/118 |
| 4,208,724 | 6/1980 | Rattlingourd | 375/118 |
| 4,359,770 | 11/1982 | Suzuka | 370/108 |
| 4,423,493 | 12/1983 | Annecke | 365/233 |
| 4,451,819 | 5/1984 | Beckenhauer | 370/108 |
| 4,451,917 | 5/1984 | DeCoursey | 370/108 |
| 4,481,647 | 11/1984 | Gombert et al. | 375/107 |
| 4,513,427 | 4/1985 | Borriello et al. | 375/110 |
| 4,524,448 | 6/1985 | Hullwegen | 375/118 |
| 4,698,826 | 10/1987 | Denhez et al. | 375/113 |
| 4,718,074 | 1/1988 | Man | 375/118 |

OTHER PUBLICATIONS

A. D. Fergeson et al., "The AT&T Interprocess Message Switch Architecture", *Proceedings of IEEE International Conference on Communications*, Seattle, Wash., 1987.

D. Boettle et al., "High Speed (140 Mbit/s) Switch Techniques for Broadband Communications", *Proceedings of IEEE International Seminar on Digital Communications*, Zurich, Switzerland, Mar. 11–13, 1986, pp. 97–100.

*Primary Examiner*—Benedict V. Safourek
*Assistant Examiner*—Stephen Chin
*Attorney, Agent, or Firm*—Werner Ulrich

[57] ABSTRACT

A high capacity metroplita, area network (MAN) is described. Data traffic from users is connected to data concentrators at the edge of the network, and is transmitted over fiber optic data links to a hub where the data is switched. The hub includes a plurality of data switching modules, each having a control means, and each connected to a distributed control space division switch. Advantageously, the data switching modules, whose inputs are connected to the concentrators, perform all checking and routing functions, while the 1024×1024 maximum size space division switch, whose outputs are connected to the concentrators, provides a large fan-out distribution network for reaching many concentrators from each data switching module. Distributed control of the space division switch permits several million connection and disconnection actions to be performed each second, while the pipelined and parallel operation within the control means permits each of the 256 switching modules to process at least 50,000 transactions per second. The data switching modules chain groups of incoming packets destined for a common outlet of the space division switch so that only one connection in that switch is required for transmitting each group of chained packets from a data switching module to a concentrator. Data streams from different inputs of the space division switch to a concentrator are synchronized to a clock by a circuit that detects the delay between a clock transition and an initial data signal transition and by a circuit for delaying the signal from the space division switch in accordance with the detected delay.

9 Claims, 25 Drawing Sheets

COMPUTER NETWORKING NEEDS

SYNCHRONIZATION OF NON-CONTINUOUS DIGITAL BIT STREAMS

CROSS-REFERENCE TO RELATED APPLICATIONS

This application is related to the applications of:

Jayant G. Hemmady, William P. Lidinsky, Robert K. Nichols, Gaylord W. Richards, Gary A. Roediger, Scott B. Steele, Ronald C. Weddige, and Bruce R. Zelle, Ser. No. 07/175,694, entitled "Architecture And Organization Of A High Performance Metropolitan Area Telecommunications Packet Network";

Gary A. Roediger, Ser. No. 07/175,542, entitled "Architecture Of The Control Of A High Performance Packet Switching Distribution Network";

William P. Lidinsky, Gary A. Roediger, Scott B. Steele, Ronald C. Weddige, and Bruce R. Zelle, Ser. No. 07/175,544, entitled "Identification And Authentication Of End User Systems For Packet Communications Network Services";

Jayant G. Hemmady, William P. Lidinsky, Gary A. Roediger, Scott B. Steele, Ronald C. Weddige, and Bruce R. Zelle, Ser. No. 07/175,546, entitled "Packet Network Architecture For Providing Rapid Response Time";

William P. Lidinsky, Gary A. Roediger, Scott B. Steele, and Ronald C. Weddige, Ser. No. 07/175,693, entitled "User To Network Interface Protocol For Packet Communications Networks";

Scott B. Steele, Ser. No. 07/175,697, entitled "High Bit Rate Telecommunications Packet Network Interface";

Jayant G. Hemmady, Michael J. Knudsen, William P. Lidinsky, Robert K. Nichols, Gaylord W. Richards, Gary A. Roediger, Scott B. Steele, Ronald C. Weddige, and Bruce R. Zelle, Ser. No. 07/175,698, entitled "Arrangement For Switching Concentrated Telecommunications Packet Traffic";

Gaylord W. Richards, Ser. No. 07/175,545, entitled "Distributed Control Rapid Connection Circuit Switch";

Robert K. Nichols and Gary A. Roediger, Ser. No. 07/175,541, entitled "A High Bandwidth Interleaved Buffer Memory and Control";

Jayant G. Hemmady, Michael J. Knudsen, Robert K. Nichols, Gaylord W. Richards, and Gary A. Roediger, Ser. No. 07/175,543, entitled "Control Network For A Rapid Connection Circuit Switch";

William P. Lidinsky, Gary A. Roediger, Scott B. Steele, Ronald C. Weddige, and Bruce R. Zelle, Ser. No. 07/175,548, entitled "Metropolitan Area Network Arrangement For Serving Virtual Data Networks";

Bruce R. Zelle, Ser. No. 07/175,695, entitled "Concurrent Resource Request Resolution Mechanism"; and Jayant G. Hemmady, William P. Lidinsky, Scott B. Steele, Werner Ulrich, and Ronald C. Weddige, Ser. No. 07/175,547, entitled "Integrated Packetized Voice And Data Switching System" which applications are assigned to the assignee of the present application, and are being filed concurrently herewith.

TECHNICAL FIELD

This invention relates to arrangements for synchronizing digital signals.

PROBLEM

Modern data communication systems require that data be communicated in blocks so that the data communication facilities can be efficiently utilized for communicating among a large number of users and data switching nodes. In such systems, the digital data stream on a particular transmission medium is frequently not continuous if different blocks are generated by different sources. Further, it is very difficult to synchronize the data from a plurality of sources as such data is placed onto a transmission medium.

A consequence of this characteristic of data communication systems is that the clock signal underlying the digital signal being transmitted must be recovered for each block. In particular, in very high-speed systems in which the blocks are generated from a number of different sources each using a clock broadcast from a common source, if the sources are spaced even a short distance apart, the phase of the clock at each data source and each data receiver cannot be maintained to be identical. Under such circumstances it is necessary to have an arrangement at each data destination for recovering a clock phase from an input signal without losing any of the data of the input signal of any particular block. In particular, if the blocks are of relatively short duration, such phase recovery must be accomplished within a short time and a small number of bits of data of the data stream that constitutes the block of information. Solutions such as those proposed by D. Boettle et al.: "High Speed (140M Bit/s) Switching Techniques for Broad Band Communications" from the section on "Digital Communications, New Directions in Switching and Networks" published in *Proceedings of 1986 International Seminar on Digital Communications*, Zurich, Mar. 11–13, 1986, pp. 97–100 (published by North-Holland/IEEE, Cat. No. 86CH2277-2), perform the function of deriving phase by varying an inserted delay of up to 1 bit time and searching for the optimum delay on the basis of the received signal. This type of solution requires that a relatively large number of bits of information be received before an optimum delay can be derived from the input signal. A problem of the prior art, therefore, is that there is no satisfactory arrangement for synchronizing, within a small number of initial bits, a received data stream to a clock used for transmitting that data stream.

SOLUTION

The above problem is solved and an advance is made over the prior art in accordance with one embodiment of this invention wherein an incoming signal is passed through a means for sampling this signal many times during one clock phase in order to determine the relative incoming signal clock phase by detecting the time displacement between a clock signal and the time of the transition of a bit in the incoming digital signal. The first bit of a bit stream representing a block of data is always a logical 1 so that a signal transition may be detected on that bit. The incoming facility is constantly being monitored so that the first bit of the data stream representing a block can be captured and the phase of the incoming signal derived therefrom. The phase shift of the incoming signal with respect to the clock is derived from the position in time of the signal transition with respect to a signal transition of the clock. Thereafter, signals are clocked to an output at an appropriate sampling time which is typically one-half of a clock interval delayed from the phase of the initial transition time. Advantageously, this arrangement permits the phase of an incoming signal with respect to a master clock to be detected within the time of the initial bit of a data stream representing a block of data.

In accordance with one embodiment of the invention, the information from the incoming data stream enters a delay line having a delay of at least one clock interval. This delay line is tapped so that the output at each tap is the incoming signal delayed by a fraction of a clock interval. The outputs of each tap are gated to one latch of a first group of latches. The gating signal to this first group used is the inverse of the broadcast clock signal. The outputs of these latches are compared following the arrival of the first 1 of a data block and the latch which has registered the first one, i.e., the optimal latch whose input signal was delayed sufficiently to capture the signal following a transition, is used as an indicator of the optimum tap for sampling incoming signals in order to read the data of the data stream. The outputs of latches of this group are latched during the first bit of a block of data into a selection circuit. Signals of the incoming data stream are also clocked by the broadcast clock from the taps of the delay line into a second group of latches. The identity of the latch in the selection circuit corresponding to the optional latch is used to select a corresponding latch of the second group; the output of the corresponding latch is then used as the received data bit for each broadcast clock interval.

In accordance with one specific embodiment of this invention, the output data stream is connected to a data facility for transmission of data to one or more users. In accordance with normal digital facility transmission practice, this digital facility has a continuous stream of bits arranged so that clock recovery and framing recovery is facilitated at the far end. In order to insert blocked data into this continuous data stream, additional buffering is provided in the detection system in order to permit each block of data to be transmitted at the beginning of a frame. The buffering at the bit recovery system is minimized by the following arrangement. Data can only be inserted into the framed output data stream starting at particular bit times within the frame, these bit times being multiples of 32 bits. The transmitters of the data blocks are arranged to transmit data blocks only at the beginning of the 32 bit intervals of each frame as defined by the frame defining broadcast clock at each transmitter. With this arrangement, the amount of buffering that is required at each detector can be limited to the variation in delay of signal transmission.

Accordingly, in accordance with the principles of this invention, a digital signal synchronized to a clock is derived from an unsynchronized signal by providing means for detecting the phase displacement between a time of transition of the clock and a time of transition of an initial signal of the unsynchronized signal, and, responsive to the detected delay, for delaying the unsynchronized signal to generate the synchronized signal.

GENERAL DESCRIPTION

The Detailed Description of this specification is a description of an exemplary metropolitan area network (MAN) that incorporates the present invention. Such a network as shown in FIGS. 2 and 3 includes an outer ring of network interface modules (NIMs) 2 connected by fiber optic links 3 to a hub 1. The hub interconnects data and voice packets from any of the NIMs to any other NIM. The NIMs, in turn, are connected via interface modules to user devices connected to the network.

The use of a circuit switch, and, in this case, a space division circuit switch 21 for switching data streams creates a problem of synchronizing a data stream received from switch 21. While a master clock is used for all MINTs 11 of hub 1 which is thereby distributed throughout MAN, data streams encounter different delays in going through different paths of circuit switch 21, and must be resynchronized before being transmitted from the hub 1 to a NIM 2. The synchronization is accomplished using the arrangement shown in FIG. 23 and described in section 6.1.

Detailed Description

1 INTRODUCTION

Data networks often are classified by their size and scope of ownership. Local area networks (LANs) are usually owned by a single organization and have a reach of a few kilometers. They interconnect tens to hundreds of terminals, computers, and other end user systems (EUSs). At the other extreme are wide area networks (WANs) spanning continents, owned by common carriers, and interconnecting tens of thousands of EUSs. Between these extremes other data networks have been identified whose scope ranges from a campus to a metropolitan area. The high performance metropolitan area network to be described herein will be referred to as MAN. A table of acronyms and abbreviations is found in Appendix A.

Metropolitan area networks serve a variety of EUSs ranging from simple reporting devices and low intelligence terminals through personal computers to large mainframes and supercomputers. The demands that these EUSs place on a network vary widely. Some may issue messages infrequently while others may issue many messages each second. Some messages may be only a few bytes while others may be files of millions of bytes. Some EUSs may require delivery any time within the next few hours while others may require delivery within microseconds.

This invention of a metropolitan area network is a computer and telephone communications network that has been designed for transmitting broadband low latency data which retains and indeed exceeds the performance characteristics of the highest performance local area networks. A metropolitan area network has size characteristics similar to those of a class 5 or end-office telephone central office; consequently, with respect to size, a metropolitan area network can be thought of as an end-office for data. The exemplary embodiment of the invention, hereinafter called MAN, was designed with this in mind. However, MAN also fits well either as an adjunct to or as part of a switch module for an end-office, thus supporting broadband Integrated Services Digital Network (ISDN) services. MAN can also be effective as either a local area or campus area network. It is able to grow gracefully from a small LAN through campus sized networks to a full MAN.

Figure 1:
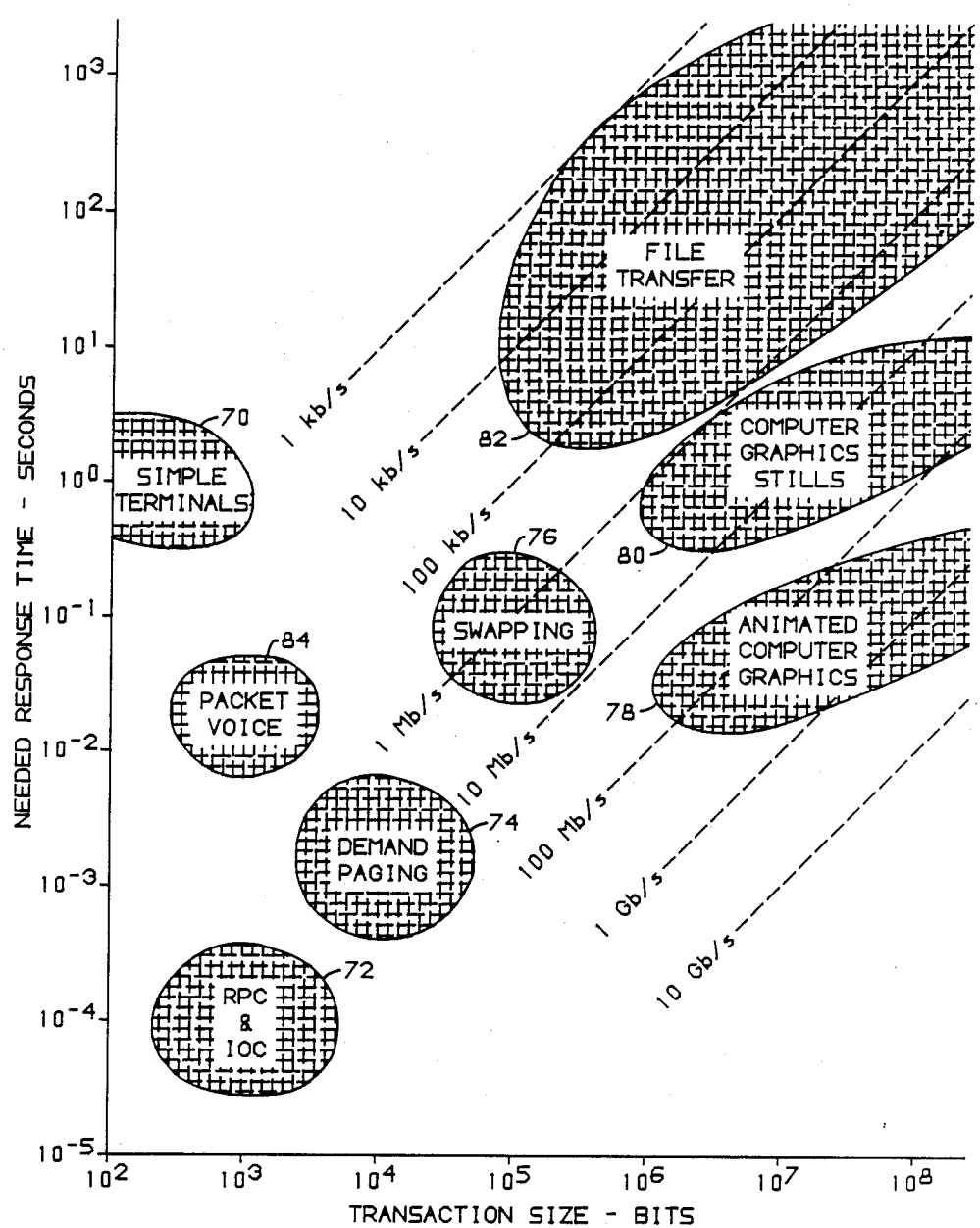
FIG. 1 is a graphic representation of the characteristics of the type of communications traffic in a metropolitan area network.

The rapid proliferation of workstations and their servers, and the growth of distributed computing are major factors that motivated the design of this invention. MAN was designed to provide networking for tens of thousands of diskless workstations and servers and other computers over tens of kilometers, where each user has tens to hundreds of simultaneous and different associations with other computers on the network. Each networked computer can concurrently generate tens to hundreds of messages per second, and require I/O rates of tens to hundreds of millions of bits/second (M bps). Message sizes may range from hundreds of bits to millions of bits. With this level of performance, MAN is capable of supporting remote procedure calls, interobject communications, remote demand paging, remote swapping, file transfer, and computer graphics. The goal is to move most messages (or transactions as they will be referred to henceforth) from an EUS memory to another EUS memory within less than a millisecond for small transactions and within a few milliseconds for large transactions. FIG. 1 classifies transaction types and show desired EUS response times as a function of both transaction type and size, simple (i.e., low intelligence) terminals 70, remote procedure calls (RPCs) and interobject communications (IOCs) 72, demand paging 74, memory swapping 76, animated computer graphics 78, computer graphics still pictures 80, file transfers 82, and packetized voice 84. Meeting the response time/transaction speeds of FIG. 1 represents part of the goals of the MAN network. As a calibration, lines of constant bit rate are shown where the bit rate is likely to dominate the response time. MAN has an aggregate bit rate of 150 gigabits per second and can handle 20 million network transactions per second with the exemplary choice of the processor elements shown in FIG. 14. Furthermore, it has been designed to handle traffic overloads gracefully.

MAN is a network which performs switching and routing as many systems do, but also addresses a myriad of other necessary functions such as error handling, user interfacing, and the like. Significant privacy and security features in MAN are provided by an authentication capability. This capability prevents unauthorized network use, enables usage-sensitive billing, and provides non-forgeable source identification for all information. Capability also exists for defining virtual private networks.

MAN is a transaction-oriented (i.e., connectionless) network. It does not need to incur the overhead of establishing or maintaining connections although a connection veneer can be added in a straightforward fashion if desired.

MAN can also be used for switching packetized voice. Because of the short delay in traversing the network, the priority which may be given to the transmission of single packet entities, and the low variation of delay when the network is not heavily loaded, voice or a mixture of voice and data can be readily supported by MAN. For clarity, the term data as used hereinafter includes digital data representing voice signals, as well as digital data representing commands, numerical data, graphics, programs, data files and other contents of memory.

MAN, though not yet completely built, has been extensively simulated. Many of the capacity estimates presented hereinafter are based on these simulations.

2 ARCHITECTURE AND OPERATION

2.1 Architecture

Figure 2:
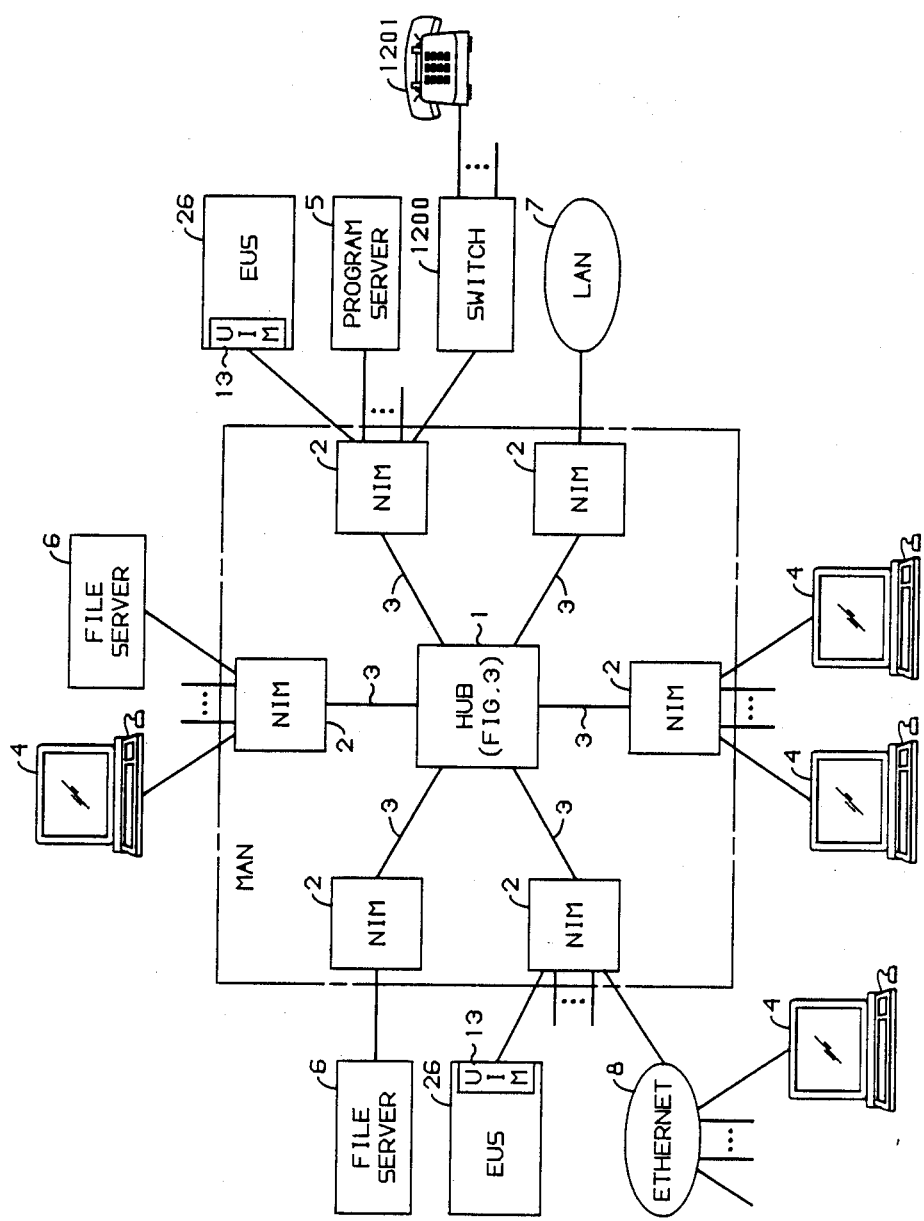
FIG. 2 is a high level block diagram of an exemplary metropolitan area network (referred to herein as MAN) including typical input user stations that communicate via such a network.

The MAN network is a hierarchical star architecture with two or three levels depending upon how closely one looks at the topology. FIG. 2 shows the network as consisting of a switching center called a hub 1 linked to network interface modules 2 (NIMs) at the edge of the network.

The hub is a very high performance transaction store-and-forward system that gracefully grows from a small four link system to something very large that is capable of handling over 20 million network transactions per second and that has an aggregate bit rate of 150 gigabits per second.

Radiating out from the hub for distances of up to tens of kilometers are optical fibers (or alternative data channels) called external links (XLs) (connect NIM to MINT), each capable of handling full duplex bit rates on the order of 150 megabits per second. An XL terminates in a NIM.

A NIM, the outer edge of which delineates the edge of the network, acts as a concentrator/demultiplexer and also identifies network ports. It concentrates when moving information into the network and demultiplexes when moving information out of the network. Its purpose in concentrating/demultiplexing is to interface multiple end user systems 26 (EUSs) to the network in such a way as to use the link efficiently and cost effectively. Up to 20 EUSs 26 can be supported by each NIM depending upon the EUSs networking needs. Examples of such EUSs are the increasingly common advanced function workstations 4 where the burst rates are already in the 10M bps range (with the expectation that much faster systems will soon be available) with average rates orders of magnitude lower. If the EUS needs an average rate that is closer to its burst rate and the average rates are of the same order of magnitude as that of a NIM, then a NIM can either provide multiple interfaces to a single EUS 26 or can provide a single interface with the entire NIM and XL dedicated to that EUS. Examples of EUSs of this type include large mainframes 5 and file servers 6 for the above workstations, local area networks such as ETHERNET® 8 and high performance local area networks 7 such as Proteon® 80, an 80M bit token ring manufactured by Proteon Corp., or a system using a fiber distributed data interface (FDDI), an evolving American National Standards Institute (ANSI) standard protocol ring interface. In the latter two cases, the LAN itself may do the concentration and the NIM then degenerates to a single port network interface module. Lower performance local area networks such as ETHERNET 8 and IBM token rings may not need all of the capability that an entire NIM provides. In these cases, the LAN, even though it concentrates, may connect to a port 8 on a multiport NIM.

Within each EUS there is a user interface module (UIM) 13. This unit serves as a high bit rate direct memory access port for the EUS and as a buffer for transactions received from the network. It also off-loads the EUS from MAN interface protocol concerns. Closely associated with the UIM is the MAN EUS-resident driver. It works with the UIM to format outgoing transactions, receive incoming transactions, implement protocols, and interface with the EUSs operating system.

A closer inspection (see FIG. 3) of the hub reveals two different functional units—a MAN switch (MANs) 10 and one or more memory interface modules 11 (MINTs). Each MINT is connected to up to four NIMs via XLs 3 and thus can accommodate up to 80 EUSs. The choice of four NIMs per MINT is based upon a number of factors including transaction handling capacity, buffer memory size within the MINT, growability of the network, failure group size, and aggregate bit rate.

Figure 3:
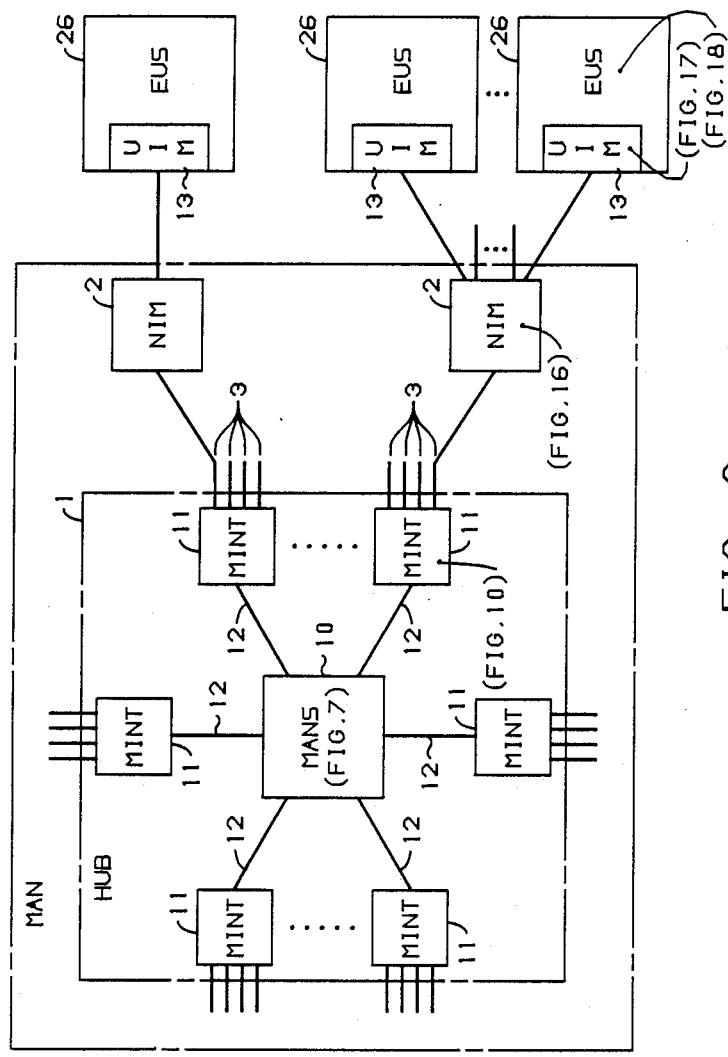
FIG. 3 is a more detailed block diagram of the hub of MAN and the units communicating with that hub.

Each MINT is connected to the MANS by four internal links 12 (ILs) (connect MINT and MAN switch), one of which is shown for each of the MINTs in FIG. 3. The reason for four links in this case is different than it is for the XLs. Here multiple links are necessary because the MINT will normally be sending information through the MANS to multiple destinations concurrently; a single IL would present a bottleneck. The choice of 4 ILs (as well as many other design choices of a similar nature) was made on the basis of extensive analytical and simulation modeling. The ILs run at the same bit rate as the external links but are very short since the entire hub is colocated.

The smallest hub consists of one MINT with the ILs looped back and no switch. A network based upon this hub includes up to four NIMs and accommodate up to 80 EUSs. The largest hub that is currently envisioned consists of 256 MINTs and a 1024×1024 MANS. This hub accommodates 1024 NIMs and up to 20,000 EUSs. By adding MINTs and growing the MANS, the hub and ultimately the entire network grows very gracefully.

2.1.1 LUWUs, Packets, SUWUs, and Transactions

Before going further several terms need to be discussed. EUS transactions are transfers of units of EUS information that are meaningful to the EUS. Such transactions might be a remote procedure call consisting of a few bytes or the transfer of a 10 megabyte database. MAN recognizes two EUS transaction unit sizes that are called long user work unit (LUWUs) and short user work units (SUWUs) for the purposes of this description. While the delimiting size is easily engineerable, usually transaction units of a couple of thousand bits or less are considered SUWUs while larger transaction units are LUWUs. Packets are given priority within the network to reduce response time based upon criteria shown in FIG. 1 where it can be seen that the smaller EUS transaction units usually need faster EUS transaction response times. Packets are kept intact as a single frame or packet as they move through the network. LUWUs are fragmented into frames or packets, called packets hereinafter, by the transmitting UIM. Packets and SUWUs are sometimes collectively referred to as network transaction units.

Transfers through the MAN switch are referred to as switch transactions and the units transferred through the MANS are switch transaction units. They are composed of one or more network transaction units destined for the same NIM.

2.2 Functional Unit Overview

Figure 4:
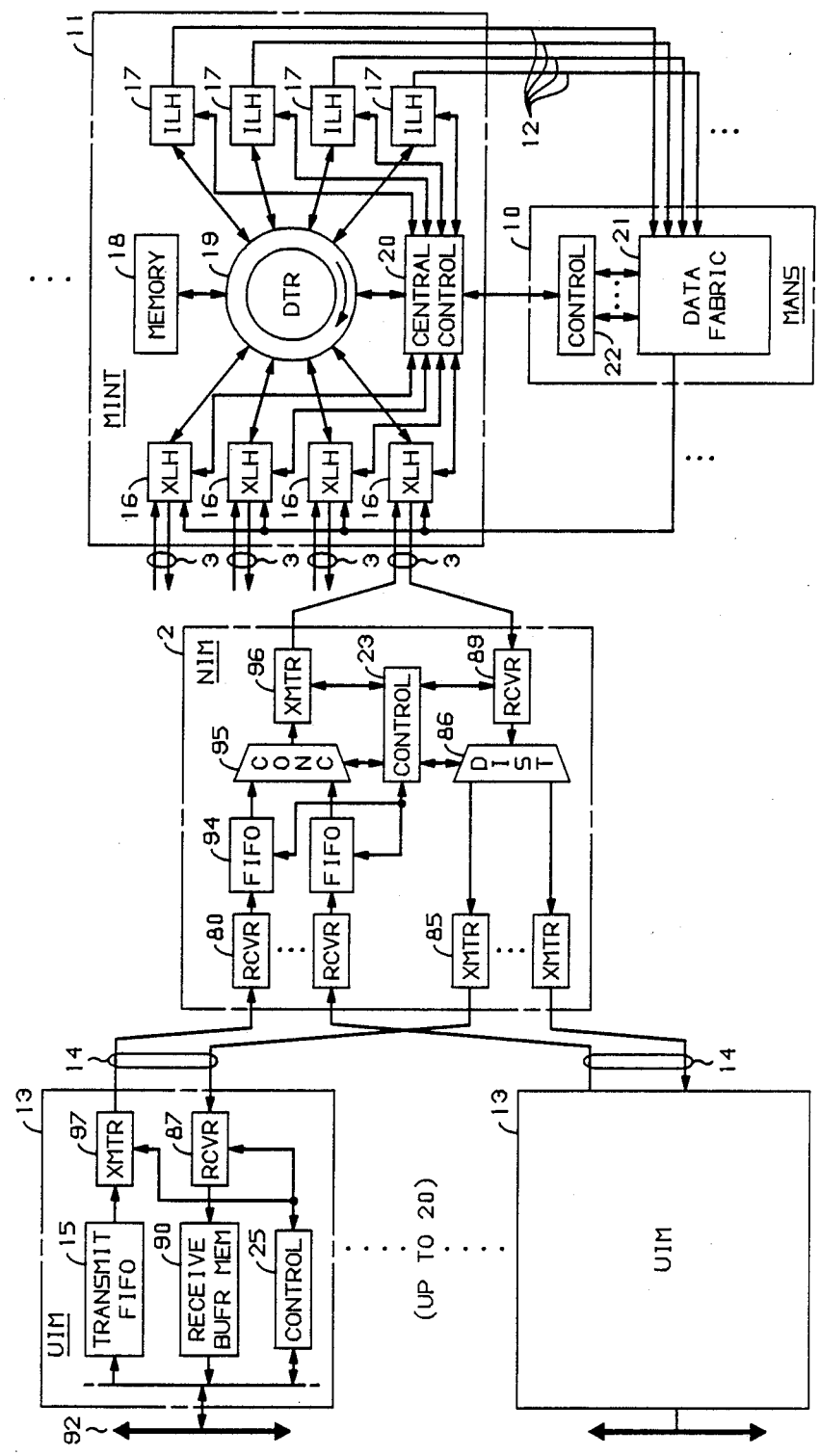
FIGS. 4 and 5 are block diagrams of MAN illustrating how data flows from input user systems to the hub of MAN and back to output user systems.

Prior to discussing the operation of MAN, it is useful to provide a brief overview of each major functional unit within the network. The units described are the UIM 13, NIM 2, MINT 11, MANS 10, end user system link (connects NIM and UIM) (EUSL) 14, XL 3, and IL 12 respectively. These units are depicted in FIG. 4.

2.2.1 User Interface Module—UIM 13

This module is located within the EUS and often plugs onto an EUS backplane such as a VME® bus (an IEEE standard bus), an Intel MULTIBUS II®, mainframe I/O channel. It is designed to fit on one printed circuit board for most applications. The UIM 13 connects to the NIM 2 over a duplex optical fiber link called the EUS link 14 (EUSL), driven by optical transmitter 97 and 85. This link runs at the same speed as the external link (XL) 3. The UIM has a memory queue 15 used to store information on its way to the network. Packets and SUWUs are stored and forwarded to the NIM using out-of-band flow control.

By way of contrast, a receive buffer memory 90 must exist to receive information from the network. In this case entire EUS transactions may sometimes be stored until they can be transferred into End User System memory. The receive buffer must be capable of dynamic buffer chaining. Partial EUS transactions may arrive concurrently in an interleaved fashion.

Figure 19:
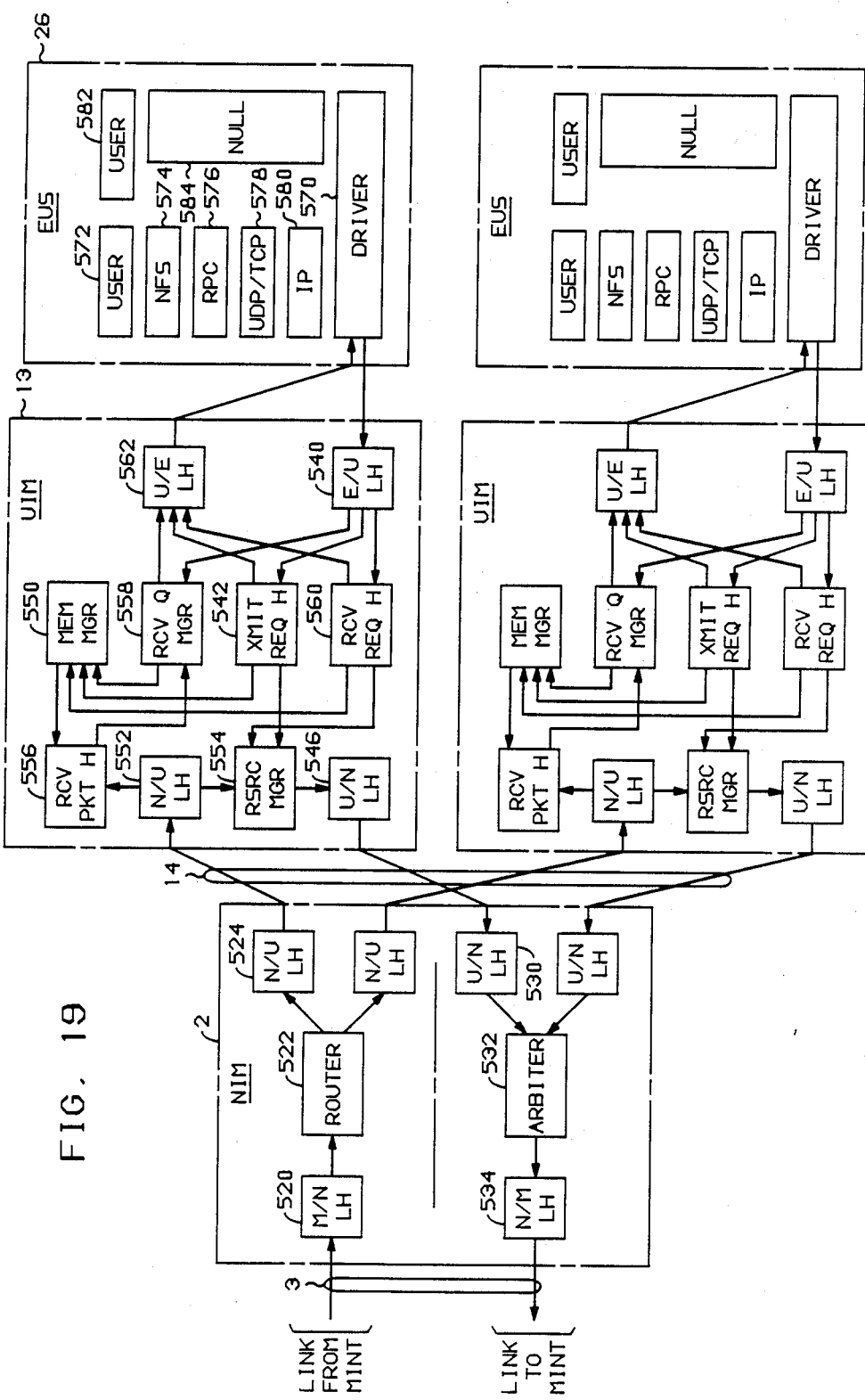
FIG. 19 is a block diagram of a control arrangement for interfacing between an end user system and the hub of MAN.

Optical Receiver 87 receives signals from optical link 14 for storage in receive buffer memory 90. Control 25 controls UIM 13, and controls exchange of data between transmit first-in-first-out (FIFO) queue 15 or receive buffer memory 90 and a bus interface for interfacing with bus 92 which connects to end user system 26. The details of the control of UIM 13 are shown in FIG. 19.

2.2.2 Network Interface Module—NIM 2

A NIM 2 is the part of MAN that is at the edge of the network. A NIM performs six functions: (1) concentration/demultiplexing including queuing of packets and SUWUs moving toward the MINT and external link arbitration, (2) participation in network security using port identification, (3) participation in congestion control, (4) EUS-to-network control message identification, (5) participation in error handling, and (6) network interfacing. Small queues 94 in memory similar to those found in the UIM exist for each End User System. They receive information from the UIM via link 14 and receiver 88 and store it until XL 3 is available for transmission to the MINT. The outputs of these queues drive a data concentrator 95 which in turn drives an optical transmitter 96. An external link demand muliplexer exists which services demands for the use of the XL. The NIM prefixes a port identification number 600 (FIG. 20) to each network transaction unit flowing toward the MINT. This is used in various ways to provide value added services such as reliable and non-fraudulent sender identification and billing. This prefix is particularly desirable for ensuring that members of a virtual network are protected from unauthorized access by outsiders. A check sequence is processed for error control. The NIM, working with the hub 1, determines congestion status within the network and controls flow from the UIMs under high congestion conditions. The NIM also provides a standard physical and logical interface to the network including flow control mechanisms.

Information flowing from the network to the EUS is passed through the NIM via receiver 89, distributed to the correct UIM by data distributor 86, and sent to destination UIM 13 by transmitter 85 via link 14. No buffering is done at the NIM.

There are only two types of NIMs. One type (such as shown in FIG. 4 and the upper right of FIG. 3) concentrates while the other type (shown at the lower right of FIG. 3) does not.

2.2.3 Memory and Interface Module—MINT 11

MINTs are located in the hub. Each MINT 11 consists of: (a) up to four external link handlers 16 (XLHs) that terminate XLs and also receive signals from the half of the internal link that moves data from the switch 10 to the MINT; (b) four internal link handlers 17 (ILHs) that generate data for the half of the IL that moves data from a MINT to the switch; (c) a memory 18 for storing data while awaiting a path from the MINT through the switch to the destination NIM; (d) a Data Transport Ring 19 that moves data between the link handlers and the memory and also carries MINT control information; and (e) a control unit 20.

All functional units within the MINT are designed to accommodate the peak aggregate bit rate for data moving concurrently into and out of the MINT. Thus the ring, which is synchronous, has a set of reserved slots for moving information from each XLH to memory and another set of reserved slots for moving information from memory to each ILH. It has a read plus write bit rate of over 1.5G bps. The memory is 512 bits wide so that an adequate memory bit rate can be achieved with components having reasonable access times. The size of the memory (16M bytes) can be kept small because the occupancy time of information in the memory is also small (about 0.57 milliseconds under full network load). However, this is an engineerable number that can be adjusted if necessary.

The XLHs are bi-directional but not symmetric. Information moving from NIM to MINT is stored in MINT memory. Header information is copied by the XLH and sent to the MINT control for processing. In contrast, information moving from the switch 10 toward a NIM is not stored in the MINT but simply passes through the MINT, without being processed, on its way from MANS 10 output to a destination NIM 2. Due to variable path lengths in the switch, the information leaving the MANS 10 is out of phase with respect to the XL. A phase alignment and scrambler circuit (described in section 6.1) must align the data before transmission to the NIM can occur. Section 4.6 describes the internal link handler (ILH).

The MINT performs a variety of functions including (1) some of the overall routing within the network, (2) participation in user validation, (3) participation in network security, (4) queue management, (5) buffering of network transactions, (6) address translation, (7) participation in congestion control, and (8) the generation of operation, administration, and maintenance (OA&M) primitives.

The control for the MINT is a data flow processing system tailored to the MINT control algorithms. Each MINT is capable of processing up to 80,000 network transactions per second. A fully provisioned hub with 250 MINTs can therefore process 20 million network transactions per second. This is discussed further in section 2.3.

2.2.4 MAN Switch—MANS 10

The MANS consists of two main parts (a) the fabric 21 through which information passes and (b) the control 22 for that fabric. The control allows the switch to be set up in about 50 microseconds. Special properties of the fabric allow the control to be decomposed into completely independent sub-controllers that can operate in parallel. Additionally, each sub-controller can be pipelined. Thus, not only is the setup time very fast but many paths can be set up concurrently and the "setup througput" can be made high enough to accommodate high request rates from large numbers of MINTs. MANs can be made in various sizes ranging from $16 \times 16$ (handing four MINTs) to $1024 \times 1024$ (handling 256 MINTs).

2.2.5 End User System Link—EUSL 14

The end user system link 14 connects the NIM 2 to the UIM 13 that resides within the end user's equipment. It is a full duplex optical fiber link that runs at the same rate and in synchronism with the eternal link on the other side of the NIM. It is dedicated to the EUS to which it is connected. The length of the EUSL is intended to be on the order of meters to 10s of meters. However, there is no reason why it couldn't be longer if economics allow it.

The basic format and data rate for the EUSL for the present embodiment of the invention was chosen to be the same as that of the Metrobus Lightwave System OS-1 link. Whatever link layer data transmission standard is eventually adopted would be used in later embodiments of MAN.

2.2.6 External Links—XL 3

The external link (XL) 3 connects the NIM to the MINT. It is also a full duplex synchronous optical fiber link. It is used in a demand multiplexed fashion by the end user systems connected to its NIM. The length of the XL is intended to be on the order of 10s of kilometers. Demand multiplexing is used for economic reasons. It employs the Metrobus OS-1 format and data rate.

2.2.7 Internal Links—IL 24

The internal link 24 provides connectivity between a MINT and the MAN switch. It is a unidirectional semi-synchronous link that retains frequency but loses the synchronous phase relationship as it passes through the MANS 10. The length of the IL 24 is on the order of 5 meters but could be much longer if economics allowed. The bit rate of the IL is the same as that of OS-1. The format, however, has only limited similarity to OS-1 because of the need to resynchronize the data.

2.3 Software Overview

Using a workstation/server paradigm, each end user system connected to MAN is able to generate over 50 EUS transactions per second consisting of LUWUs and SUWUs. This translates into about 400 network transactions per second (packets and SUWUs). With up to 20 EUS per NIM, each NIM must be capable of handling up to 8000 network transactions per second with each MINT handling up to four times this amount or 32000 network transactions per second. These are average or sustained rates. Burst conditions may substantially increase "instantaneous" rates for a single EUS 26. Averaging over a number of EUSs will, however, smooth out individual EUS bursts. Thus while each NIM port must deal with bursts of considerably more than 50 network transactions per second, NIMs (2) and XLs (3) are likely to see only moderate bursts. This is even more true of MINTs 11, each of which serves 4 NIMs. The MAN switch 10 must pass an average of 8 million network transactions per second, but the switch controller does not need to process this many switch requests since the design of the MINT control allows multiple packets and SUWUs going to the same destination NIM to be switched with a single switch setup.

A second factor to be considered is network transaction interarrival time. With rates of 150M bps and the smallest network transaction being an SUWU of 1000 bits, two SUWUs could arrive at a NIM or MINT 6.67 microseconds apart. NIMs and MINTs must be able to handle several back-to-back SUWUs on a transient basis.

The control software in the NIMs and especially the MINTs must deal with this severe real-time transaction processing. The asymmetry and bursty nature of data traffic requires a design capable of processing peak loads for short periods of time. Thus the transaction control software structure must be capable of executing many hundreds of millions of CPU instructions per second (100's of MIPs). Moreover, in MAN, this control software performs a multiplicity of functions including routing of packets and SUWUs, network port identification, queuing of network transactions destined for the same NIM over up to 1000 NIMs (this means real time maintenance of up to 1000 queues), handling of MANS requests and acknowledgements, flow control of sources EUSs based on complex criteria, network traffic data collection, congestion control, and a myriad of other tasks.

Figure 5:
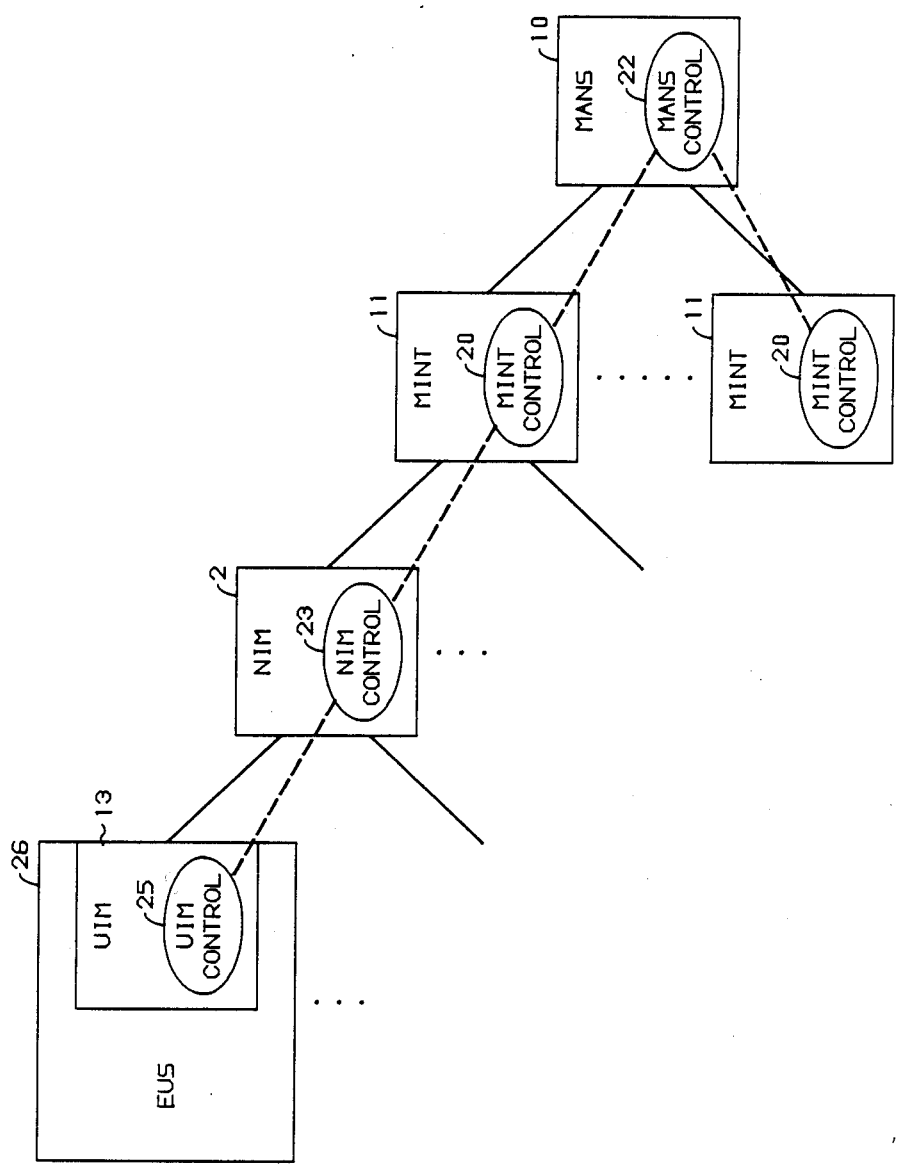

The MAN control software is capable of performing all of the above tasks in real time. The control software is executed in three major components: NIM control 23, MINT control 20, and MANS control 22. Associated with these three control components is a fourth control structure 25 within the UIM 13 of the End User System 26. FIG. 5 shows this arrangement. Each NIM and MINT has its own control unit. The control units function independently but cooperate closely. This partitioning of control is one of the architectural mechanisms that makes possible MAN's real-time transaction processing capability. The other mechanism that allows MAN to handle high transaction rates is the technique of decomposing the control into a logical array of subfunctions and independently applying processing power to each subfunction. This approach has been greatly facilitated by the use of Transputer ® very large scale integration (VLSI) processor devices made by INMOS Corp. The technique basically is as follows:

Decompose the problem into a number of subfunctions.

Arrange the subfunctions to form a dataflow structure.

Implement each subfunction as one or more processes.

Bind sets of processes to processors, arranging the bound processors in the same topology as the dataflow structure so as to form a dataflow system that will execute the function.

Iterate as necessary to achieve the real-time performance required.

Brief descriptions of the functions performed by the NIM, MINT, and MANS (most of which are done by the software control for those modules) are given in sections 2.2.2 through 2.2.4. Additional information is given in section 2.4. Detailed descriptions are included later in this description within specific sections covering these subsystems.

2.3.1 Control Processors

The processors chosen for the system implementation are Transputers from INMOS Corp. These 10 million instructions/second (MIP) reduced instruction set control (RISC) machines are designed to be connected in an arbitrary topology over 20M bps serial links. Each machine has four links with an input and output path capable of simultaneous direct memory access (DMA).

2.3.2 MINT Control Performance

Because of the need to process a large number of transactions per second, the processing of each transaction is broken into serial sections which form a pipeline. Transactions are fed into this pipeline where they are processed simultaneously with other transactions at more advanced stages within the pipe. In addition, there are multiple parallel pipelines each handling unique processing streams simultaneously. Thus, the required high transaction processing rate, where each transaction requires routing and other complex servicing, is achieved by breaking the control structure into such a parallel/pipelined fabric of interconnected processors.

A constraint on MINT control is that any serial processing can take no longer than 1/(number of transactions per second processed in this pipeline).

A further constraint concerns the burst bandwidth for headers entering the control within an XLH 16. If the time between successive network units arriving at the XLH is less than (header size)/(bandwidth into control)

then the XLH must buffer headers. The maximum number of transactions per second assuming uniform arrival is given by:

(bandwidth into control)/(size of transaction header).

An example based upon the effective bit rate of transputer links and the 40 byte MAN network transaction header is:

(8.0M b/s for control link)/(320 bit header/transaction) = 25,000 transactions/sec. per XLH, or one transaction per XLH every 40 microseconds. Because transaction interarrival times can be less than this, header buffering is performed in the XLH.

The MINT must be capable, within this time, of routing, executing billing primitives, making switch requests, performing network control, memory management, operation, administration, and maintenance activities, name serving, and also providing other network services such as yellow page primitives. The parallel/pipelined nature of MINT control 20 achieves these goals.

As an example, the allocating and freeing of high-speed memory blocks can be processed completely independently of routing or billing primitives. Transaction flow within a MINT is controlled in a single pipe by the management of the memory block address used for storing a network transaction unit (i.e. packet or SUWU). At the first stage of the pipe, memory management allocates free blocks of high-speed MINT memory. Then, at the next stage, these blocks are paired with the headers and routing translation is done. Then switch units are collected based on memory blocks sent to common NIMs, and to close the loop the memory blocks are freed after the blocks' data is transmitted into the MANS. Billing primitives are simultaneously handled within a different pipe.

2.4 MAN Operation

The EUS 26 is viewed by the network as a user with capabilities granted by a network administration. This is analogous to a terminal user logged into a time-sharing system. The user, such as a workstation or a front end processor acting as a concentrator for stations or even networks, will be required to make a physical connection at a NIM port and then identify itself via its MAN name, virtual network identification, and password security. The network adjusts routing tables to map data destined for this name to a unique NIM port. The capabilities of this user are associated with the physical port. The example just given accommodates the paradigm of a portable workstation. Ports may also be configured to have fixed capabilities and possibly be "owned" by one MAN named end user. This gives users dedicated network ports or provides priviledged administrative maintenance ports. The source EUS refer to the destination by MAN names or services, so they are not required to know anything about the dynamic network topology.

The high bit rate and large transaction processing capability internal to the network yield very short response times and provide the EUS with a means to move data in a metropolitan area without undue network considerations. A MAN end user will see EUS-memory-to-EUS memory response times as low as a millisecond, low error rates, and the ability to send a hundred EUS transactions per second on a sustained basis. This number can expand to several thousand for high performance EUSs. The EUS will send data in whatever size is appropriate to his needs with no maximum upper bound. Most of the limitations on optimizing MAN performance are imposed by the limits of the EUS and applications, not the overhead of the network. The user will supply the following information on transmitting data to the UIM:

A MAN name and virtual network name for the destination address that is independent of the physical address.

The size of the data.

A MAN type field denoting network service required.

The data.

Network transactions (packets and SUWUs) move along the following logical path (see FIG. 5):

sourceUIM→sourceNIM→MINT→MANS→destinationNIM(via MINT)→destinationUIM.

Each EUS transaction (i.e., LUWU or SUWU) is submitted to its UIM. Inside the UIM, a LUWU is further fragmented into variable size packets. An SUWU is not fragmented but is logically viewed in its entirety as a network transaction. However, the determination that a network transaction is an SUWU is not made until the SUWU reaches the MINT where the information is used in dynamically categorizing data into SUWUs and packets for optimal network handling. The NIM checks incoming packets from the EUS to verify that they do not violate a maximum packet size. The UIM may pick packet sizes smaller than the maximum depending on EUS stated service. For optimum MINT memory utilization, the packet size is the standard maximum. However under some circumstances, the application may request that a smaller packet size be used because of end user consideration such as timing problems or data availability timing. Additionally, there may be timing limits where the UIM will send what it currently has from the EUS. Even where the maximum size packet is used, the last packet of a LUWU usually is smaller than the maximum size packet.

At the transmitting UIM each network transaction (packet or SUWU) is prefixed with a fixed length MAN network header. It is the information within this header which the MAN network software uses to route, bill, offer network services, and provide network control. The destination UIM also uses the information within this header in its job of delivering EUS transactions to the end user. The network transactions are stored in the UIM source transaction queue from which they are transmitted to the source NIM.

Upon receiving network transactions from UIMs, the NIM receives them in queues permanently dedicated to the EUSLs on which the transaction arrived, for forwarding to the MINT 11 as soon as the link 3 becomes available. The control software within the NIM processes the UIM to NIM protocol to identify control messages and prepends a source port number to the transaction that will be used by the MINT to authenticate the transaction. End-user data will never be touched by MAN network software unless the data is addressed to the network as control information provided by the end user. As the transactions are processed, the source NIM concentrates them onto the external link between the source NIM and its MINT. The source NIM to MINT links terminate at a hardware interface in the MINT (the external link handler or XLH 16).

The external link protocol between the NIM and MINT allows the XLH 16 to detect the beginning and end of network transactions. The transactions are immediately moved into a memory 18 designed to handle the 150M b/s bursts of data arriving at the XLH. This memory access is via a high-speed time slotted ring 19 which guarantees each 150M b/s XLH input and each 150M b/s output from the MINT (i.e. MANS inputs) bandwidth with no contention. For example, a MINT which concentrates 4 remote NIMs and has 4 input ports to the center switch must have a burst access bandwidth of at least 1.2G b/s. The memory storage is used in fixed length blocks of a size equal to the maximum packet size plus the fixed length MAN header. The XLH moves an address of a fixed size memory block followed by the packet or SUWU data to the memory access ring. The data and network header are stored until the MINT control 20 causes its transmission into the MANS. The MINT control 20 will continually supply the XLHs with free memory block addresses for storing the incoming packets and SUWUs. The XLH also "knows" the length of the fixed size network header. With this information the XLH passes a copy of the network header to MINT control 20. MINT control 20 pairs the header with the block address it had given the XLH for storing the packet or SUWU. Since the header is the only internal representation of the data within MINT control it is vital that it be correct. To ensure sanity due to potential link errors the header has a cyclic redundancy check (CRC) of its own. The path this tuple takes within MINT control must be the same for all packets of any given LUWU (this allows ordering of LUWU data to be preserved). Packet and SUWU headers paired with the MINT memory block address will move through a pipeline of processors. The pipeline allows multiple CPUs to process different network transactions at various stages of MINT processing. In addition, there are multiple pipelines to provide concurrent processing.

MINT control 20 selects an unused internal link 24 and requests a path setup from the IL to the destination NIM (through the MINT attached to that NIM). MAN switch control 21 queues the request and when, the path is available and (2) the XL 3 to the destination NIM is also available, it notifies the source MINT while concurrently setting up the path. This, on average and under full load, takes 50 microseconds. Upon notification, the source MINT transmits all network transactions destined for that NIM, thus taking maximum advantage of the path setup. The internal link handler 17 requests network transactions from the MINT memory and transmits them over the path:

ILH→sourceIL→MANS→destinationIL→XLH, this XLH being attached to the destination NIM. The XLH recovers bit synchronization on the way to the destination NIM. Note that information, as it leaves the switch, simply passes through a MINT on its way to the destination NIM. The MINT doesn't process it in any way other than to recover bit synchronization that has been lost in going through the MANS.

As information (i.e., switch transactions made up of one or more network transactions) arrives at the destination NIM it is demultiplexed into network transactions (packets and SUWUs) and forwarded to the destination UIMs. This is done "on the fly"; there is no buffering in the NIM on the way out of the network.

The receiving UIM 13 will store the network transactions in its receive buffer memory 90 and recreate EUS transactions (LUWUs and SUWUs). A LUWU may arrive at the UIM in packet sized pieces. As soon as at least part of a LUWU arrives, the UIM will notify the EUS of its existence and will, upon instructions from the EUS, transmit under the control of its DMA, partial EUS or whole EUS transactions into the EUS memory in DMA transfer sizes specified by the EUS. Alternate paradigms exist for transfer from UIM to EUS. For instance, an EUS can tell the UIM ahead of time that whenever anything arrives the UIM should transfer it to a specified buffer in EUS memory. The UIM would then not need to announce the arrival of information but would immediately transfer it to the EUS.

2.5 Additional Considerations 2.5.1 Error Handling

In order to achieve latencies in the order of hundreds of microseconds from EUS memory to EUS memory, errors must be handled in a manner that differs from that used by conventional data networks today. In MAN, network transactions have a header check sequence 626 (FIG. 20) (HCS) appended to the header and a data check sequence 646 (FIG. 20) (DCS) appended to the entire network transaction.

Consider the header first. The source UIM generates a HCS before transmission to the source NIM. At the MINT the HCS is checked and, if in error, the transaction is discarded. The destination NIM performs a similar action for a third time before routing the transaction to the destination UIM. This scheme prevents misdelivery of information due to corrupted headers. Once a header is found to be flawed, nothing in the header can be considered reliable and the only option that MAN has is to discard the transaction.

The source UIM is also required to provide a DCS at the end of the user data. This field is checked within the MAN network but no action is taken if errors are found. The information is delivered to the destination UIM who can check it and take appropriate action. Its use within the network is to identify both EUSL and internal network problems.

Note that there is never any attempt within the network to correct errors using the usual automatic repeat request (ARQ) techniques found in most of today's protocols. The need for low latency precludes this. Error correcting schemes would be too costly except for the headers, and even here the time penalty may be too great as has sometimes been the case in computer systems. However, header error correction may be employed later if experience proves that it is needed and time-wise possible.

Consequently, MAN checks for errors and discards transactions when there is reason to suspect the validity of the headers. Beyond this, transactions are delivered even if flawed. This is a reasonable approach for three reasons. First, intrinsic error rates over optical fibers are of the same order as error rates over copper when common ARQ protocols are employed. Both are in the range of $10^{-11}$ bits per bit. Secondly, graphics applications (which are increasing dramatically) often can tolerate small error rates where pixel images are transmitted; a bit or two per image would usually be fine. Finally, where error rates need to be better than the intrinsic rates, EUS-to-EUS ARQ protocols can be used (as they are today) to achieve these improved error rates.

2.5.2 Authentication

MAN provides an authentication feature. This feature assures a destination EUS of the identity of the source EUS for each and every transaction it receives. Malicious users cannot send transactions with forged "signatures". Users are also prevented from using the network free of charge; all users are forced to identify themselves truthfully with each and every transaction that they send into the network, thus providing for accurate usage-sensitive billing. This feature also provides the primitive capability for other features such as virtual private networks.

When an EUS first attaches to MAN, it "logs in" to a well known and privileged Login Server that is part of the network. The login server is in an administrative terminal 350 (FIG. 15) with an attached disk memory 351. The administrative terminal 350 is accessed via an OA&M MINT processor 315 (FIG. 14) and a MINT OA&M monitor 317 in the MINT central control 20, and an OA&M central control (FIG. 15). This login is achieved by the EUS (via its UIM) sending a login transaction to the server through the network. This transaction contains the EUS identification number (its name), its requested virtual network, and a password. In the NIM a port number is prefixed to the transaction before it is forwarded to the MINT for routing to the server. The Login Server notes the id/port pairing and informs the MINT attached to the source NIM of that pairing. It also acknowledges its receipt of the login to the EUS, telling the EUS that it may now use the network.

When using the network, each and every network transaction that is sent to the source NIM from the EUS has, within its header, its source id plus other information in the header described below with respect to FIG. 20. The NIM prefixes the port number to the transaction and forwards it to the MINT where the pairing is checked. Incorrect pairing results in the MINT discarding the transaction. In the MINT, the prefixed source port number is replaced with a destination port number before it is sent to the destination NIM. The destination NIM uses this destination port number to complete the routing to the destination EUS.

If an EUS wishes to disconnect from the network, it "logs off" in a manner similar to its login. The Login Server informs the MINT of this and the MINT removes the id/port information, thus rendering that port inactive.

2.5.3 Guaranteed Ordering

From NIM to NIM the notion of a LUWU does not exist. Even though LUWUs lose their identity within the NIM to NIM envelope, the packets of a given LUWU must follow a path through predetermined XLs and MINTs. This allows ordering of packets arriving at UIMs to be preserved for a LUWU. However, packets may be discarded due to flawed headers. The UIM checks for missing packets and notifies the EUS in the event that this occurs.

2.5.4 Virtual Circuits and Infinite LUWUs

The network does not set up a circuit through to the destination but rather switches groups of packets and SUWUs as resources become available. This does not prevent the EUS from setting up virtual circuits; for example the EUS could write an infinite size LUWU with the appropriate UIM timing parameters. Such a data stream would appear to the EUS as a virtual circuit while to the network it would be a never ending LUWU that moves packets at a time. The implementation of this concept must be handled between the UIM and the EUS protocols since there may be many different types of EUS and UIMs. The end-user can be transmitting multiple data streams to any number of destinations at any one time. These streams are multiplexed on packet and SUWUs boundaries on the transmit link between the source UIM and the source NIM.

A parameter, to be adjusted for optimum performance as the system is loaded, limits the time (equivalent to limiting the length of the data stream) that one MINT can send data to a NIM in order to free that NIM to receive data from other MINTs. An initial value of 2 milliseconds appears reasonable based on simulations. The value can be adjusted dynamically in response to traffic patterns in the system, with different values possible for different MINTs or NIMs, and at different times of the day or different days of the week.

3 SWITCH

The MAN switch (MANS) is the fast circuit switch at the center of the MAN hub. It interconnects the MINTs, and all end-user transactions must pass through it. The MANS consists of the switch fabric itself, (called the data network or DNet), plus the switch control complex (SCC), a collection of controllers and links that operate the DNet fabric. The SCC must receive requests from the MINTs to connect or disconnect pairs of incoming and outgoing internal links (ILs), execute the requests when possible, and inform the MINTs of the outcome of their requests.

These apparently straightforward operations must be carried out at a high performance level. The demands of the MAN switching problem are discussed in the next section. Next, Section 3.2 presents the fundamentals of a distributed-control circuit-switched network that is offered as a basis for a solution to such switching demands. Section 3.3 tailors this approach to the specific needs of MAN and covers some aspects of the control structure that are critical to high performance.

3.1 Characterizing the Problem

First we estimate some numerical values for the demands on the MAN switch. Nominally, the MANS must establish or remove a transaction's connection in fractions of a millisecond in a network with hundreds of ports, each running at 150 Mb/s and each carrying thousands of separately switched transactions per second. Millions of transaction requests per second imply a distributed control structure where numerous pipelined controllers process transaction requests in parallel.

The combination of so many ports each running a high speed has several implications. First, the bandwidth of the network must be at least 150 Gb/s, thus requiring multiple data paths (nominally 150 Mb/s) through the network. Second, a 150 Mb/s synchronous network would be difficult to build (although an asynchronous network needs to recover clock or phase). Third, since inband signaling creates a more complex (self-routing) network fabric and requires buffering within the network, an out-of-band signaling (separate control) approach is desirable.

In MAN, transaction lengths are expected to vary by several orders of magnitude. These transactions can share a single switch, as discussed hereinafter with adequate delay performance for small transactions. The advantage of a single fabric is that data streams do not have to be separated before switching and recombined afterwards.

A problem to be dealt with is the condition where the requested output port is busy. To set up a connection, the given input and output ports must be concurrently idle (the so-called concurrency problem). If an idle input (output) port waits for the output (input) to become idle, the waiting port is inefficiently utilized and other transactions needing that port are delayed. If the idle port is instead given to other transactions, the original busy destination port may have become idle and busy again in the meantime, thus adding further delay to the original transaction. The delay problem is worse when the port is busy with a large transaction.

Any concurrency resolution strategy requires that each port's busy/idle status be supplied to the controllers concerned with it. To maintain a high transaction rate, this status update mechanism must operate with short delays.

If transaction times are short and most delays are caused by busy ports, an absolutely non-blocking network topology is not required, but the blocking probability should be small enough so as not to add much to delays or burden the SCC with excessive unachievable connection requests.

Broadcast (one to many) connections are a desirable network capability. However, even if the network supports broadcasting, the concurrency problem (here even worse with the many ports involved) must be handled without disrupting other traffic. This seems to rule out the simple strategy of waiting for all destination ports to become idle and broadcasting to all of them at once.

Regardless of the special needs of the MAN network, the MANS satisfies the general requirements for any practical network. Startup costs are reasonable. The network is growable without disrupting existing fabric. The topology is inherently efficient in its use of fabric and circuit boards. Finally, the concerns of operational availability—reliability, fault tolerance, failure-group sizes, and ease of diagnosis and repair—are met.

3.2 General Approach - A Distributed-Control Circuit-Switching Network

In this section we describe the basic approach used in the MANS. It specifically addresses the means by which a large network can be run by a group of controllers operating in parallel and independently of one another. The distributed control mechanism is described in terms of two-stage networks, but with a scheme to extend the approach to multistage networks. Section 3.3 presents details of the specific design for MAN.

A major advantage of our approach is that the plurality of network controllers operate independently of one another using only local information. Throughput (measured in transactions) is increased because controllers do not burden each other with queries and responses. Also the delay in setting up or tearing down connections is reduced because the number of sequential control steps is minimized. All this is possible because the network fabric is partitioned into disjoint subsets, each of which is controlled solely by its own controller that uses global static information, such as the internal connection pattern of the data network 120, but only local dynamic (network state) data. Thus, each controller sees and handles only those connection requests that use the portion of the network for which it is responsible, and monitors the state of only that portion.

3.2.1 Partitioning Two-Stage Networks

Figure 6:
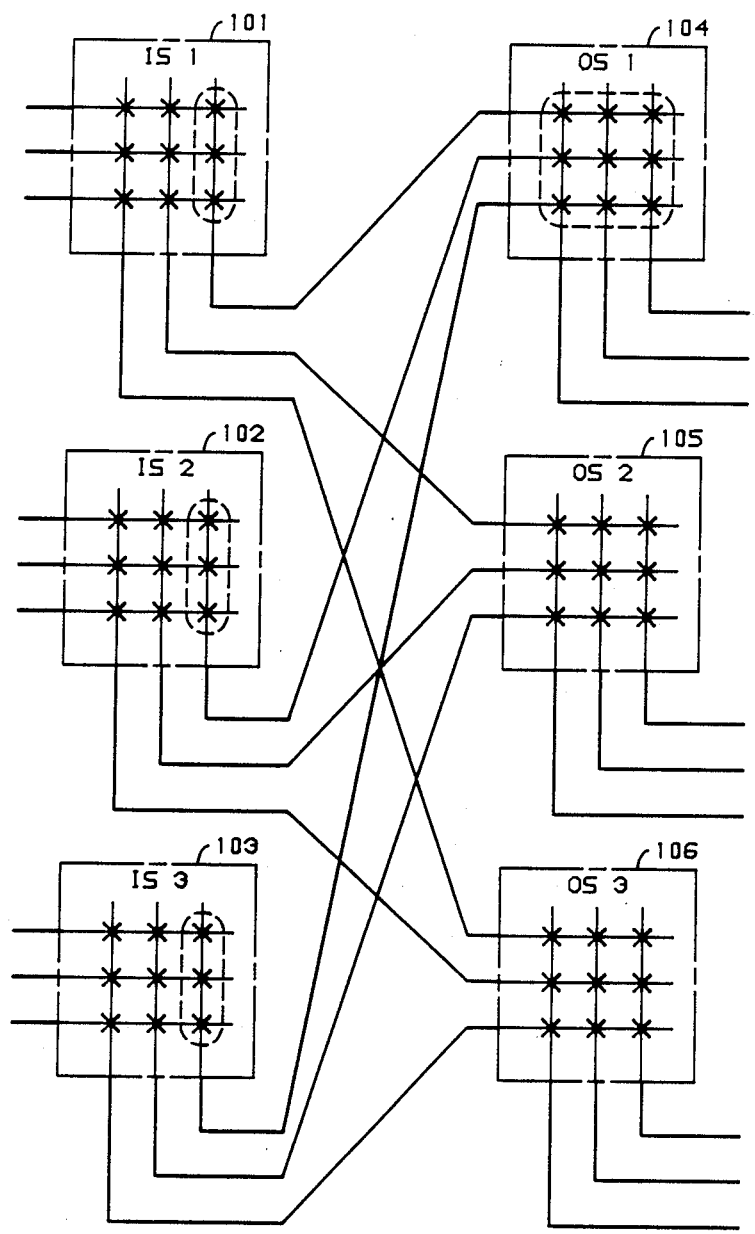
FIG. 6 is a simplified illustrative example of a type of network which can be used as a circuit switch in the hub of MAN.

Consider the 9×9 two-stage network example in FIG. 6 comprising three input switches IS1 (101), IS2 (102), and IS3 (103), and three output switches OS1 (104), OS2 (105), and OS3 (106). We can partition its fabric into three disjoint subsets. Each subset includes the fabric in a given second stage switch ($OS_x$) plus the fabric (or crosspoints) in the first stage switches ($IS_y$) that connect to the links going to that second stage switch. For example, in FIG. 6, the partition or subset associated with $OS_1$ (104) is shown by a dashed line around the crosspoints in $OS_1$ plus dashed lines around three crosspoints in each of the first stage switches (101,102,103) (those crosspoints being those that connect to the links to $OS_1$).

Now, consider a controller for this subset of the network. It would be responsible for connections from any inlet to any outlet on $OS_1$. The controller would maintain busy/idle status for the crosspoints it controlled. This information is clearly enough to tell whether a connection is possible. For example, suppose an inlet on $IS_1$ is to be connected to an outlet on $OS_1$. We assume that the request is from the inlet, which must be idle. The outlet can be determined to be idle from outlet busy/idle status memory or else from the status of the outlet's three crosspoints in $OS_1$ (all three must be idle). Next, the status of the link between $IS_1$ and $OS_1$ must be checked. This link will be idle if the two crosspoints on both ends of the link, which connect the link to the remaining two inlets and outlets, are all idle. If the inlet, outlet, and link are all idle, a crosspoint in each of $IS_1$ and $OS_1$ can be closed to set up the requested connection.

Note that this activity can proceed independently of activities in the other subsets (disjoint) of the network. The reason is that the network has only two stages, so the inlet switches may be partitioned according to their links to second stage switches. In theory this approach applies to any two-stage network, but the usefulness of the scheme depends on the network's blocking characteristics. The network in FIG. 6 would block too frequently, because it can connect at most one inlet on a given inlet switch to an outlet on a given second stage switch.

A two-stage network, referred to hereinafter as a Richards network, of the type described in G. W. Richards et al.: "A Two-Stage Rearrangeable Broadcast Switching Network", *IEEE Transactions on Communications*, v. COM-33, no. 10, Oct. 1985, avoids this problem by wiring each inlet port to multiple appearances spread over different inlet switches. The distributed control scheme operates on a Richards network, even though MAN may not use such Richards network features as broadcast and rearrangement.

3.2.2 Control Network
3.2.2.1 Function

Figure 7:
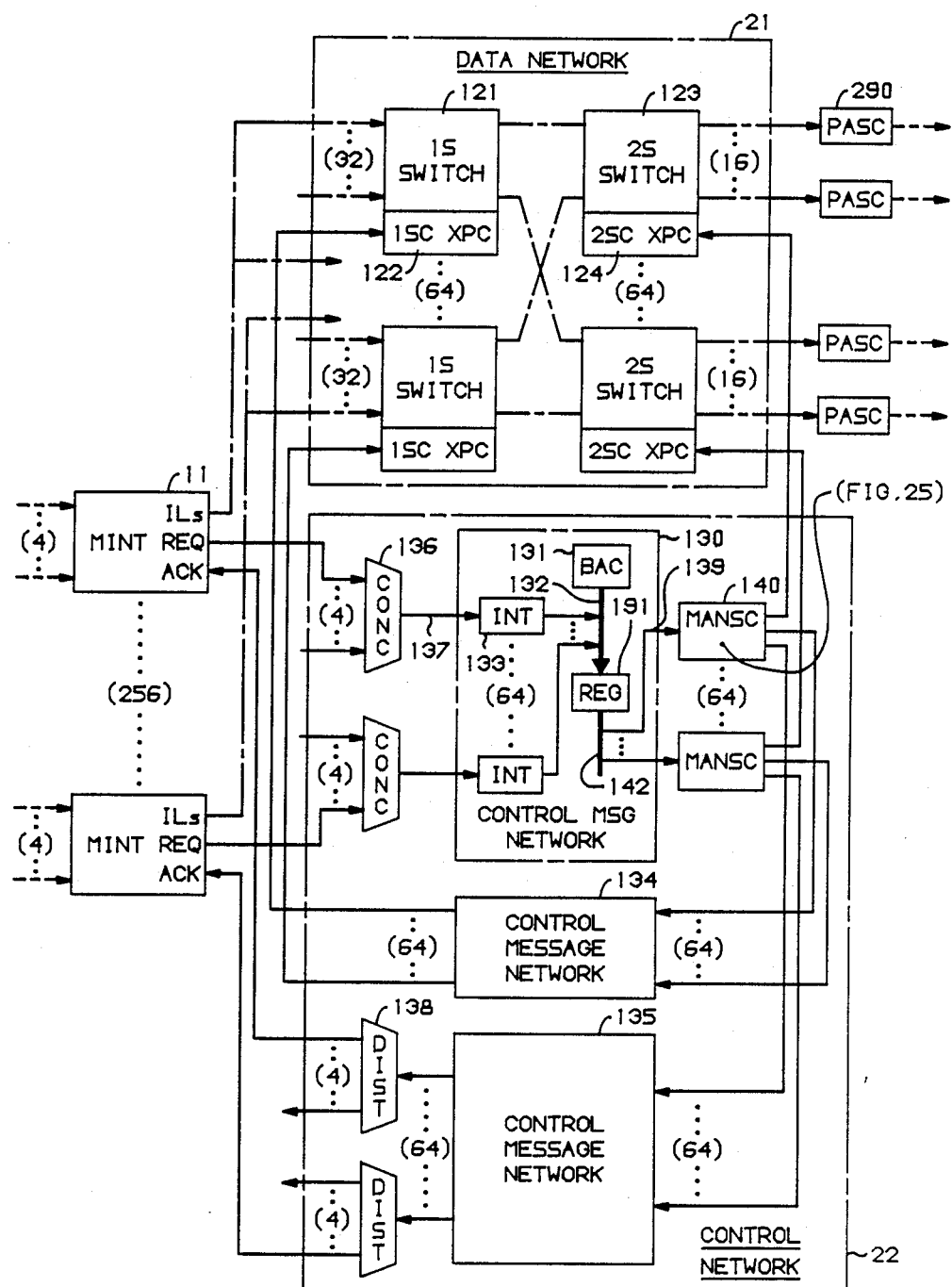
FIG. 7 is a block diagram of an illustrative embodiment of a MAN circuit switch and its associated control network.

In MAN, requests for connections come from inlets, actually, the central control 20 of the MINTs. These requests must be distributed to the proper switch controller via a control network (CNet). In FIG. 7, both the DNet 120 for circuit-switched transactions and the control CNet 130 are shown. The DNet is a two-stage rearrangeably non-blocking Richards network. Each switch 121,123 includes a rudimentary crosspoint controller (XPC) 122,124 which accepts commands to connect a specified inlet on the switch to a specified outlet by closing the proper crosspoint. The first and second stages' XPCs (121,123) are abbreviated 1SC (first stage controller) and 2SC (second stage controller) respectively.

On the right side of the CNet are 64 MANS controllers 140 (MANSCs) corresponding to and controlling 64 disjoint subsets of the DNet, partitioned by second stage outlet switches as described earlier. Since the controllers and their network are overlaid on the DNet and not integral to the data fabric, they could be replaced by a single controller in applications where transaction throughput is not critical.

3.2.2.2 Structure

The CNet shown in FIG. 7 has special properties. It consists of three similar parts 130,134,135, corresponding to flows of messages from a MINT to a MANSC, orders from a MANSC to an XPC, and acknowledgments or negative acknowledgments ACKs/NAKs from a MANSC to a MINT; acknowledge (ACK), negative acknowledge (NAK). Each of the networks 130,134 and 135 is a statistically multiplexed time-division switch, and comprises a bus 132, a group of interfaces 133 for buffering control data to a destination or from a source, and a bus arbiter controller (BAC) 131. The bus arbiter controller controls the gating of control data from an input to the bus. The address of the destination selects the output to which the bus is to be gated. The output is connected to a controller (network 130: a MANSC 140) or an interface (networks 131 and 132, interfaces similar to interface 133). The request inputs and ACK/NAK responses are concentrated by control data concentrators and distributors 136,138, each control data concentrator concentrating data to or from four MINTs. The control data concentrators and distributors simply buffer data from or to the MINTs. The interfaces 133 in the CNet handle statistical demultiplexing and multiplexing (steering and merging) of control messages. Note that the interconnections made by bus 132 for a given request message in the DNet are the same as those requested in the CNet.

3.2.3 Connection Request Scenario

The connection request scenario begins with a connection request message arriving at the left of CNet 130 in a multiplexed stream on one of the message input links 137 from one of the data concentrators 136. This request includes the DNet 120 inlet and outlet to be connected. In the CNet 130, the message is routed to the appropriate link 139 on the right side of the CNet according to the outlet to be connected, which is uniquely associated with a particular second stage switch and therefore also with a particular MANS controller 140.

This MANSC consults a static global directory (such as a ROM) to find which first stage switches carry the requesting inlet. Independently of other MANSCs, it now checks dynamic local data to see whether the outlet is idle and any links from the proper first stage switches are idle. If the required resources are idle, the MANSC sends a crosspoint connect order to its own second stage outlet switch plus another order to the proper first stage switch via network 134. The latter order includes a header to route it to the correct first stage.

This approach can achieve extremely high transaction throughput for several reasons. All network controllers can operate in parallel, independently of one another, and need not wait for one another's data or go-aheads. Each controller sees only those requests for which it is responsible and does not waste time with other messages. Each controller's operations are inherently sequential and independent functions and thus may be pipelined with more than one request in progress at a time.

The above scenario is not the only possibility. Variables to be considered include broadcast -vs- point-to-point inlets, outlets -vs-inlet-oriented connection requests, rearrangement -vs- blocking-allowed operation, and disposition of blocked or busy connect requests. Although these choices are already settled for MAN, all these options can be handled with the control topology presented, simply by changing the logic in the MANSCs.

3.2.4 Multistage Networks

This control structure is extendible to multistage Richards networks, where switches in a given stage are recursively implemented as two-stage networks. The resultant CNet is one in which connection requests pass sequentially through S-1 controllers in an S-stage network, where again controllers are responsible for disjoint subsets of the network and operate independently, thus retaining the high throughput potential.

3.3 Specific Design for MAN

In this section we first examine those system attributes that drive the design of the MANS. Next, the data and control networks are described. Finally the functions of the MANS controller are discussed in detail, including design tradeoffs that affect performance.

3.3.1 System Attributes

3.3.1.1 External and Internal Interfaces

FIG. 7 illustrates a prototypical fully-grown MANS composed of a DNet 121 with 1024 incoming and 1024 outgoing ILs and CNet 22 comprising three control message networks 130,133,134 each with 64 incoming and 64 outgoing message links. The ILs are partitioned into groups of 4, one group for each of 256 MINTs. The DNet is a two-stage network of 64 first stage switches 121 and 64 second stage switches 123. Each switch includes an XPC 122 that takes commands to open and close crosspoints. For each of the DNet's 64 second stages 123, there is an associated MANSC 140 with a dedicated control link to the XPC 124 in its second stage switch.

Each control link and status link interfaces 4 MINTs to the CNet's left-to-right and right-to-left switch planes via 4:1 control data concentrators and distributors 136,138 which are also part of the CNet 22. These may be regarded either as remote concentrators in each 4-MINT group or as parts of their associated 1:64 CNet 130,135 stages; in the present embodiment, they are part of the CNet. A third 64×64 plane 134 of the CNet gives each MANSC 140 a dedicated right-to-left interface 133 with one link to each of the 64 1SCs 122. Each MINT 11 interfaces with the MANS 10 through its four ILs 12, its request signal to control data concentrator 136, and the acknowledge signal received back from control data distributor 138.

Alternately, each CNet could have 256 instead of 64 ports on its MINT side, eliminating the concentrators.

3.3.1.2 Size

The MANS diagram in FIG. 7 represents a network needed to switch data traffic for up to 20,000 EUSs. Each NIM is expected to handle and concentrate the traffic of 10 to 20 EUSs onto a 150 Mb/s XL, giving about 1000 XLs (rounded off in binary to 1024). Each MINT serves 4 XLs for a total of 256 MINTs. Each MINT also handles 4 ILs, each with an input and an output termination on the DNet portion of the MANS. The data network thus has 1024 inputs and 1024 outputs. Internal DNet link sizing will be addressed later.

Failure-group size and other considerations lead to a DNet with 32 input links on each first stage switch 121, each of which links is connected to two such switches. There are 16 outputs on each second stage switch 123 of the DNet. Thus, there are 64 of each type of switch and also 64 MANSCs 140 in the CNet, one per second stage switch.

3.3.1.3 Traffic and Consolidation

The "natural" EUS transactions of data to be switched vary in size by several orders of magnitude, from SUWUs of a few hundred bits to LUWUs a megabit or more. As explained in Section 2.1.1, MAN breaks larger EUS transactions into network transactions or packets of at most a few thousand bits each. But the MANS deals with the switch transaction, defined as the burst of data that passes through one MANS connection per one connect (and disconnect) request. Switch transactions can vary in size from a single SUWU to several LUWUs (many packets) for reasons about to be given. For the rest of Section 3, "transaction" means "switch transaction" except as noted.

For a given total data rate through the MANS, the transaction throughput rate (transactions/second) varies inversely with the transaction size. Thus, the smaller the transaction size, the greater the transaction throughput must be to maintain the data rate. This througput is limited by the individual throughputs of the MANSCs (whose connect/disconnect processing delays reduce the effective IL bandwidth) and also by concurrency resolution (waiting for busy outlets). Each MANSC's overhead per transaction is of course independent of transaction size.

Although larger transactions reduce the transaction throughput demands, they will add more delays to other transactions by holding outlets and fabric paths for longer times. A compromise is needed—small transactions reduce blocking and concurrency delays, but large transactions ease the MANSC and MINT workloads and improve the DNet duty cycle. The answer is to let MAN dynamically adjust its transaction sizes under varying loads for the best performance.

The DNet is large enough to handle the offered load, so the switching control complex's (SCC) throughput is the limiting factor. Under light traffic, the switch transactions will be short, mostly single SUWUs and packets. As traffic levels increase so does the transaction rate. As the SCC transaction rate capacity is approached, transaction sizes are dynamically increased to maintain the transaction rate just below the point where the SCC would overload. This is achieved automatically by the consolidation control strategy, whereby each MINT always transmits in a single switch transaction all available SUWUs and packets targeted for a given destination, even though each burst may contain the whole or parts of several EUS transactions. Further increases in traffic will increase the size, but not so much the number, of transactions. Thus fabric and IL utilization improve with load, while the SCC's workload increases only slightly. Section 3.3.3.2.1 explains the feedback mechanism that controls transaction size.

3.3.1.4 Performance Goals

Nevertheless, MAN's data throughput depends on extremely high performance of individual SCC control elements. For example, each XPC 122,124 in the data switch will be ordered to set and clear at least 67,000 connections per second. Clearly, each request must be handled in at most a few microseconds.

Likewise, the MANSCs' functions must be done quickly. We assume that these steps will be pipelined; then the sum of the step processing times will contribute to connect and disconnect delays, and the maximum of these step times will limit transaction throughput. We aim to hold the maximum and sum to a few microseconds and a few tens of microseconds, respectively.

The resolution of the concurrency problem must also be quick and efficient. Busy/idle status of destination terminals will have to be determined in about 6 microseconds, and the control strategy must avoid burdening MANSCs with unfulfillable connection requests.

One final performance issue relates to the CNet itself. The network and its access links must run at high speeds (probably at least 10 Mb/s) to keep control message transmit times small and so that links will run at low occupancies to minimize the contention delays from statistical multiplexing.

3.3.2 Data Network (DNet)

The DNet is a Richards two-stage rearrangeably non-blocking broadcast network. This topology was chosen not so much for its broadcast capability, but because its two-stage structure allows the network to be partitioned into disjoint subsets for distributed control.

3.3.2.1 Design Parameters

The capabilities of the Richards network derive from the assignment of inlets to multiple appearances on different first stage switches according to a definite pattern. The particular assignment pattern chosen, the number m of multiple appearances per inlet, the total number of inlets, and the number of links between first and second stage switches determine the maximum number of outlets per second stage switch permitted for the network to be rearrangeably non-blocking.

The DNet in FIG. 7 has 1024 inlets, each with two appearances on the first stage switches. There are two links between each first and second stage switch. These parameters along with the pattern of distributing the inlets ensure that with 16 outlets per second stage switch the network will be rearrangeably non-blocking for broadcast.

Since MAN does not use broadcast or rearrangement, those parameters not justified by failure-group or other considerations may be changed as more experience is obtained. For example, if a failure group size of 32 were deemed tolerable, each second stage switch could have 32 outputs, thus reducing the number of second stage switches by a factor of 2. Making such a change would depend on the ability of the SCC control elements each to handle twice as much traffic. In addition, blocking probabilities would increase and it would have to be determined that such an increase would not significantly detract from the performance of the network.

The network has 64 first stage switches 121 and 64 second stage switches 123. Since each inlet has two appearances and there are two links between first and second stage switches, each first stage switch has 32 inlets and 128 outlets and each second stage has 128 inlets and 16 outlets.

3.3.2.2 Operation

Since each inlet has two appearances and since there are two links between each first and second stage switch, any outlet switch can access any inlet on any one of four links. The association of inlets to links is algorithmic and thus may be computed or alternatively read from a table. The path hunt involves simply choosing an idle link (if one exists) from among the four link possibilities.

If none of the four links is idle, a re-attempt to make a connection is made later and is requested by the same MINT. Alternatively, existing connections could be re-arranged to remove the blocking condition, a simple procedure in a Richards network. However, rerouting a connection in midstream could introduce a phase glitch beyond the outlet circuit's ability to recover phase and clock. Thus with present circuitry, it is preferable not to run the MANS as a rearrangeable switch.

Each switch in the DNet has an XPC 122,124 on the CNet, which receives messages from the MANSCs telling which crosspoints to operate. No high-level logic is performed by these controllers.

3.3.3 Control Network and MANS Controller Functions

3.3.3.1 Control Network (CNet)

The CNet 130,134,135 briefly described earlier, interconnects the MINTs, MANSCs, and 1SCs. It must carry three types of messages—connect/disconnect orders from MINTs to MANSCs using block 130, crosspoint orders from MANSCs to 1SCs using block 134, and ACKs and NAKs from MANSCs back to the MINTs using block 135. The CNet shown in FIG. 7 has three corresponding planes or sections. The private MANS 140—2SC 124 links are shown but are not considered part of the CNet as no switching is required.

In this embodiment, the 256 MINTs access the CNet in groups of 4, resulting in 64 input paths to and 64 output paths from the network. The bus elements in the control network perform merging and routing of message streams. A request message from a MINT includes the ID of the outlet port to be connected or disconnected. Since the MANSCs are associated one-to-one with second stage switches, this outlet specification identifies the proper MANSC to which the message is routed.

The MANSCs transmit acknowledgment (ACK), negative acknowledgment (NAK), and 1SC command messages via the right-to-left portion of the CNet (blocks 134,135). These messages will also be formatted with header information to route the messages to the specified MINTs and 1SCs.

The CNet and its messages raise significant technical challenges. Contention problems in the CNet may mirror those of the entire MANS, requiring their own concurrency solution. These are apparent in the Control Network shown in FIG. 7. The control data concentrators 136 from four lines into one interface may have contention where more than one message tries to arrive at one time. The data concentrators 136 have storage for one request from each of the four connected MINTs, and the MINTs ensure that consecutive requests are sent sufficiently far apart that the previous request from a MINT has already been passed on by the concentrator before the next arrives. The MINTs time out if no acknowledgement of a request is received within a prespecified time. Alternatively, the control data concentrators 136 could simply "OR" any requests received on any input to the output; garbled requests would be ignored and not acknowledged, leading to a time out.

Functionally what is needed inside the blocks 130,134,135 is a micro-LAN specialized for tiny fixed-length packets and low contention and minimal delay. Ring nets are easy to interconnect, grow gracefully, and permit simple tokenless add/drop protocols, but they are ill-suited for so many closely packed nodes and have intolerable end-to-end delays.

Since the longest message (a MINT's connect order) has under 32 bits, a parallel bus 132 serves as a CNet fabric that can send a complete message in one cycle. Its arbitration controller 131, in handling contention for the bus, would automatically solve contention for the receivers. Bus components are duplicated for reliability (not shown).

3.3.3.2 MAN Switch Controller (MANSC) Operations

Figure 8:
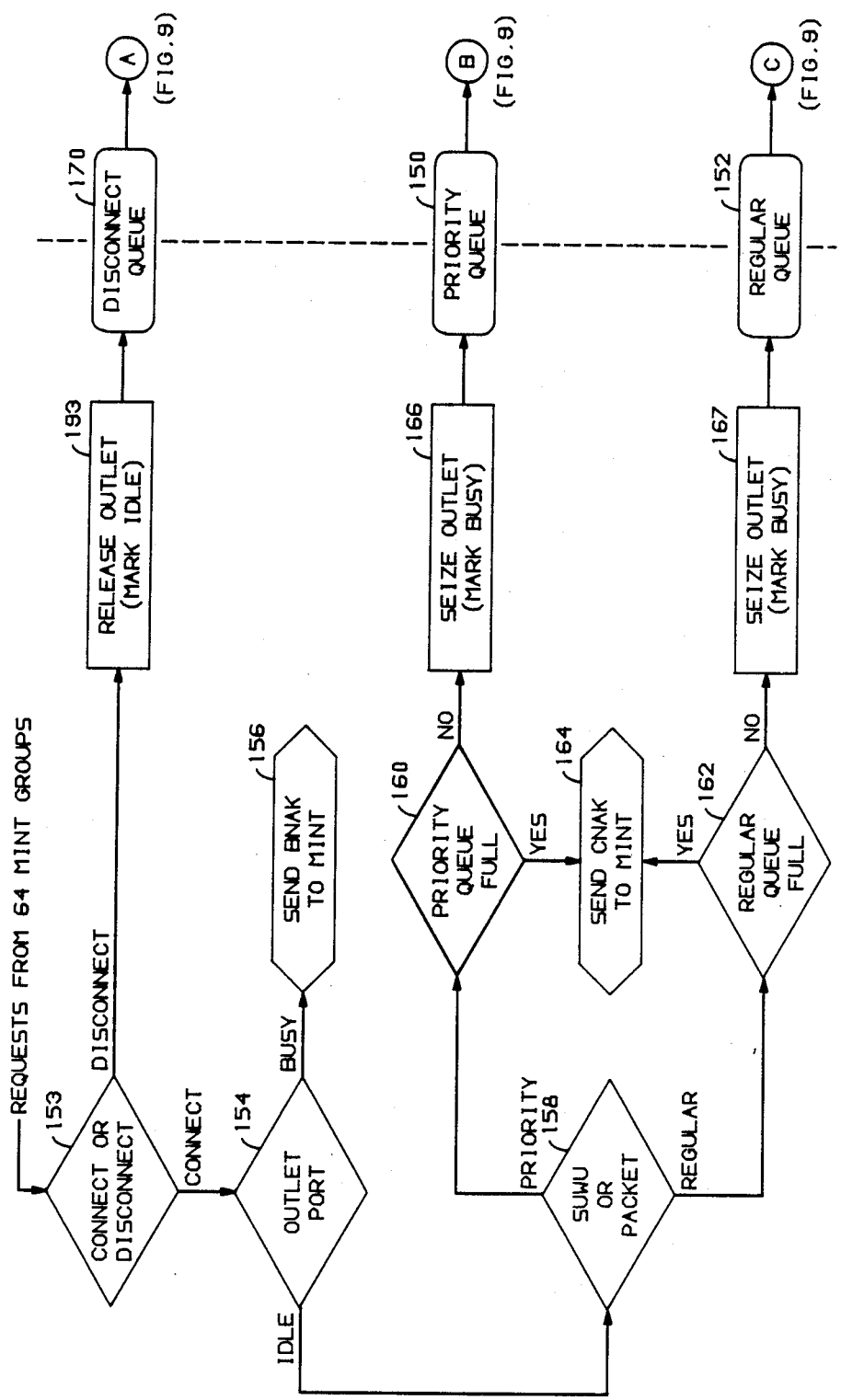
FIGS. 8 and 9 are flowcharts representing the flow of requests from the data distribution stage of the hub to the controllers of the circuit switch of the hub.
Figure 9:
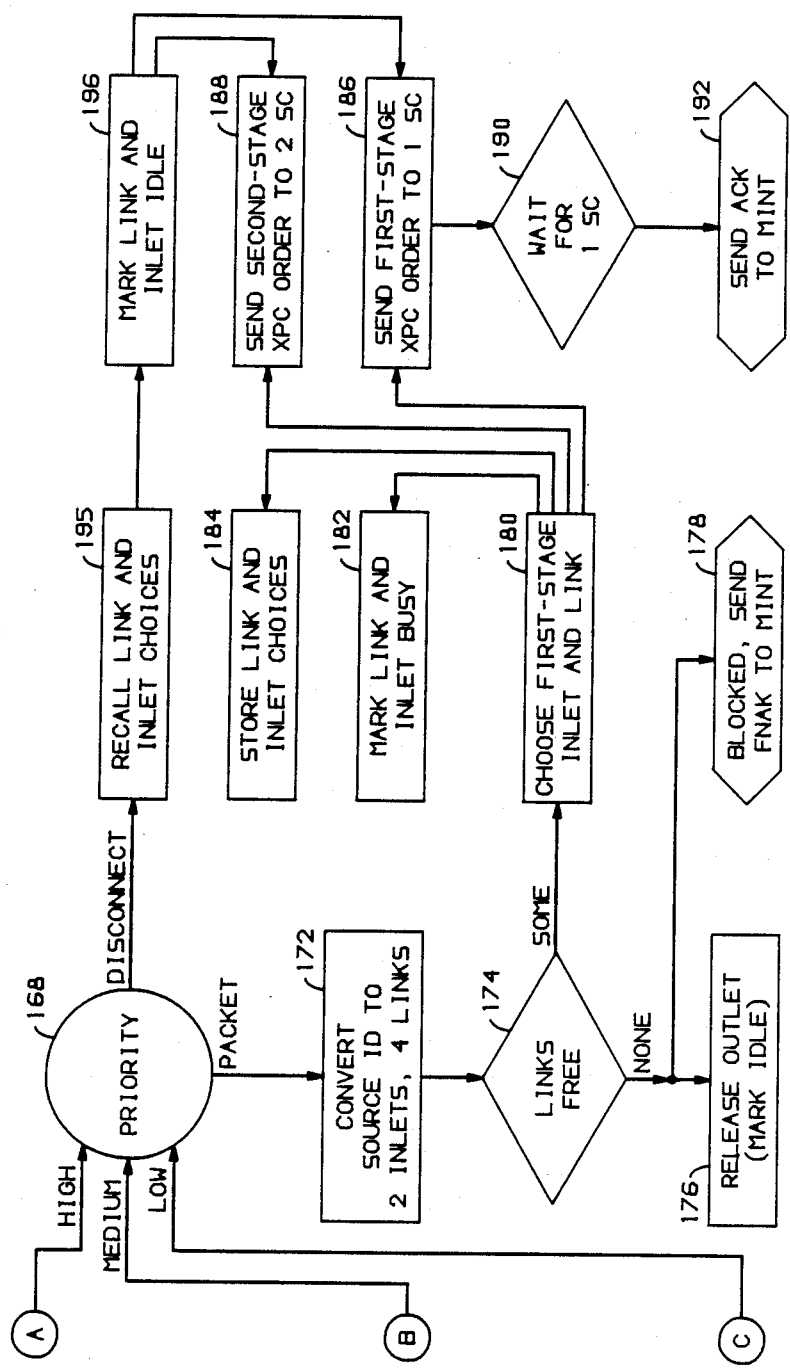

FIGS. 8 and 9 show a flowchart of the MANSC's high level functions. Messages to each MANSC 140 include a connect/disconnect bit, SUWU/packet bit, and the IDs of the MANS input and output ports involved.

3.3.3.2.1 Request Queues; Consolidation (Intake Section, FIG. 8)

Since the rate of message arrivals at each MANSC 140 can exceed its message processing rate, a MANSC provides entrance queues for its messages. Connect and disconnect requests are handled separately. Connects are not enqueued unless their requested outlets are idle.

Priority and regular packet connect messages are provided separate queues 150,152 so that priority packets can be given higher priority. An entry from the regular packet queue 152 is processed only if the priority queue 150 is empty. This minimizes the priority packets' processing delays at the expense of the regular packets', but it is estimated that priority traffic will not usually be heavy enough to add much to packet delays. Even so, delays are likely to be more user-tolerable with the lower priority large data transactions than with priority transactions. Also, if a packet is one of many pieces of a LUWU, any given packet delay may have no final effect since end-to-end LUWU delay depends only on the last packet.

Both the priority and regular packet queues are short, intended only to cover short-term random fluctuations in message arrivals. If the short-term rate of arrivals exceeds the MANSC's processing rate, the regular packet queue and perhaps the priority queue will overflow. In such cases a control negative acknowledge (CNAK) is returned to the requesting MINT, indicating a MANSC overload. This is no catastrophe, but rather the feedback mechanism in the consolidation strategy that increases switch transaction sizes as traffic gets heavier. Each MINT combines into one transaction all available packets targeted for a given DNet outlet. Thus, if a connection request by the MINT results in a CNAK, the next request for the same destination may represent more data to be shipped during the connection, provided more packets of the LUWUs have arrived at the MINT in the meantime. Consolidation need not always add to LUWU transmission delay, since a LUWU's last packet might not be affected. This scheme dynamically increases effective packet (transaction) sizes to accommodate the processing capability of the MANSCs.

The priority queue is longer than the regular packet queue to reduce the odds of sending a priority CNAK due to random bursts of requests. Priority packets are less likely to benefit from consolidation than packets recombining into their original LUWUs; this supports the separate, high-priority queue. To force the MINTs to consolidate more packets, we may build the regular packet queue shorter than it "ought" to be. Simulations have indicated that a priority queue of 4 requests capacity and a regular queue of 8 requests capacity is appropriate. The sizes of both queues affect system performance and can be fine-tuned with real experience with a system.

Figure 20:
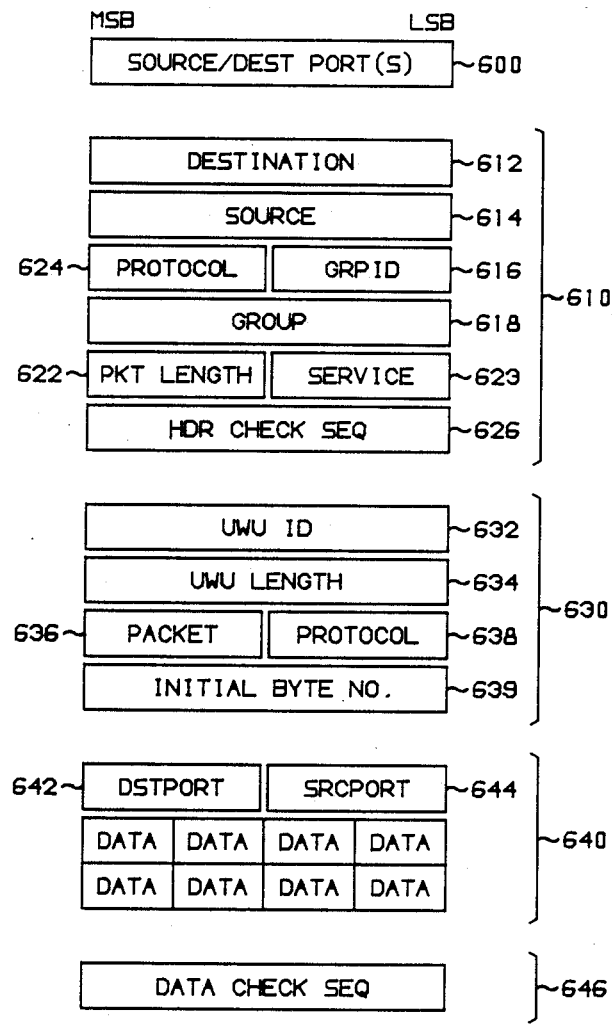
FIG. 20 is a layout of a data packet arranged for transmission through MAN illustrating the MAN protocol.

Priority is determined by a priority indicator in the type of service indication 623 (FIG. 20). Voice packets are given priority because of their required low delay. In alternative arrangements, all single packet transactions (SUWUs) may be given priority. Because charges are likely to be higher for high priority service, users will be discouraged from demanding high priority service for the many packets of a long LUWU.

3.3.3.2.2 Busy/Idle Check

When a connect request first arrives at a MANSC, it is detected in test 153 which differentiates it from a disconnect request. The busy/idle status of the destination outlet is checked (test 154). If the destination is busy, a busy negative acknowledge (BNAK) is returned (action 156) to the requesting MINT, which will try again later. Test 158 selects the proper queue (priority or regular packet). The queue is tested (160,162) to see if it is full. If the specified queue is full, a CNAK (control negative acknowledge) is returned (action 164). Otherwise the request is enqueued in queue 150 or 152 and simultaneously the destination is seized (marked busy) (action 166 or 167). Note that an overworked (full queues) MANSC can still return BNAKs, and that both BNAKs and CNAKs tend to increase transaction sizes through consolidation.

The busy/idle check and BNAK handle the concurrency problem. The penalty paid for this approach is that a MINT-to-MANS IL is unusable during the interval between a MINT's issuing a connect request for that IL and its receipt of an ACK or BNAK. Also the CNet jams up with BNAKs and failing requests under heavy MANS loads. Busy/idle checks must be done quickly so as not to degrade the connection request throughput and IL utilization; this explains the performance of a busy test before enqueuing. It may be desirable further to use separate hardware to pre-test outlets for concurrency. Such a procedure would relieve the MANSCs and CNets from repeated BNAK requests, increase the successful request throughput, and permit the MANS to saturate at a higher percentage of its theoretical aggregate bandwidth.

3.3.3.2.3 Path Hunt - MANSC Service Section (FIG. 9)

Priority block 168 gives highest priority to requests from disconnect queue 170, lower priority to requests from the priority queue 150, and lowest priority to requests from the packet queue 152. When a connect request is unloaded from the priority or the regular packet queue, its requested outlet port has already been seized earlier (action 166 or 167), and the MANSC hunts for a path through the DNet. This merely involves looking up first the two inlets to which the incoming IL is connected (action 172) to find the four links with access to that incoming IL and checking their busy status (test 174). If all four are busy, a blocked-fabric NAK (fabric NAK or FNAK) fabric blocking negative acknowledge (FNAK) is returned to the requesting MINT, which will try the request again later (action 178). Also the seized destination outlet is released (marked idle) (action 176). We expect FNAKs to be rare.

If the four links are not all busy, an idle one is chosen and seized, first a first stage inlet, then a link (action 180); both are marked busy (action 182). The inlet and link choices are stored (action 184). Now the MANSC uses its dedicated control path to send a crosspoint connect order to the XPC in its associated second stage switch (action 188); this connects the chosen link to the outlet. At the same time another crosspoint order is sent (via the right-to-left CNet plane 134) to the 1SC (action 186) required to connect the link to the inlet port. Once this order arrives at the 1SC (test 190), an ACK is returned to the originating MINT (action 192).

3.3.3.2.4 Disconnects

To release network resources as quickly as possible, disconnect requests are handled separately from connect requests and at top priority. They have a separate queue 170, built 16 words long (same as the number of outlets) so it can never overflow. A disconnect is detected in test 153 which receives requests from the MINT and separates connect from disconnect request. The outlet is released and the request placed in disconnect queue 170 (action 193). Now a new connect request for this same outlet can be accepted even though the outlet is not yet physically disconnected. Due to its higher priority, the disconnect will tear down the switch connections before the new request tries to reconnect the outlet. Once enqueued, a disconnect can always be executed. Only the outlet ID is needed to identify the spent connection; the MANSC recalls this connection's choice of link and crosspoints from local memory (action 195), marks these links idle (action 196) and sends the two XPC orders to release them (actions 186 and 188). Thereafter, test 190 controls the wait for an acknowledgment from the first stage controller and the ACK is sent to the MINT (action 192). If there is no record of this connection, the MANSC returns a "Sanity NAK." The MANSC senses status from the outlet's phase alignment and scramble circuit (PASC) 290 to verify that some data transfer took place.

3.3.3.2.5 Parallel Pipelining

Except for seizure and release of resources, the above steps for one request are independent of other requests' steps in the same MANSC and thus are pipelined to increase MANSC throughput. Still more power is achieved through parallel operations; the path hunt begins at the same time as the busy/idle check. Note that the transaction rate depends on the longest step in a pipelined process, but the response time for one given transaction (from request to ACK or NAK) is the sum of the step times involved. The latter is improved by parallelism but not by pipelining.

3.3.4 Error Detection and Diagnosis

Costly hardware, message bits, and time-wasting protocols to the CNet and its nodes to verify every little message are avoided. For example, each crosspoint order from a MANSC to an XPC does not require an echo of the command or even an ACK in return. Instead, MANSCs does assume that messages arrive uncorrupted and are acted on correctly, until evidence to the contrary arrives from outside. Audits and cross-checks are enabled only when there is cause for suspicion. The end users, NIMs and MINTs soon discover a defect in the MANS or its control complex and identify the subset of MANS ports involved. Then the diagnostic task is to isolate the problem for repair and interim work-around.

Once a portion of the MANS is suspect, temporary auditing modes could be turned on to catch the guilty parties. For suspected 1SCs and MANSC, these modes require use of the command ACKS and echoing. Special messages such as crosspoint audits may also be passed through the CNet. This should be done while still carrying a light load of user traffic.

Before engaging these internal self-tests (or perhaps to eliminate them entirely), MAN can run experiments on the MANS to pinpoint the failed circuit, using the MINTs, ILs, and NIMs. For example, if 75% of the test SUWUs sent from a given IL make it to a given outlet, we would conclude that one of the two links from one of that IL's two first stages id defective. (Note this test must be run under load, lest the deterministic MANSC always select the same link.) Further experiments can isolate that link. But if several MINTs are tested and none can send to a particular outlet, then that outlet is marked "out of service" to all MINTs and suspicion is now focussed on that second stage and its MANSC. If other outlets on that stage work, the fault is in the second stage's fabric. These tests use the status lead from each of a MANSC's 16 PASC.

Coordinating the independent MINTs and NIMs to run these tests requires a central intelligence with low-bandwidth message links to all MINTs and NIMs. Given inter-MINT connectivity (see FIG. 15), any MINT with the needed firmware can take on a diagnostic task. NIMs must be involved anyway to tell whether test SUWUs reach their destinations. Of course any NIM on a working MINT can exchange messages with any other such NIM.

3.4 MAN Switch Controller

Figure 25:
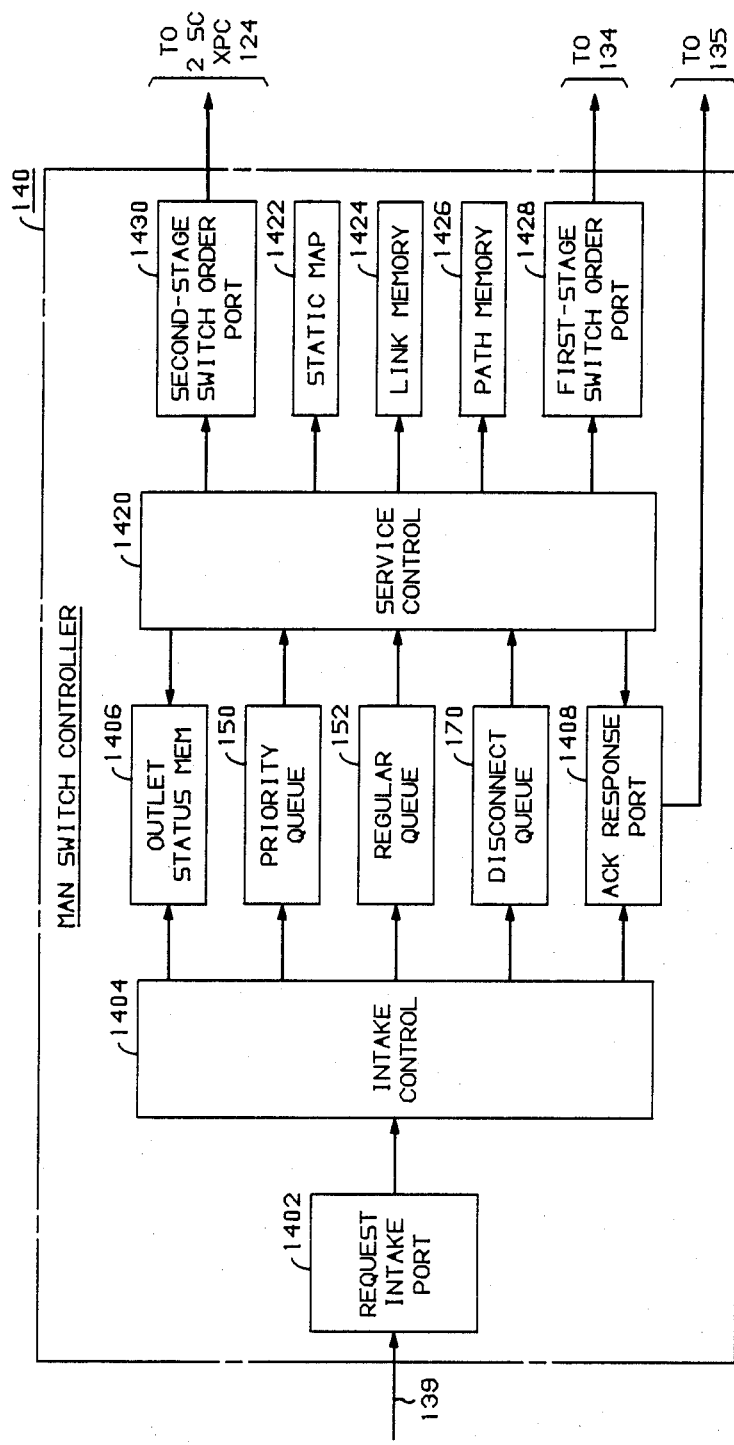
FIG. 25 is a block diagram of a MAN circuit switch controller.

FIG. 25 is a diagram of MANSC 140. This is the unit which sends control instructions to data network 120 to set up or tear down circuit connections. It receives orders from control network 130 via link 139 and sends acknowledgments both positive and negative back to the requesting MINTs 11 via control network 135. It also sends instructions to first stage switch controllers via control network 134 to first stage switch controller 122 and directly to the second stage controller 124 that is associated with the specific MANSC 140.

Inputs are received from inlet 139 at a request intake port 1402. They are processed by intake control 1404 to see if the requested outlet is busy. The outlet memory 1406 contains busy/idle indications of the outlets for which an MANSC 140 is responsible. If the outlet is idle a connect request is placed into one of two queues 150 and 152 previously described with respect to FIG. 8. If the request is for a disconnect, the request is placed in disconnect queue 170. The outlet map 1406 is updated to mark a disconnected outlet idle. The acknowledge response unit 1408 sends negative acknowledgments if a request is received with an error or if a connect request is made to a busy outlet or if the appropriate queue 150 or 152 is full. Acknowledgement responses are sent via control network 135 back to the requesting MINT 11 via distributor 138. All of these actions are performed under the control of intake control 1404.

Service control 1420 controls the setup of paths in data network 120 and the updating of outlet memory 1406 for those circumstances in which no path is available in the data network between the requesting input link and an available output link. The intake control also updates outlet memory 1406 on connect requests so that a request which is already in the queue will block another request for the same output link.

Service control 1420 examines requests in the three queues 150, 152, and 170. Disconnect requests are always given the highest priority. For disconnect requests, the link memory 1424 and path memory 1426 are examined to see which links should be made idle. The instructions for idling these links are sent to first stage switches from first stage switch order port 1428 and the instructions to second stage switches are sent from second stage switch order port 1430. For connect requests, the static map 1422 is consulted to see which links can be used to set up a path from the requesting input link to the requested output link. Link map 1424 is then consulted to see if appropriate links are available and if so these links are marked busy. Path memory 1426 is updated to show that this path has been set up so that on a subsequent disconnect order the appropriate links can be made idle. All of these actions are performed under the control of service control 1420.

Controllers 1420 and 1404 may be a single controller or separate controllers and may be program controlled or controlled by sequential logic. There is a great need for a very high-speed operations in these controllers because of the high throughput demanded which makes a hard wired controller preferable.

3.5 Control Network

Control message network 130 (FIG. 7) takes outputs 137 from data concentrators 136 and transmits these outputs, representing connect or disconnect requests, to MAN switch controllers 140. Outputs of concentrators 136 are stored temporarily in source registers 133. Bus access controller 131 polls these source registers 133 to see if any have a request to be transmitted. Such requests are then placed on bus 132 whose output is stored temporarily in intermediate register 141. Bus access controller 131 then sends outputs from register 141 to the appropriate one of the MAN switch controllers 140 via link 139 by placing the output of register 141 on bus 142 connected to link 139. The action is accomplished in three phases. During the first phase, the output of register 133 is placed on the bus 132, thence gated to register 141. During the second phase, the output of register 141 is placed on bus 142 and delivered to a MAN switch controller 140. During the third phase, the MAN switch controller signals the source register 133 as to whether the controller has received the request; if so, source register 133 can accept a new input from control data concentrator 136. Otherwise, source register 133 retains the same request data and the bus access controller 131 will repeat the transmission later. The three phases may occur simultaneously for three separate requests. Control networks 134 and 135 operate in a fashion similar to control network 130.

3.6 Summary

A structure to meet the large bandwidth and transaction throughput requirements for the MANS has been described. The data switch fabric is a two-stage Richards network, chosen because its low blocking probability permits a parallel, pipelined distributed switch control complex (SCC). The SCC includes XPCs in all first and second stage switches, an intelligent controller MANSC with each second stage, and the CNet that ties the control pieces together and links them to the MINTs.

4 MEMORY AND INTERFACE MODULE

The memory and interface module (MINT) provides receive interfaces for the external fiber-optic links, buffer memory, control for routing and link protocols, and transmitters to send collected data over the links to the MAN switch. In the present design, each MINT serves four network interface modules (NIMs) and has four links to the switch. The MINT is a data switching module.

4.1 Basic Functions

The basic functions of the MINT are to provide the following:

1. A fiber-optic receiver and link protocol handler for each NIM.
2. A link handler and transmitter for each link to the switch.
3. A buffer memory to accumulate packets awaiting transmission across the switch.
4. An interface to the controller for the switch to direct the setup and teardown of network paths.
5. Control for address translation, routing, making efficient use of the switch, orderly transmission of accumulated packets, and management of buffer memory.
6. An interface for operation, administration, and maintenance of the overall system.
7. A control channel to each NIM for operation, administration, and maintenance functions.

4.2 Data Flow

Figure 10:
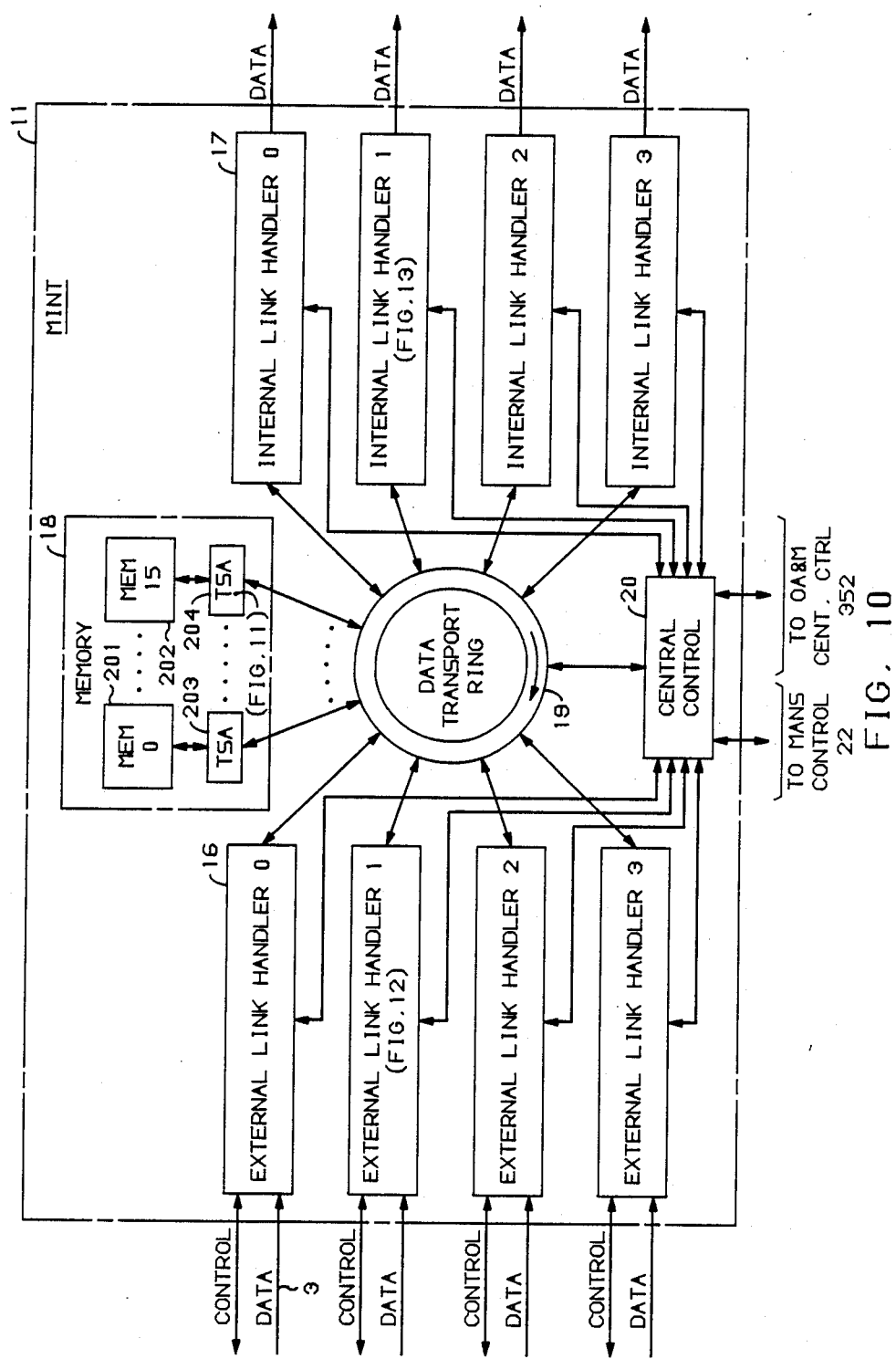
FIG. 10 is a block diagram of one data distribution switch of a hub.

In order to understand the descriptions of the individual functional units that make up a MINT, it is first necessary to have a basic understanding of the general flow of data and control. FIG. 10 shows an overall view of the MINT. Data enters the MINT on a high-speed (100-150 Mbit/s) data channel 3 from each NIM. This data is in the form of packets, on the order of 8 Kilobits long, each with its own header containing routing information. The hardware allows for packet sizes in increments of 512 bits to a maximum of 128 Kilobits. Small packet sizes, however, reduce throughput due to the per-packet processing required. Large maximum packet sizes result in wasted memory for transactions of less than a maximum size packet. The link terminates on an external link handler 16 (XLH), which retains a copy of the pertinent header fields as it deposits the entire packet into the buffer memory. This header information, together with the buffer memory address and length, is then passed to the central control 20. The central control determines the destination NIM from the address and adds this block to the list of blocks (if any) awaiting transmission to this same destination. The central control also sends a connection request to the switch controller if there is not already a request outstanding. When the central control receives an acknowledgement from the switch controller that a connection request has been satisfied, the central control transmits the list of memory blocks to the proper internal link handler 17 (ILH). The ILH reads the stored data from memory and transmits it at high speed (probably the same speed as the incoming links) to the MAN switch, which directs it to its destination. As the blocks are transmitted, the ILH informs the central control so that the blocks can be added to the list of free blocks available for use by the XLHs.

4.3 Memory Modules

The buffer memory 18 (FIG. 4) of the MINT 11 satisfies three requirements:

1. The quantity of memory provides sufficient buffer space to hold the data accumulated (for all destinations) while awaiting switch setups.

2. The memory bandwidth is adequate to support simultaneous activity on all eight links (four receiving and four transmitting).

3. The memory access provides for efficient streaming of data to and from the link handlers.

4.3.1 Organization

Because of the amount of memory required (Megabytes), it is desirable to employ conventional high-density dynamic random access memory (DRAM) parts. Thus, high bandwidth can be achieved only by making the memory wide. The memory is therefore organized into 16 modules 201, ..., 202 which make up a composite 512-bit word. As will be seen below, memory accesses are organized in a synchronous fashion so that no module ever receives successive requests without sufficient time to perform the required cycles. The range of memory for one MINT 11 in a typical MAN application is 16-64M bytes. The number is sensitive to the speed of application of flow control in overload situations.

4.3.2 Time Slot Assigners

The time slot assigners 203, ..., 204 (TSAs) combine the functions of a conventional DRAM controller and a specialized 8-channel DMA controller. Each receives read/write requests from logic associated with the Data Transport Ring 19 (see §4.4, below). Its setup commands come from dedicated control time slots on this same ring.

4.3.2.1 Control

Figure 11:
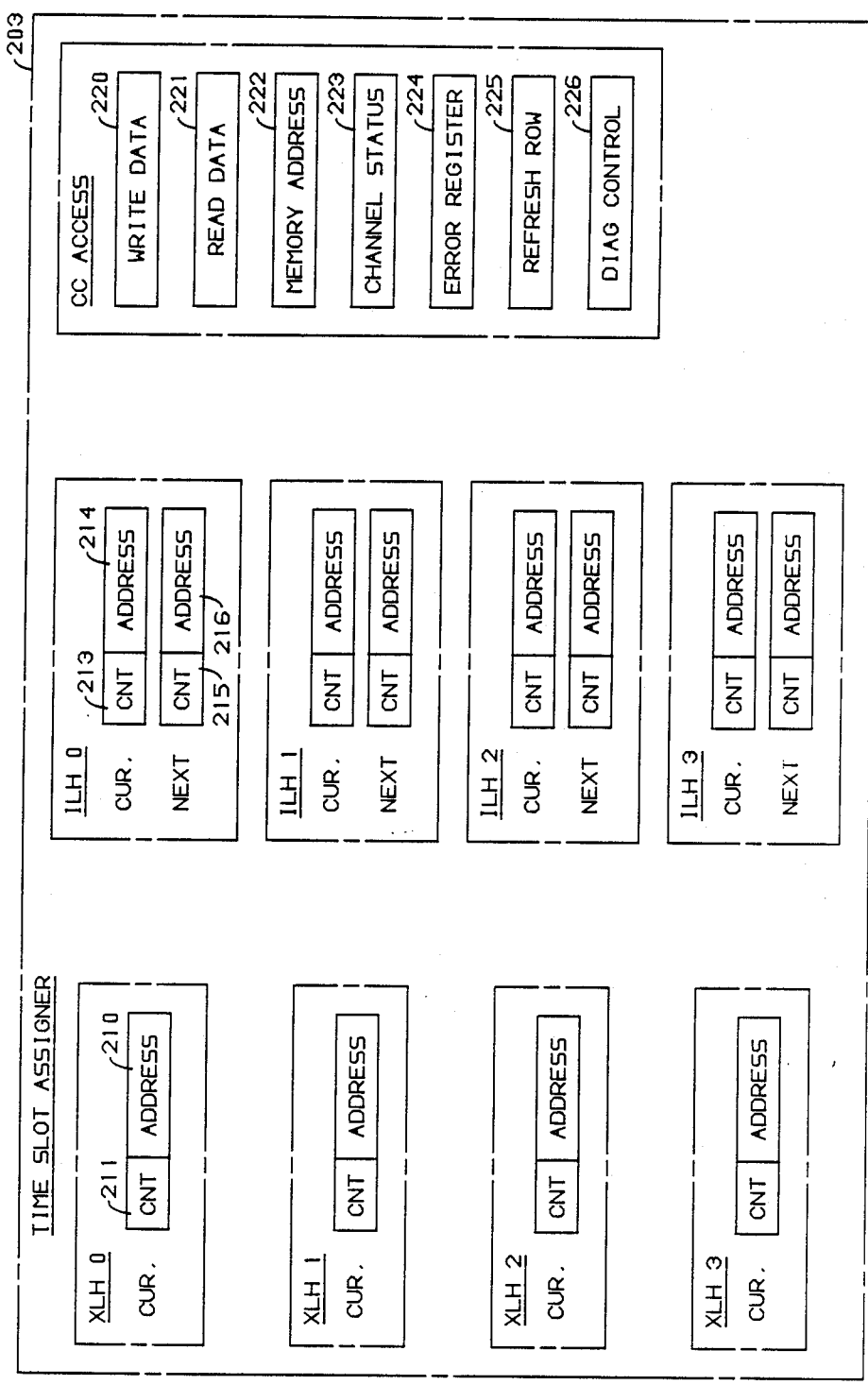
FIGS. 11–14 are block diagrams and data layouts of portions of the data distribution switch of the hub.

From a control viewpoint, the TSA appears as a set of registers as shown in FIG. 11. For each XLH there is an associated address register 210 and count register 211. Each ILH also has address 213 and count 214 registers, but in addition has registers containing the next address 215 and count 216, thus allowing a series of blocks to be read from memory in a continuous stream with no inter-block gaps. A special set of registers 220-226 allows the MINT's central control section to access any of the internal registers in the TSA or to perform a directed read or write of any particular word in memory. These registers include a write data register 220 and read data register 221, a memory address register 222, channel status register 223, error register 224, memory refresh row address register 225, and diagnostic control register 226.

4.3.2.2 Operation

In normal operation, the TSA 203 receives only four order types from the ring interface logic: (1) "write" requests for data received by an XLH, (2) "read" requests for an ILH, (3) "new address" commands issued by either an XLH or an ILH, and (4) "idle cycle" indications which tell the TSA to perform a refresh cycle or other special operation. Each order is accompanied by the identity of the link handler involved and, in the case of "write" and "new address" requests, by 32 bits of data.

For a "write" operation, the TSA 203 simply performs a memory write cycle using the address from the register associated with the indicated XLH 16 and the data provided by the ring interface logic. It then increments the address register and decrements the count register. The count register is used in this case only as a safety check since the XLH should provide a new address before overflowing the current block.

For a "read" operation, the TSA 203 must first check whether the channel for this ILH is active. If it is, the TSA performs a memory read cycle using the address from the register for this ILH 17 and presents the data to the ring interface logic. It also increments the address register and decrements the count register. In any case, the TSA provides the interface logic with two "tag" bits which indicate (1) no data available, (2) data available, (3) first word of packet available, or (4) last word of packet available. For case (4), the TSA will load the ILH's address 214 and count 213 registers from its "next address" 216 and "next count" 215 registers, provided that the these registers have been loaded by the ILH. If they have not, the TSA marks the channel "inactive".

From the above descriptions, the function of a "new address" operation can be inferred. The TSA 203 receives the link identity, a 24-bit address, and an 8-bit count. For an XLH 16, it simply loads the associated registers. In the case of an ILH 17, the TSA must check whether the channel is active. If it is not, then the normal address 214 and count 213 registers are loaded and the channel is marked active. If the channel is currently active, then the "next address" 216 and "next count" 215 registers must be loaded instead of the normal address and count registers.

In an alternative embodiment, the two tag bits are also stored in buffer memory 201, ..., 202. Advantageously, this permits packet sizes that are not limited to being a multiple of the overall width of the memory (512 bits). In addition, the ILH 17 need not provide the actual length of the packet when reading it, thus relieving the central control 20 of the need to pass along this information to the ILH.

4.4 Data Transport Ring

It is the job of the Data Transport Ring 19 to carry control commands and high-speed data between the link handlers 16,17 and the memory modules 201, ..., 202. The ring provides sufficient bandwidth to allow all the links to run simultaneously, but carefully apportions this bandwidth so that circuits connecting to the ring are never required to transfer data in high-speed bursts. Instead, a fixed time slot cycle is employed that assigns slots to each circuit at well-spaced intervals. The use of this fixed cycle also means that source and destination addresses need not be carried on the ring itself since they can be readily determined at any point by a properly synchronized counter.

4.4.1 Electrical Description

The ring is 32 data bits wide and is clocked at 24 MHz. This bandwidth is sufficient to support data rates of up to 150M bit/s. In addition to the data bits, the rings contains four parity bits, two tag bits, a sync bit to identify the start of a superframe, and a clock signal. Within the ring, single-ended ECL circuitry is used for all signals except the clock, which is differential ECL. The ring interface logic provides connecting circuits with TTL-compatible signal levels.

4.4.2 Time Slot Sequencing Requirements

In order to meet the above objectives, the time slot cycle is subject to a number of constraints:

1. During each complete cycle there must be a unique time slot for each combination of source and destination.
2. Each connecting circuit must see its data time slots appearing at reasonably regular intervals. Specifically, each circuit must have a certain minimum interval between its data time slots.
3. Each link handler must see its data time slots in numerical order by memory module number. (This is to avoid making the link handler shuffle a 512-bit word.)
4. Each TSA must have a known interval during which it can perform a refresh cycle or other miscellaneous memory operation.
5. Since the TSAs in the memory modules must examine every control time slot, there must also be a minimum interval between control time slots.

4.4.3 Time Slot Cycle

Table I shows one data frame of a timing cycle which meets these requirements. One data frame consists of a total of 80 time slots, of which 64 are used for data and the remaining 16 for control. The table shows, for each memory module TSA the slot during which it receives data from each XLH to be written into memory and during which it must supply data that was read from memory for each ILH. Every fifth slot is a control time slot during which the indicated link handler broadcasts control orders to all the TSAs. For the purposes of this table, XLHs and ILHs are numbered 0–3, and TSAs are numbered 0–15. TSA 0, for example, during time slot 0 receives data from XLH 0 and must supply data for ILH 0. During slot 17, TSA 0 performs similar operations for XLH 2 and ILH 2. Slot 46 is used for XLH 1 and ILH 1, and slot 63 is used for XLH 3 and ILH 3. The re-use of the same time slot for reading and writing is permissible since XLHs never read from memory and ILHs never write, thus effectively doubling the data bandwidth of the ring.

The control time slots are assigned, in sequence, to the four XLHs, the four ILHs, and the central control (CC). With these nine entities sharing the control time slots, the control frame is 45 time slots long. The 80-slot data frame and the 45-slot control frame come into alignment every 720 time slots. This period is the superframe and is marked by the superframe sync signal.

There is a subtle synchronization condition that must also be met for the ILHs. The words of a block must be sent in sequence beginning with word O, regardless of where in the ring timing cycle the order was received. To assist in meeting this requirement, the ring interface circuitry provides a special "word O" sync signal for each ILH. For example, in the timing cycle of Table I a new address might be sent by ILH 0 during time slot 24 (its control time slot). It is necessary to ensure that TSA number 0 is the first TSA to act on this new address (requirement 3 in section 4.4.2) even though the data time slots for reads from TSAs numbered 5 through 15 for ILH 0 immediately follow time slot 24.

Since the number of time slots in the superframe, 720, exceeds the number of elements on the ring, 25, it is apparent that the logical time slots do not have a permanent existence; each time slot is, in effect, created at a particular physical location on the ring and propagates around the ring until it returns to this location, where it vanishes. The effective creation point is different for data time slots than for control time slots.

TABLE I

| | RING TIME SLOT ASSIGNMENT | | | | |
|---|---|---|---|---|---|
| Time Slot | Write to TSA | From XLH | Read from TSA | To ILH | Control Slot Source |
| 00 | 0 | 0 | 0 | 0 | |
| 01 | 7 | 1 | 7 | 1 | |
| 02 | 13 | 2 | 13 | 2 | |
| 03 | 4 | 3 | 4 | 3 | |
| 04 | | | | | XLH0 |
| 05 | 1 | 0 | 1 | 0 | |
| 06 | 8 | 1 | 8 | 1 | |
| 07 | 14 | 2 | 14 | 2 | |
| 08 | 5 | 3 | 5 | 3 | |
| 09 | | | | | XLH1 |
| 10 | 2 | 0 | 2 | 0 | |
| 11 | 9 | 1 | 9 | 1 | |
| 12 | 15 | 2 | 15 | 2 | |
| 13 | 6 | 3 | 6 | 3 | |
| 14 | | | | | XLH2 |
| 15 | 3 | 0 | 3 | 0 | |
| 16 | 10 | 1 | 10 | 1 | |
| 17 | 0 | 2 | 0 | 2 | |
| 18 | 7 | 3 | 7 | 3 | |
| 19 | | | | | XLH3 |
| 20 | 4 | 0 | 4 | 0 | |
| 21 | 11 | 1 | 11 | 1 | |
| 22 | 1 | 2 | 1 | 2 | |
| 23 | 8 | 3 | 8 | 3 | |
| 24 | | | | | ILH0 |
| 25 | 5 | 0 | 5 | 0 | |
| 26 | 12 | 1 | 12 | 1 | |
| 27 | 2 | 2 | 2 | 2 | |
| 28 | 9 | 3 | 9 | 3 | |
| 29 | | | | | ILH1 |
| 30 | 6 | 0 | 6 | 0 | |
| 31 | 13 | 1 | 13 | 1 | |
| 32 | 3 | 2 | 3 | 2 | |
| 33 | 10 | 3 | 10 | 3 | |
| 34 | | | | | ILH2 |
| 35 | 7 | 0 | 7 | 0 | |
| 36 | 14 | 1 | 14 | 1 | |
| 37 | 4 | 2 | 4 | 2 | |
| 38 | 11 | 3 | 11 | 3 | |
| 39 | | | | | ILH3 |
| 40 | 8 | 0 | 8 | 0 | |
| 41 | 15 | 1 | 15 | 1 | |
| 42 | 5 | 2 | 5 | 2 | |
| 43 | 12 | 3 | 12 | 3 | |
| 44 | | | | | CC |
| 45 | 9 | 0 | 9 | 0 | |
| 46 | 0 | 1 | 0 | 1 | |
| 47 | 6 | 2 | 6 | 2 | |

TABLE I-continued

RING TIME SLOT ASSIGNMENT

| Time Slot | Write to TSA | From XLH | Read from TSA | To ILH | Control Slot Source |
|---|---|---|---|---|---|
| 48 | 13 | 3 | 13 | 3 | |
| 49 | | | | | XLH0 |
| 50 | 10 | 0 | 10 | 0 | |
| 51 | 1 | 1 | 1 | 1 | |
| 52 | 7 | 2 | 7 | 2 | |
| 53 | 14 | 3 | 14 | 3 | |
| 54 | | | | | XLH1 |
| 55 | 11 | 0 | 11 | 0 | |
| 56 | 2 | 1 | 2 | 1 | |
| 57 | 8 | 2 | 8 | 2 | |
| 58 | 15 | 3 | 15 | 3 | |
| 59 | | | | | XLH2 |
| 60 | 12 | 0 | 12 | 0 | |
| 61 | 3 | 1 | 3 | 1 | |
| 62 | 9 | 2 | 9 | 2 | |
| 63 | 0 | 3 | 0 | 3 | |
| 64 | | | | | XLH3 |
| 65 | 13 | 0 | 13 | 0 | |
| 66 | 4 | 1 | 4 | 1 | |
| 67 | 10 | 2 | 10 | 2 | |
| 68 | 1 | 3 | 1 | 3 | |
| 69 | | | | | ILH0 |
| 70 | 14 | 0 | 14 | 0 | |
| 71 | 5 | 1 | 5 | 1 | |
| 72 | 11 | 2 | 11 | 2 | |
| 73 | 2 | 3 | 2 | 3 | |
| 74 | | | | | ILH1 |
| 75 | 15 | 0 | 15 | 0 | |
| 76 | 6 | 1 | 6 | 1 | |
| 77 | 12 | 2 | 12 | 2 | |
| 78 | 3 | 3 | 3 | 3 | |
| 79 | | | | | ILH2 |

4.4.3.1 Data Time Slots

Data time slots can be considered to originate at the owning XLH. A data time slot is used to carry incoming data to its assigned memory module, at which point it is re-used to carry outgoing data to the corresponding ILH. Since XLHs never receive information from a data time slot, the ring can be considered to be logically broken (for data time slots only) between the ILHs and the XLHs.

The two tag bits identify the contents of the data time slots as follows:

| | |
|---|---|
| 11 | Empty |
| 10 | Data |
| 01 | First word of packet |
| 00 | Last word of packet |

The "first word of packet" is sent only by memory module 0 when it sends the first word of a packet to an ILH. The "last word of packet" indication is sent only by memory module 15 when it sends the end of a packet to an ILH.

4.4.3.2 Control Time Slots

Control time slots originate and terminate at the station of central control 20 on the ring. The link handlers use their assigned control slots only to broadcast orders to the TSAs. The CC is assigned every ninth control time slot. The TSAs receive orders from all control time slots and send responses back to the CC on the CC control time slot.

The two tag bits identify the contents of a control time slot as follows:

| | |
|---|---|
| 11 | Empty |
| 10 | Data (to or from CC) |
| 01 | Order |
| 00 | Address & count (from a link handler) |

4.5 External Link Handler

Figure 12:
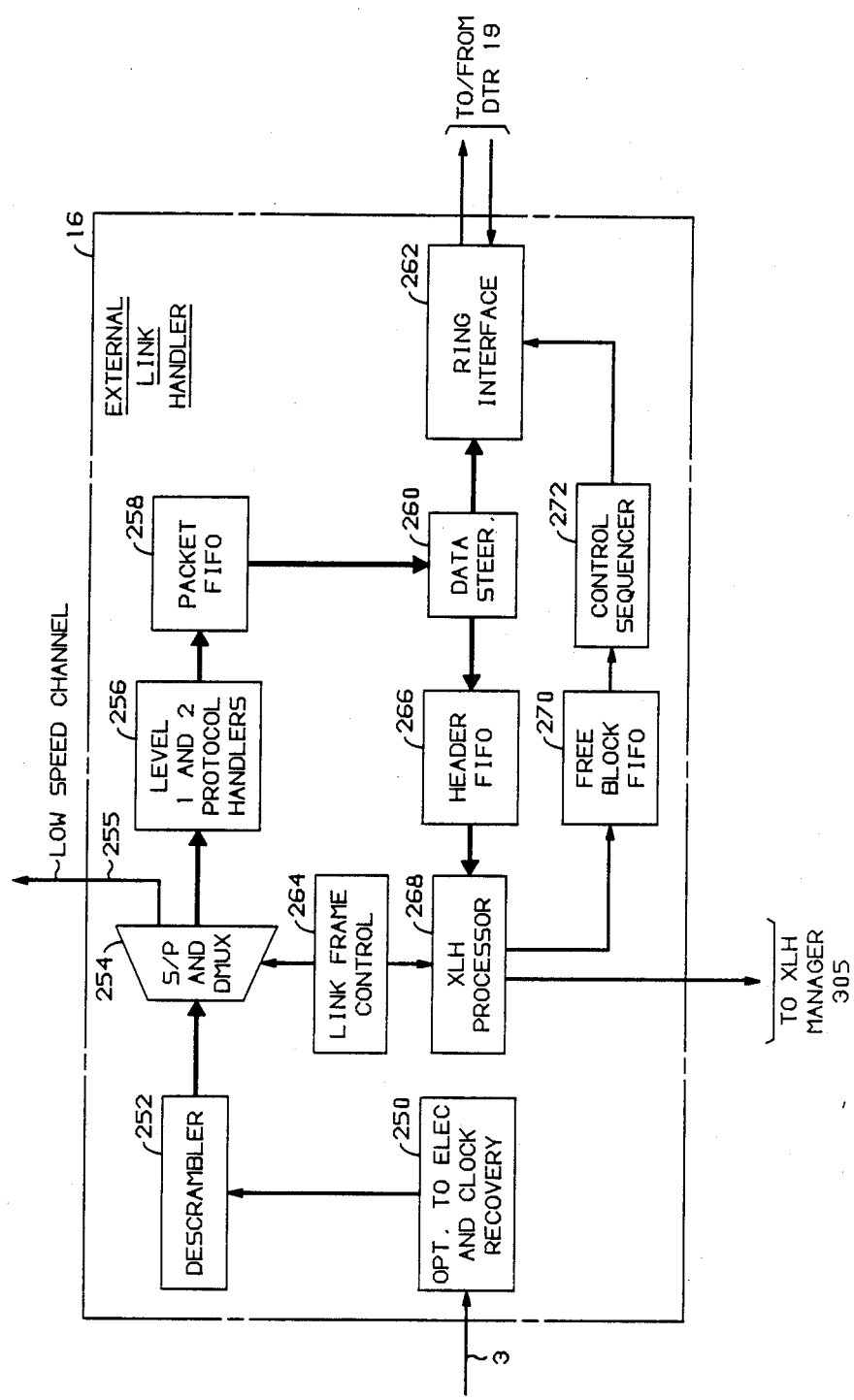

The principal function of the XLH is to terminate the incoming high-speed data channel from a NIM, deposit the data in the MINT's buffer memory, and pass the necessary information to the MINT's central control 20 so that the data can be forwarded to its destination. In addition, the XLH terminates an incoming low-speed control channel that is multiplexed on the fiber link. Some of the functions assigned to the low-speed control channel are the transmission of the NIM status and control of flow in the network. It should be noted that the XLH is only terminating the incoming fiber from the NIM. Transmission to the NIM is handled by the internal link handler and the phase alignment and scrambler circuit that will be described later. The XLH uses an onboard processor 268 to interface to the hardware of the MINT central control 20. The four 20M bit/sec links coming from this processor provide the connectivity to the central control section of the MINT. FIG. 12 shows an overall view of the XLH.

4.5.1 Link Interface

The XLH contains the fiber optic receiver, clock recovery circuit and descrambler circuit needed to recover data from the fiber. After the data clock is recovered (block 250) and the data descrambled (block 252) the data is then converted from serial to parallel and demultiplexed (block 254) into the high-speed data channel and the low-speed data channel. Low level protocol processing is then performed on the data on the high-speed data channel (block 256) as described in §5. This results in a data stream consisting of only packet data. The stream of packet data then goes through a first-in-first-out (FIFO) queue 258 to a data steering circuit 260 which steers the header into the header FIFO 266 and sends the complete packet to the XLH's ring interface 262.

4.5.2 Ring Interface

The ring interface 262 logic controls transfer of data from the packet FIFO 258 in the link interface to the MINT's buffer memory. It provides the following functions:

1. Establishing and maintaining synchronization with the ring's timing cycle.
2. Transfer of data from the link interface FIFO to the proper ring time slots.
3. Sending a new address to the memory TSAs when the end of a packet is encountered.

It should be noted that resynchronization with the ring's 16-word (per XLH) timing cycle will have to be perfomed during the processing of a packet whenever the link interface FIFO becomes temporarily empty. This will be a normal occurrence since the ring's bandwidth is higher than the link's transmission rate. The ring and TSA, however, are designed to accommodate gaps in the data stream. Thus, resynchronization consists simply of waiting for data to become available and for the ring cycle to return to the proper word number, marking the intervening time slots "empty". For example, if the FIFO 258 becomes empty when a word destined for the fifth memory module is needed, it is necessary to ensure that the next word actually sent goes to that memory module, in order to preserve the overall sequence.

4.5.3 Control

The control portion of the XLH is responsible for replenishing the free block FIFO 270 and passing the header information about each packet received to the MINT's central control 20 (FIG. 4).

4.5.3.1 Header Processing

At the same time a packet is being transmitted on the ring, the header of the packet is deposited in the header FIFO 266 that is subsequently read by the XLH processor 268. In this header are the source and destination address fields, which the central control will require for routing. In addition, the header checksum is verified to ensure that these fields have not been corrupted. The header information is then packaged with a memory block descriptor (address and length) and sent in a message to the central control 20 (FIG. 4).

4.5.3.2 Interaction with Central Control

There are only two basic interactions with the MINT's central control. The XLH control attempts to keep its free-block FIFO 270 full with block addresses obtained from the memory manager, and it passes header information and memory block descriptors to the central control so that the block can be routed to its destination. The block address are subsequently placed on the ring 19 by ring interface 262 upon receipt of the address from control sequencer 272. Both interactions with the central control are carried out over links from XLH processor 268 to the appropriate sections of the central control.

4.6 Internal Link Handler

The internal link handler (ILH) (FIG. 13) is the first part of what can be considered a distributed link controller. At any instant in time this distributed link controller consists of a particular ILH, a path through the switch fabric and a particular Phase Alignment and Scrambler circuit 290 (PASC). The PASC is described in section 6.1. It is the PASC that is actually responsible for the transmission of optical signals over the return fiber of fiber pair 3 to the NIM from the MINT. The information that is transmitted over the fiber comes from the MANS 10, which receives inputs at different times from the ILHs sending to that NIM. This kind of distributed link controller is necessary since path lengths through the MAN switch fabric are not all equal. If the PASC did not align all of the information coming from different ILHs to the same reference clock, information received by the NIM would be continually changing its phase and bit alignment.

The combination of the ILH with the PASC is in many ways a mirror image of the XLH. The ILH receives lists of block descriptors from the central control, reads these blocks from memory, and transmits the data over the serial link to the switch. As data is received from memory, the associated block descriptor is sent to the central control's memory manager so that the block can be returned to the free list.

The ILH differs from the XLH in that the ILH performs no special header processing, and the TSAs provide the ILH with additional pipelining so that multiple blocks can be transmitted as a continuous stream if desired.

4.6.1 Link Interface

The link interface 289 provides the serial transmitter for the data channel. Data is transmitted in a frame-synchronous format compatible with the link data format described in §5. Since the data is received from the ring interface 280 (see below) asynchronously and at a rate somewhat higher that the link's average data rate, the link interface contains a FIFO 282 to provide speed matching and frame synchronization. The data is received from MINT memory via data ring interface 280, stored in FIFO 282, is processed by level 1 and 2 protocol handler 286, and is transmitted to MAN switch 10 through the parallel to serial converter 288 within link interface 289.

4.6.2 Ring Interface

The ring interface 280 logic controls the transfer of data from the MINT's buffer memory to the FIFO in the link interface. It provides the following functions:

1. Establishing and maintaining synchronization with the ring's timing cycle.
2. Transfer of data from the ring to the link interface FIFO during the proper ring time slots.
3. Notifying the control section when the last word of a packet (memory block) is received.
4. Sending a new address and count (if available) to the memory TSAs 203, . . . , 204 (FIG. 10) when the last word of a packet is received and the condition of the FIFO 282 is such that the new packet will not cause an overflow.

Unlike the XLH, the ILH relies on the TSAs to ensure that data words are received in sequence and with no gaps within a block. Thus, maintaining word synchronization in this case consists simply of looking for unexpected empty data time slots.

4.6.3 Control

The control portion of the ILH, controlled by sequencer 283 is responsible for providing the ring interface with block descriptors received via the processor link interface 284 from the central control and stored therefrom in address FIFO 285, notifying the central control via the processor link interface when blocks have been retrieved from memory, and notifying the central control 20 when transmission of the final block is complete.

4.6.3 Interaction with Central Control

There are only three basic interactions with the MINT's central control:

1. Receiving lists of block descriptors.
2. Informing the memory manager of blocks that have been retrieved from memory.
3. Informing the switch request queue manager when all blocks have been transmitted.

In the present design, all of these interactions are carried out over Transputer links to the appropriate sections of the central control.

4.6.3.2 Interaction with TSAs

Like the XLH, the ILH uses its control time slots to send block descriptors (address and lengths) to the TSAs. When the TSAs receive a descriptor from an ILH, however, they will immediately begin reading the block from memory and placing the data on the ring. The length field from an ILH is significant and determines the number of words that will be read by each TSA before moving on the next block. The TSAs also provide each ILH with registers to hold the next address and length, so that successive blocks can be transmitted without gaps. Flow control is the responsibility of the ILH, however, and a new descriptor should not be sent to the TSAs until there is enough room in the packet FIFO 282 to compensate for reframing time and the difference in transmission rates.

4.7 MINT Central Control

Figure 14:
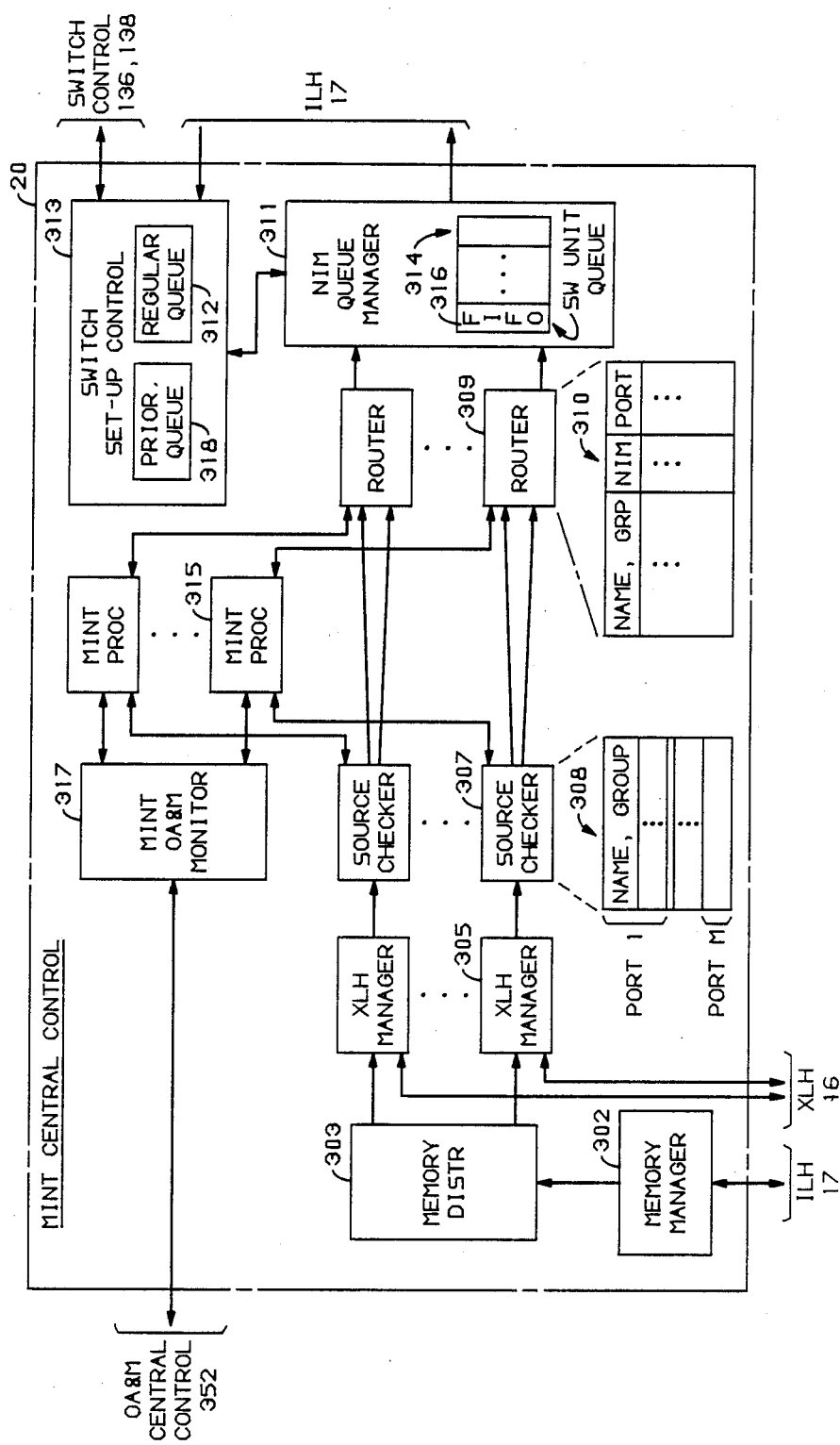
Figure 15:
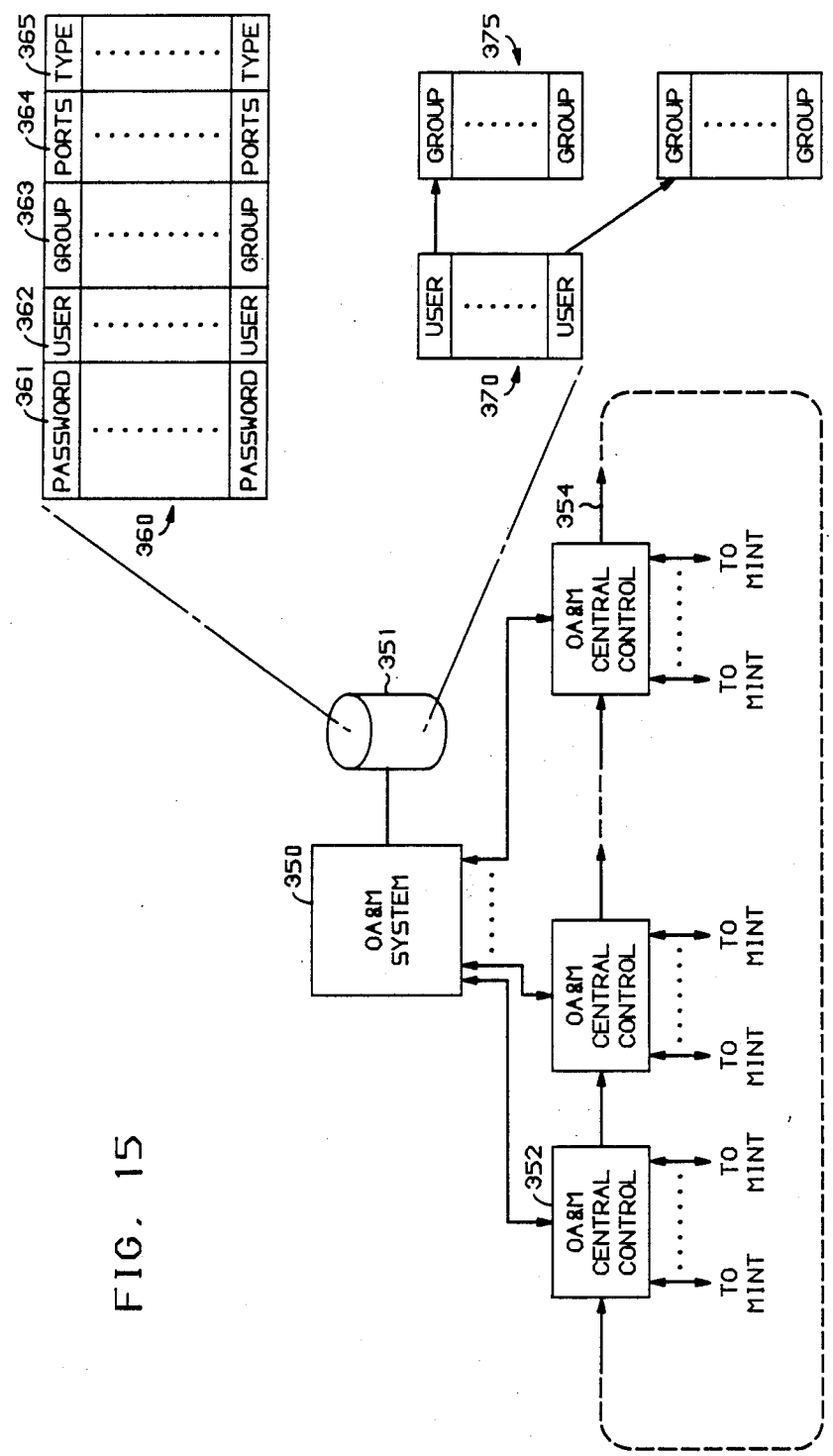
FIG. 15 is a block diagram of an operation, administration, and maintenance (OA&M) system for controlling the data distribution stage of the hub.

FIG. 14 is a block diagram of MINT central control 20. This central control is connected to the four XLH 16s of the MINT, the four ILH 17s of the MINT, to data concentrator 136 and distributor 138 of the switch control (See FIG. 7), and to an OA&M central control 352 shown in FIG. 15. The relationship of the central control 20 with other units will first be discussed.

The MINT central control communicates with XLH 16 to provide memory block addresses for use by the XLH in order to store incoming data in the MINT memory. XLH 16 communicates with the MINT central control to provide the header of a packet to be stored in MINT memory, and the address where that packet is to be stored. Memory manager 302 of MINT central control 20 communicates with ILH 17 to receive information that memory has been released by an ILH because the message stored in those memory blocks has been delivered, so that the released memory can be reused.

When queue manager 311 recognizes that the first network unit arriving for a particular NIM has been queued in switch unit queue 314, which contains FIFO queues 316 for each possible destination NIM, queue manager 311 sends a request to switch setup control 313 to request a connection in MAN switch 10 to that NIM. The request is stored in one of the queues 318 (priority) and 312 (regular) of switch setup control 313. Switch setup control 313 administers these requests according to their priority and sends requests to MAN switch 10, specifically to switch control data concentrator 136. For normal loads, the queues 318 and 312 should be almost empty since requests can normally be made almost immediately and will generally be processed by the appropriate MAN switch controller. For overload conditions, the queues 318 and 312 become a means for deferring transmission of lower priority packets while retaining the relatively fast transmission of priority packets. If experience so dictates, it may be desirable to move a request from the regular queue to the priority queue if a priority packet for that destination NIM is received. Requests queued in queues 318 and 312 do not tie up an IL, and ILH, and an output link of circuit switch 10; this is in contrast to requests in the queues 150,152 (FIG. 8) of an MAN switch controller 140 (FIG. 7).

When switch setup control 313 recognizes that a connection has been established in switch 10, it notifies NIM queue manager 311. The ILH 17 receives data from a FIFO queue 316 in switch unit queue 314 from NIM queue manager 311 to identify a queue of the memory locations of data packets which may be transmitted to the circuit switch, and for each packet, a list of one or more ports on the NIM to which that packet is to be transmitted. NIM queue manager 311 then causes ILH 17 to prefix the port number(s) to each packet and to transmit data for each packet from memory 18 to switch 10. The ILH then proceeds to transmit the packets of the queue and when it has completed this task, notifies the switch setup control 313 that the connection in the circuit switch may be disconnected and notifies memory manager 302 of the identify of the blocks of memory that can now be released because the data has been transmitted.

The MINT central control uses a plurality of high speed processors each of which have one or more input/output ports. The specific processor used in this implementation is the Transputer manufactured by INMOS Corporation. This processor has four input/outout ports. Such a processor can meet the processing demands of the MINT central control.

Packets come into the four XLHs 16. There are four XLH managers 305, source checkers 307, routers 309, and OA&M MINT processors 315, one corresponding to each XLH within the MINT; these processors, operating in parallel to process the data entering each XLH increase the total data processing capacity of the MINT central control.

The header for each packet entering an XLH is transmitted along with the address where that packet is being stored directly to an associated XLH manager 305, if the header has passed the hardware check of the cyclic redundancy code (CRC) of the header performed by the XLH. If that CRC check fails, the packet is discarded by the XLH which recycles the allocated memory block. The XLH manager passes the header and the identity of allocated memory for the packet to the source checker 307. The XLH manager recycles memory blocks if any of the source checker, router, or NIM queue manager find it impossible to transmit the packet to a destination. Recycled memory blocks get used before memory blocks allocated by the memory manager. Source checker 307 checks whether the source of the packet is properly logged in and whether that source has access to the virtual network of the packet. Source checker 307 passes information about the packet, including the packet address in MINT memory, to router 309 which translates the packet group identification, effectively a virtual network name, and the destination name of the packet in order to find out which output link this packet should be sent on. Router 309 passes the identification of the output link to NIM queue manager 311 which identifies and chains packets received by the four XLHs of this MINT which are headed for a common output link. After the first packet to a NIM queue has been received, the NIM queue manager 311 sends a switch setup request to switch setup control 313 to request a connection to that NIM. NIM queue manager 311 chains these packets in FIFO queues 316 of switch unit queue 314 so that when a switch connection is made in the circuit switch 10, all of these packets may be sent over that connection at one time. Output control signal distributor 138 of the switch control 22 replies with an acknowledgment when it has set up a connection. This acknowledgment is received by switch setup control 313 which informs NIM queue manager 311. NIM queue manager 311 then informs ILH 17 of the list of chained packets in order that ILH 17 may transmit all of these packets. When ILH 17 has completed the transmission of this set of chained packets over the circuit switch, it informs switch setup control 313 to request a disconnect of the connection in switch 10, and informs memory manager 301 that the memory which was used for storing the data of the message is now available for use for a new message. Memory manager 301 sends this release information to memory distributor 303 which distributes memory to the various XLH managers 305 for allocating memory to the XLHs.

Source checker 307 also passes billing information to operation, administration and maintenance (OA&M) MINT processor 315 in order to perform billing for that packet and to accumulate appropriate statistics for checking on the data flow within the MINT and, after combination with other statistics, in the MAN network. Router 309 also informs (OA&M) MINT processor 315 of the destination of the packet so that the OA&M MINT processor can keep track of data concerning packet destinations for subsequent traffic analysis. The output of the four OA&M MINT processors 315 are sent to MINT OA&M monitor 317 which summarizes the data collected by the four OA&M MINT processors for subsequent transmission to OA&M central control 352 (FIG. 14).

MINT OA&M monitor 317 also receives information from OA&M central control 352 for making changes via OA&M MINT processor 315 in the router 309 data; these changes reflect additional terminals added to the network, the movement of logical terminals (i.e., terminals associated with a particular user) from one physical port to another, or the removal of physical terminals from the network. Data is also provided from the OA&M central control 352 via the MINT operation, OA&M monitor and the OA&M MINT processor 315 to source checker 307 for such data as a logical user's password and physical port as well as data concerning the privileges of each logical user.

4.8 MINT Operation, Administration, and Maintenance Control System

FIG. 15 is a block diagram of the maintenance and control system of the MAN network. Operation, administration, and maintenance (OA&M) system 350 is connected to a plurality of OA&M central controls 352. These OA&M controls are each connected to a plurality of MINTs, and within each MINT, to the MINT OA&M monitor 317 of MINT central control 20. Since many of the messages from OA&M system 350 must be distributed to all the MINTs, the various OA&M central controls are interconnected by a data ring. This data ring transmits such data as the identification of the network interface module, hence the indentification of the output link, of each physical port that is added to the network so that this information may be stored in the router processors 309 of every MINT in the MAN hub.

5 LINKS

5.1 Link Requirements

The links in the MAN system are used to transmit packets between the EUS and the NIM (EUSL) (links 14) and between the NIM and the MAN hub (XL) (links 3). Although the operation and the characteristics of the the data that is transferred on these links varies slightly with the particular application, the format used on the links is the same. Having the formats be the same makes it possible use common hardware and software.

The link format is designed to provide the following features.

1. It provides a high data rate packet channel.
2. It is compatible with the proposed Metrobus "OS-1" format.
3. Interfacing is easier because of the word oriented synchronous format.
4. It defines how "packets" are delimited.
5. It includes a CRC for an entire "packet" (and another for the header.)
6. The format insures transparency of the data within a "packet".
7. The format provides a low bandwidth channel for flow control signaling.
8. Additional low bandwidth channels can be added easily.
9. Data scrambling insures good transition density for clock recovery.

5.2 MAN Link Description and Reasoning

From a performance point of view, the faster the links are the better MAN will perform. This desire to operate the links as fast as possible is tempered by the fact that faster links cost more. A reasonable tradeoff between speed and cost is to use LED transmitters (like the AT&T ODL-200) and multimode fiber. The use of ODL-200 transmitters and receivers puts an upper limit on the link speed of about 200M bit/sec. From the MAN architecture point of view, the exact data rate of the links is not important since MAN does not do synchronous switching. The data rate for the MAN links was chosen to be the same as the data rate of the Metrobus Lightwave System "OS-1" link. The Metrobus format is described in M. S. Schaefer: "Synchronous Optical Transmission Network for the Metrobus Lightwave Network", *IEEE International Communications Conference*, June 1987, Paper 30B.1.1. Another data rate (and format) that could be used in MAN will come from the specification of SONET, a link layer protocol specified by Bell Communications Research Corp. for 150M bit/sec unchannelized links.

5.2.1 Level 1 Link Format

The MAN network uses the low level link format of Metrobus. Information on the link is carried by a simple frame that is continuously repeated. The frame consists of 88-16 bit words. The first word contains a framing sequence and 4 parity bits. In addition to this first word, three other words are overhead words. These overhead words, which are used for internode communications in the Metrobus implementation, are not used by MAN for the sake of Metrobus compatibility. The word oriented nature of the protocol makes using it much simpler. A simple 16 bit shift register with parallel load can be used to transmit and a similar shift register with parallel read out can be used to receive. At the 146.432M bit/sec. link data rate, a 16 bit word is transmitted or received every 109ns. This approach makes it possible to implement much of the link formatting hardware at conventional TTL clock rates. The word oriented nature of the protocol does put some restrictions on the way the link is used, however. To keep the complexity of the hardware reasonable it is necessary to use the bandwidth of the link in units of 16 bit words.

5.2.2 Level 2 Link Format

The link is used to move "packets", the basic unit of information transfer in MAN. To identify packets, the format includes the specification of "SYNC" words and an "IDLE" word. When no packets are being transmitted the "IDLE" word will fill all of the words that make up the primary channel bandwidth (words not reserved for other purposes). Packets are delimited by a leading START_SYNC and a trailing END_SYNC word. This scheme works well as long as the words with special meanings are never contained in the data within a packet. Since restricting the data that can be sent in a packet is an unreasonable restriction, a transparent data transfer technique must be used. MAN links employ a very simple word stuffing transparency technique. Within the packet data, any occurrence of a special meaning word, like the START_SYNC word, is preceded by another special word the "DLE" word. This word stuffing transparency was chosen because of the simplicity of implementation. This protocol requires simpler, lower speed logic than is required for bit stuffing protocols like HDLC. The technique itself is similar to the time proven techniques used in IBM's BISYNC links. In addition to the word stuffing used to ensure transparency, "FILL" words are inserted if the data rate of the source is slightly less than the link data rate.

The last word in any packet is a cyclic redundancy check (CRC) word. This word is used to insure the that any corruption of the data in a packet can be detected.

The CRC word is computed on all of the data in the packet, excluding any special words like "DLE" that may need to be inserted in the data stream for transparency or other reasons. The polynomial that is used to compute the CRC word is the CRC-16 standard.

To ensure good transition density for the optical receivers all of the data is scrambled (e.g., block 296, FIG. 13) prior to transmission. The scrambling makes it less likely that long sequences of ones or zeros will be transmitted on the link even though they may be quite common in the data actually being transmitted. The scrambler and descrambler (e.g., block 252, FIG. 12) are well known in the art. The descrambler design is self synchronizing, which makes it possible to recover from occasional bit errors without having to restart the descrambler.

5.2.3 Low Speed Channels and Flow Control

Not all of the payload words in the level 1 format are used for the level 2 format that carries packets. Additional channels are included on the link by dedicating particular words within the frame. These low rate channels 255,295 (FIGS. 12 and 13) are used for MAN network control purposes. A packet delimiting scheme similar to that used on the primary data channel is used on these low rate channels. The dedicated words that make up low rate channels can be further divided down into individual bits for very low bandwidth channels like the flow control channel. The flow control channel is used on the MAN EUSL (between the EUS and the NIM) to provide hardware level flow control. The flow control channel (bit) from the NIM to the EUS, indicates to the EUS link transmitter whether or not it is allowed to transmit more information. The design of the NIM is such that sufficient storage is available to absorb any data that is transmitted prior to the EUS transmitter actually stopping after flow control is asserted. Data transmission can be stopped either between packets or in the middle of a packet transmission. If it is between packets, the next packet will not be sent until flow control is turned deasserted. If flow control is asserted in the middle of a packet, it is necessary to suspend data transmission immediately and start sending the "Special FILL" code word. This code word, like all others, is escaped with the "DLE" code word when it appears in the body of a packet.

6 SYSTEM CLOCKING

The MAN switch, as described in section 3, is an asynchronous space switch fabric with a very fast setup controller. The data fabric of the switch is design to reliably propagate digital signals with data rates from DC to in excess of 200M bit/second. Since many paths can simultaneously exist through the fabric, the aggregate bandwidth requirements of the MAN hub can be easily meet by the fabric. This simple data fabric is not without drawbacks however. Because of mechanical and electrical constraints in implementing the fabric, it is not possible for all paths through the switch to incur the same amount of delay. Because the variations in path delay between different paths may be much greater than the bit time of the data going through the switch, it is not possible to do synchronous switching. Any time that a path is setup from a particular ILH in a MINT to an output port of the switch, there is no guarantee that data transmitted over that path will have the same relative phase as the data transmitted over a previous path through the switch. To use this high bandwidth switch it is therefore necessary to very quicly synchronize data coming out of a switch port to the clock being used for the synchronous link to the NIM.

6.1 The Phase Alignment and Scrambler Circuit (PASC)

Figure 13:
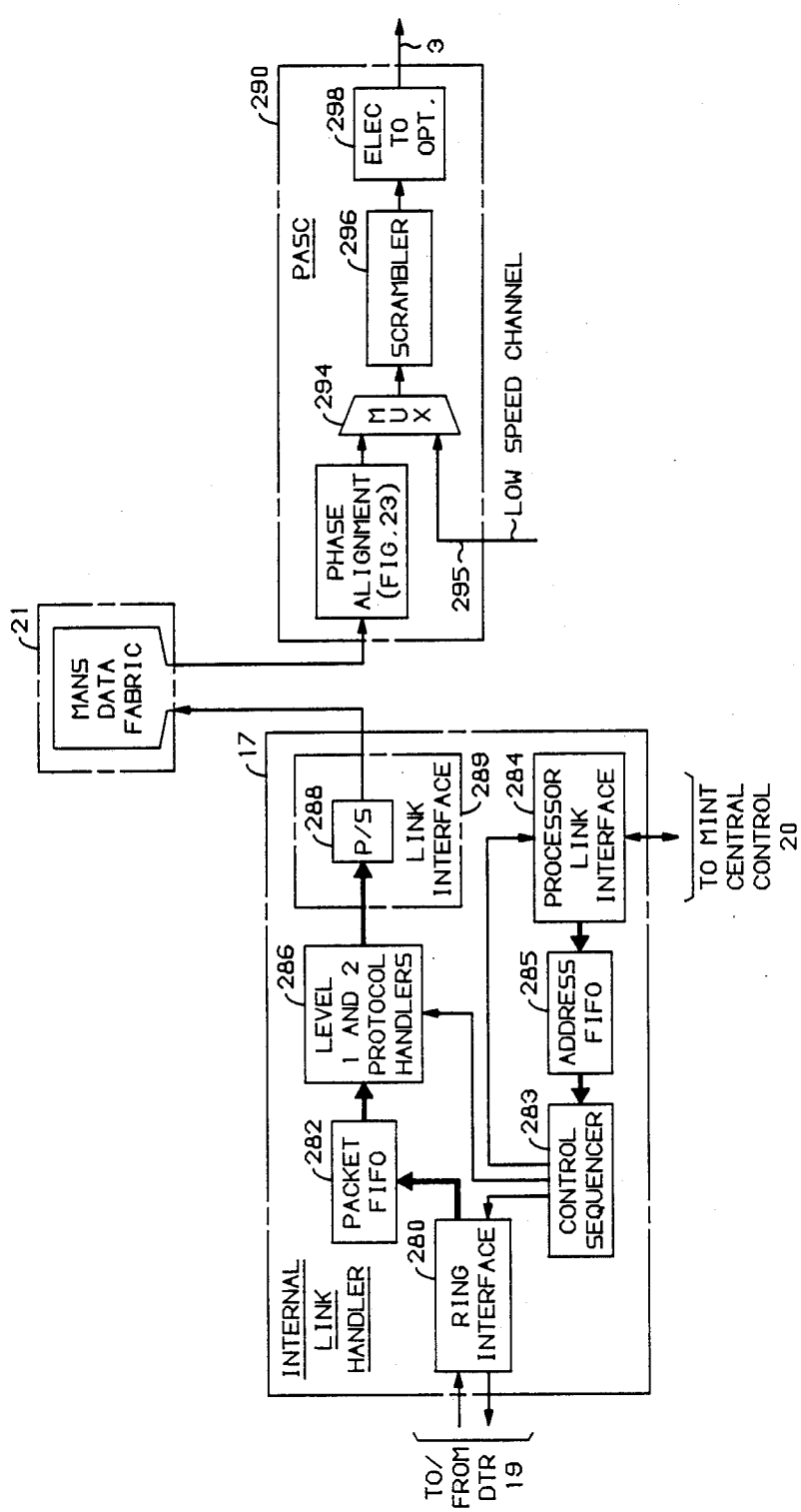

The unit that must do the synchronization of data coming from the switch and drive the outgoing link to the NIM called the Phase Alignment and Scrambler Circuit (PASC) (block 290, FIG. 13). Since the ILHs and the PASC circuits are all part of the MAN hub, it is possible to distribute the same master clock to all of them. This has several advantages. By using the same clock reference in the PASC as is used to transmit data from the ILH, one can be sure that data can not be coming into the PASC any faster than it is being moved out of it over the link. This eliminates the need for large FIFOs and elaborate elastic store controllers in the PASC. The fact that the bit rate of all data that comes into a PASC is exactly the the same makes the synchronization easier.

The ILH and the PASC can be thought of as a distributed link handler for the format described in the previous section. The ILH creates the basic framing pattern into which the data is inserted and transmits it through the fabric to a PASC. The PASC aligns this framing pattern with its own framing pattern, merges in the low speed control channel and then scrambles the data for transmission.

The PASC synchronizes the incoming data to the reference clock by inserting an appropriate amount of delay into the data path. For this to work the ILH must be transmitting each frame with a reference clock that is slightly advanced from the reference clock used by the PASC. The number of bit times of advance that the ILH requires is determined by the actual minimum delay that may be incurred in getting from the ILH to the PASC. The amount of delay that the PASC must be capable of inserting into the data path is dependent on the possible variation in path delays that may occur for different paths through the switch.

Figure 23:
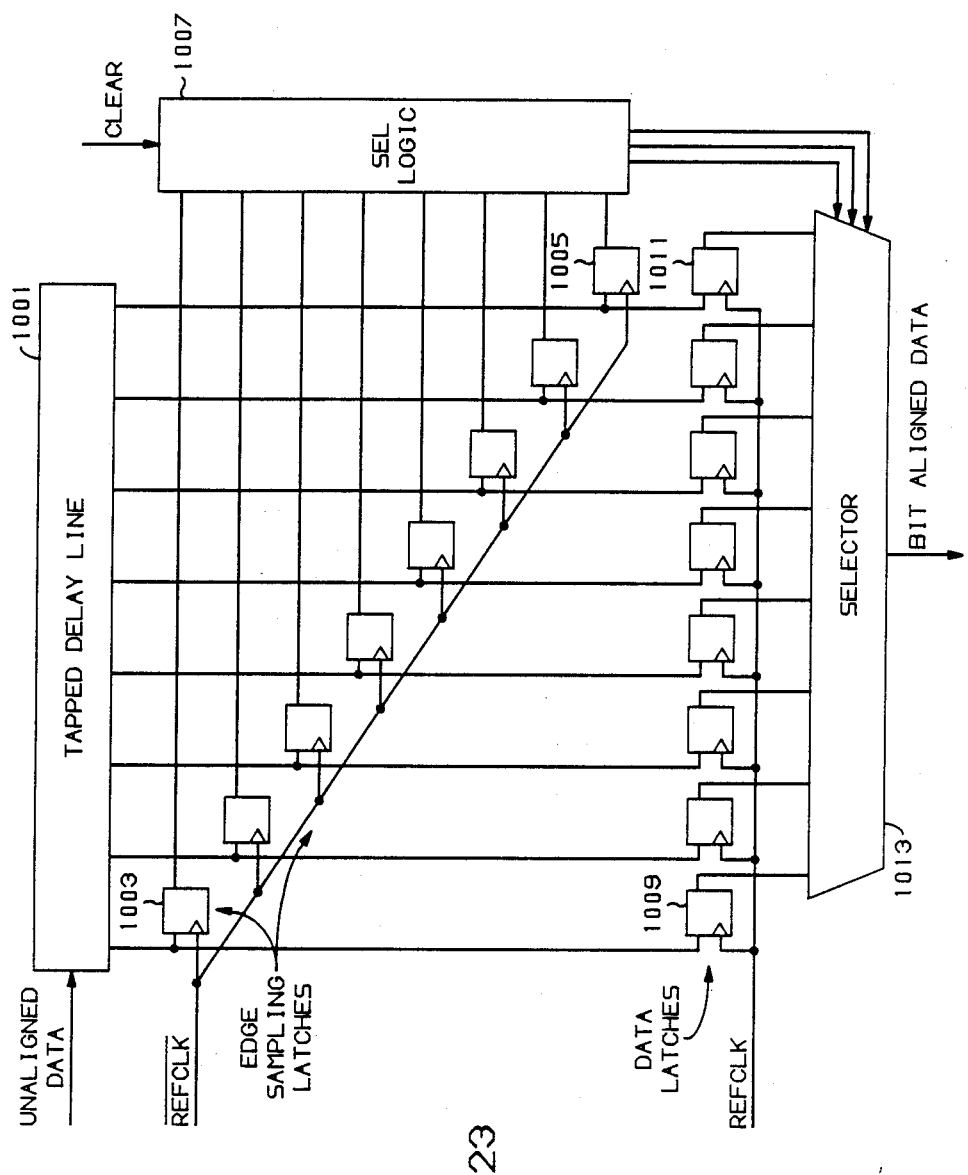
FIG. 23 illustrates an arrangement for synchronizing data received from the circuit switch by one of the data distribution switches.

FIG. 23 is a block diagram of an illustrative embodiment of the invention. Unaligned data enters a tapped delay line 1001. The various taps of the delay line are clocked into edge sampling latches 1003, ..., 1005 by a signal that is 180 degrees out of phase with the reference clock (REFCLK) and is designated $\overline{\text{REFCLK}}$. The outputs of the edge sampling latches feed selection logic unit 1007 whose output is used to control a selector 1013 described below. Selection logic 1007 includes a set of internal latches for repeating the state of latches 1003, ..., 1005. The selection logic includes a priority circuit connected to these internal latches, for selecting the highest rank order input which carries a logical "one". The output is a coded identification of this selected input. The selection logic 1007 has two gating signals: a clear signal and a signal from all of a group of internal latches of the selection logic. Between data streams, the clear signal goes to a zero state causing the internal latches to accept new inputs. After the first "one" input has been received from the edge sampling latches 1003, ..., 1005 in response to the first pulse of a data stream, the state of the transparent latches is maintained until the clear signal goes back to the zero state. The clear signal is set by out of band circuitry which recognizes the presence of a data stream.

The output of the tapped delay line also goes to a series of data latches 1009, ..., 1011. The input to the data latches is clocked by the reference clock. The outputs of the data latches 1009, ..., 1011 are the inputs to selector circuit 1013 which selects the output of one of these data latches based on the input from selection logic 1007 and connects this output to the output of the selector 1013, which is the bit aligned data stream as labeled on FIG. 23.

After the bits have been aligned, they are fed into a shift register (not shown) with tapped outputs to feed the driver XL3. This is to allow data streams to be transmitted synchronously starting at sixteen bit boundaries. The operation of the shift register and auxiliary circuitry is substantially the same as that of the tapped delay line arrangement.

The selection logic is implemented in commercially available priority selection circuits. The selector is simply a one out of eight selector controlled by the output of the selection logic. If it is necessary to have a finer alignment circuit using a one of sixteen selection, this can be readily implemented using the same principles. The arrangement described herein apperas to be especially attractive in situations where there is a common source clock and where the length of each data stream is limited. The common source clock is required since the clock is not derived from the incoming signal, but is, in fact, used to gate an incoming signal appropriately. The limitation on the length of the block is required since a particular gating selection is maintained for the entire block so that if the block length were too long, any substantial amount of phase wandering would cause synchronism to be lost and bits to be dropped.

While in the present embodiment, the signal is passed through a tapped delay line and is sampled by the clock and inverse clock, the alternative arrangement of passing the clock through a tapped delay line and using the delayed clocks to sample the signal could also be used in some applications.

6.2 Clock Distribution

The MAN hub operation is very dependent on the use of a single master reference clock for all of the ILH and PASC units in the system. The master clock must be distributed accurately and reliably to all of the units. In addition to the basic clock frequency that must be distributed, the frame start pulse must be distributed to the PASC and an advanced frame start pulse must be distributed to the ILH. All of these functions are handled by using a single clock distribution link (fiber or twisted pair) going to each unit.

The information that is carried on these clock distribution links comes from a single clock source. This information can be split in the electrical and/or optical domain and transmitted to as many destinations as necessary. There is no attempt to keep the information on all of the clock distribution links exactly in phase since the ILH and PASC are capable of correcting for phase differences no matter what the reason for this difference. The information that is transmitted is simply alternating ones and zeros with two exceptions. The occurrence of two ones in a row indicates an advanced frame pulse and the occurrence of two zeroes in a row indicates a normal frame pulse. Each board that terminates one of these clock distribution links contains a clock recovery module. The clock recovery module is the same as that used for the links themselves. The clock recovery module will provide a very stable bit clock while additional logic extracts the appropriate frame or advanced frame from the data itself. Since the clock recovery modules will continue to oscillate at the correct frequency even without bit transitions for several bit times, even the unlikely occurrence of a bit error will not affect the clock frequency. The logic that looks for the frame or advanced frame signal can also be made tolerant of errors since it is known that the frame pulses are periodic and extraneous pulses caused by bit errors can be ignored.

7 NETWORK INTERFACE MODULE

7.1 Overview

The network interface module (NIM) connects one or more end user system links (EUSL) to one MAN external link (XL). In so doing, the NIM performs concentration and demultiplexing of network transaction units (i.e. packets and SUWUs), as well as insuring source identification integrity by affixing a physical "source port number" to each outgoing packet. The latter function, in combination with the network registration service described in §2.4, prevents a user from masquerading as another for the purpose of gaining access to unauthorized network-provided services. The NIM thereby represents the boundary of the MAN network proper; NIMs are owned by the network provider, while UIMs (described in §8) are owned by the users themselves.

This section describes the basic functions of the NIM in more detail, and presents the NIM architecture.

7.2 Basic Functions

Figure 16:
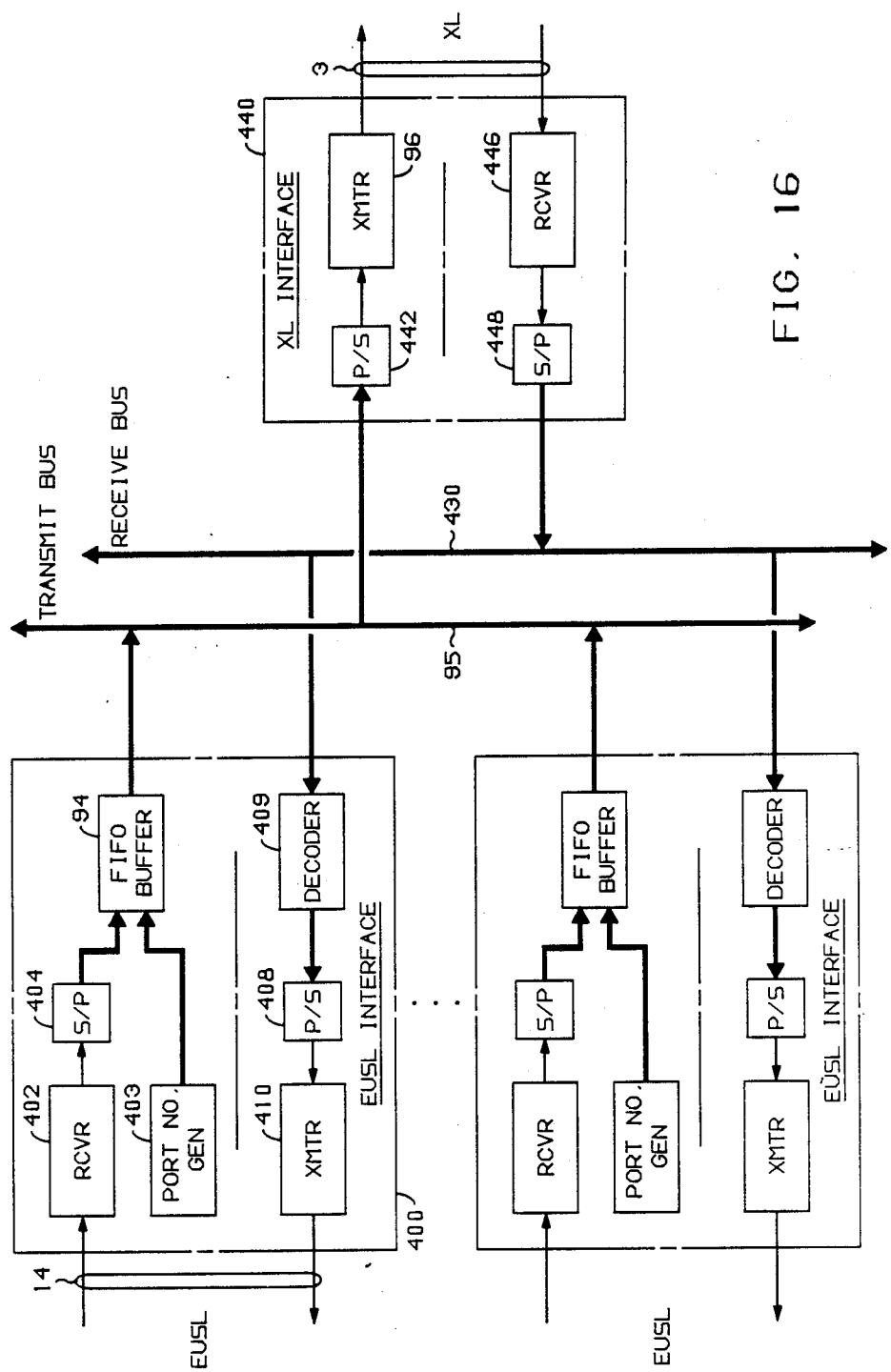
FIG. 16 is a block diagram of an interface module for interfacing between end user systems and the hub.

The NIM must perform the following basic functions:
EUS Link interfacing. One or more interfaces must be provided to EUS link(s) (see §2.2.5). The downstream link (i.e. from NIM to UIM) consists of a data channel and an out-of-band channel used by the NIM to flow control the upstream link when NIM input buffers become full. Because the downstream link is not flow controlled, the flow control channel on the upstream link is unused. The Data and Header Check Sequences (DCS, HCS) are generated by the UIM on the upstream link, and checked by the UIM on the downstream link. External Link interfacing. The XL (§2.2.6) is very similar to the EUSL, but lacks DCS checking and generation on both ends. This is to allow erroneous, but still potentially useful data to be delivered to the UIM. The destination port numbers in network transaction units arriving on the downstream XL are checked by the NIM, with illegal values resulting in dropped data. Concentration and demultiplexing. Network transaction units arriving on the EUSLs contend for and are statistically multiplexed to the outgoing XL. Those arriving on the XL are routed to the appropriate EUSL by mapping the destination port number to one or more EUS links. Source port identification. The port number of the source UIM is prepended to each network transaction unit going upstream by port number generator 403 (FIG. 16). This port number will be checked against the MAN address by the MINT to prevent unauthorized access to services (including the most basic data transport service) by "imposters".

7.3 NIM Architecture and Operation

The architecture of the NIM is depicted in FIG. 16. The following subsections briefly describe the operation of the NIM.

7.3.1 Upstream Operation

Incoming network transaction units are received from the UIMs at their EUSL interface 400 receivers 402, are converted to words in serial to parallel converters 404 and are accumulated in FIFO buffers 94. Each EUSL interface is connected to the NIM transmit bus 95, which consists of a parallel data path, and various signals for bus arbitration and clocking. When a network transaction unit has been buffered, the EUSL interface 400 arbitrates for access to the transmit bus 95. Arbitration proceeds in parallel with data transmission on the bus. When the current data transmission is complete, the bus arbiter awards bus ownership to one of the competing EUSL interfaces, which begins transmission. For each transaction, the EUSL port number, inserted at the beginning of each packet by port number generator 403, is transmitted first, followed by the network transaction unit. Within an XL interface 440, the XL transmitter 96 provides the bus clock, and performs parallel to serial conversion 442 and data transmission on the upstream XL 3.

7.3.2 Downstream Operation

Network transaction units arriving from the MINT on the downstream XL 3 are received within XL interface 440 by the XL receiver 446, which is connected via serial to parallel converter 448 to the NIM receive bus 430. The receive bus is similar to, but independent of the transmit bus. Also connected to the receive bus via a parallel to serial converter 408 are the EUSL interface transmitters 410. The XL receiver performs serial to parallel conversion, provides the receive bus clock, and sources the incoming data onto the bus. Each EUSL interface decodes the EUSL port number associated with the data, and forwards the data to its EUSL if appropriate. More than one EUSL interface may forward the data if required, as in a broadcast or multicast operation. Each decoder 409 checks the receive bus 430 while port number(s) are being transmitted to see if the following packet is destined for the end user of this EUSL interface 400; if so, the packet is forwarded to transmitter 410 for delivery to an EUSL 14. Illegal EUSL port numbers (e.g. violations of the error coding scheme) result in the data being dropped (i.e. not forwarded by any EUSL interface). Decode block 409 is used to gate information destined for a particular EUS link from transmit bus 95 to the parallel/serial converter 408 and transmitter 410.

8 INTERFACING TO MAN

8.1 Overview

A user interface module (UIM) consists of the hardware and software necessary to connect one or more end user systems (EUS), local area networks (LAN), or dedicated point-to-point links to a single MAN end user system link (EUSL) 14. Throughout this section, the term EUS will be used to generically refer to any of these network end user systems. Clearly, a portion of the UIM used to connect a particular type of EUS to MAN is dependent on the architecture of that EUS, as well as the desired performance, flexibility, and cost of the implementation. Some of the functions provided by a UIM, however, must be provided by every UIM in the system. It is therefore convenient to view the architecture of a UIM as having two distinct halves: the network interface, which provides the EUS-independent functionality, and the EUS interface, which implements the remainder of the UIM functions for the particular type of EUS being connected.

Not all EUSs will require the performance inherent in a dedicated external link. The concentration provided by a NIM (described in §7) is an appropriate way to provide access to a number of EUSs which have stringent response time requirements along with the instantaneous I/O bandwidth necessary to effectively utilize the full MAN data rate, but which do not generate the volume of traffic necessary to efficiently load the XL. Similarly, several EUSs or LANs could be connected to the same UIM via some intermediate link (or the LANs themselves). In this scenario, the UIM acts as a multiplexer by providing several EUS (actually LAN or link) interfaces to go with one network interface. This method is well suited to EUSs which do not allow direct connections to their system busses, and which provide only a link connection that is itself limited in bandwidth. End users can provide their multiplexing or concentration at a UIM and MAN can provide further multiplexing or concentration at the NIM.

This section examines the architectures of both the network interface and EUS interface halves of the UIM. The functions provided by the network interface are described, and the architecture is presented. The heterogeneity of EUSs that may be connected to MAN does not allow such a generic treatment of the EUS interfaces. Instead, the EUS interface design options are explored, and a specific example of an EUS is used to illustrate one possible EUS interface design.

8.2 UIM - Network Interface

The UIM network interface implements the EUS-independent functions of the UIM. Each network interface connects one or more EUS interfaces to a single MAN EUSL.

8.2.1 Basic Functions

The UIM network interface must perform the following functions:

EUS Link interfacing. The interface to the EUS Link includes an optical transmitter and receiver, along with the hardware necessary to perform the link level functions required by the EUSL (e.g. CRC generation and checking, data formatting, etc.).

Data buffering. Outgoing network transaction units (i.e. packets and SUWUs) must be buffered so that they may be transmitted on the fast network link without gaps. Incoming network transaction units are buffered for purposes of speed matching and level three (and above) protocol processing.

Buffer memory management. The packets of one LUWU may arrive at the receive UIM interleaved with those of another LUWU. In order to support this concurrent reception of several LUWUs, the network interface must manage its receive buffer memory in a dynamic fashion, allowing incoming packets to be chained together into LUWUs as they arrive.

Protocol processing. Outgoing LUWUs must be fragmented into packets for transmission into the network. Similarly, incoming packets must be recombined into LUWUs for delivery to the receiving process within the EUS.

8.2.2 Architectural Options

Clearly, all of the functions enumerated in the previous subsection must be performed in order to interface any EUS to a MAN EUSL. However, some architectural decisions must be made regarding where these functions are performed; i.e., whether they are internal or external to the host itself.

The first two functions must be located external to the host, although for different reasons. The first and lowest level function, that of interfacing to the MAN EUS Link, must be implemented externally simply because it consists of special purpose hardware which is not part of a generic EUS. The EUS link interface simply appears as a bidirectional I/O port to the remainder of the UIM network interface. On the other hand, the second function, data buffering, cannot be implemented in existing host memory because the bandwidth requirements are too stringent. On reception, the network interface must be able to buffer incoming packets or SUWUs back-to-back at the full network data rate (150M b/s). This data rate is such that it is generally impossible to deposit incoming packets directly into EUS memory. Similar bandwidth constraints apply to packet and SUWU transmission as well, since they must be completely buffered and then transmitted at the full 150M b/s rate. These constraints make it desirable to provide the necessary buffer memory external to the EUS. It should be noted that while FIFO memory will suffice to provide the necessary speed matching for transmission, the lack of flow control on reception along with the interleaving of received packets necessitate that a larger amount of random access memory be provided as receive buffer memory. For MAN, the size of receive buffer memory may range from 256K bytes to 1M byte. The particular size depends on the interrupt latency of the host and on the maximum size LUWU allowed by the host software.

The final two functions involve processing, which could conceivably be performed by the host processor itself. The third function, buffer memory management, involves the timely allocation and deallocation of blocks of receive buffer memory. The latency requirement associated with the allocation operation is stringent, due once more to the high data rates and the possibility of packets arriving back-to-back. However, this can be alleviated (for reasonable burst sizes) by pre-allocating several blocks of memory. It is possible, therefore, for the host processor to manage the receive packet buffers. Similarly, the host processor may or may not assume the burden of the fourth function, that of MAN protocol processing.

The location of these final two functions determines the level at which the EUS connects to the UIM. If the host CPU assumes the burden for packet buffer memory management and MAN protocol processing (the "local" configuration), then the unit of data transferred across the EUS interface is a packet, and the host is responsible for fragmenting and recombining LUWUs. If, on the other hand, those functions are off-loaded to another processor in the UIM, the front end processor (FEP) configuration, the unit of data transferred across the EUS interface is a LUWU. While in theory, subject to interleaving constraints at the EUS interface, the unit of data transferred may be any amount less than or equal to the entire LUWU, and the units delivered by the transmitter need not be the same size as those accepted by the receiver, for a general and uniform solution, useful for a variety of EUSs, the LUWU is to be preferred as the basic unit. The FEP configuration offloads the majority of the processing burden from the host CPU, as well as providing for a higher level EUS interface, thereby hiding the details of network operation from the host. With the FEP, the host knows only about LUWUs, and can control their transmission and reception at a higher, less CPU intensive level.

Although a lower cost interface is possible utilizing the local configuration, the network interface architecture described in the following section is a FEP configuration more characteristic of that required by some of the high performance EUS that are natural users of a MAN network. An additional reason for choosing the FEP configuration initially is that it is better suited for interfacing MAN to a LAN such as ETHERNET, in which case there is no "host CPU" to provide buffer memory management and protocol processing.

8.2.3 Network Interface Architecture

Figure 17:
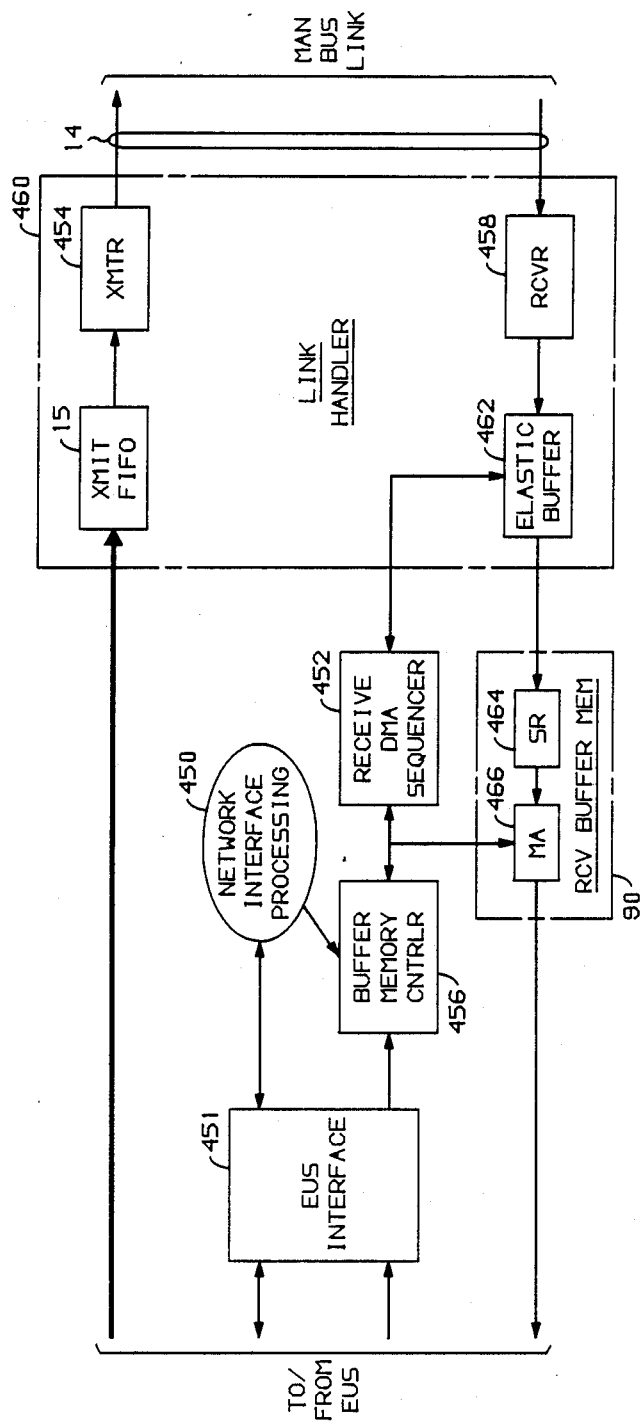
FIG. 17 is a block diagram of an arrangement for interfacing between an end user system and a network interface.

The architecture of the UIM network interface is depicted in FIG. 17. The following subsections briefly describe the operation of the UIM network interface by presenting scenarios for the transmission and reception of data. An FEP-type architecture is employed, i.e., receive buffer memory management and MAN network layer protocol processing are performed external to the host CPU of the EUS.

8.2.3.1 Transmission of Data

The main responsibilities of the network interface on transmission are to fragment the arbitrary sized transmit user work units (UWUs) into packets (if necessary), encapsulate the user data in the MAN header and trailer, and transmit the data to the network. To begin transmission, a message from the EUS requesting transmission of a LUWU traverses the EUS interface and is handled by network interface processing 450, which also implements memory management and protocol processing functions. For each packet, the protocol processor portion of the interface processing 450 formulates a header and writes it into the transmit FIFO 15. Data for that packet is then transferred across the EUS interface 451 into the transmit FIFO 15 within link handler 460. When the packet is completely buffered, the link handler 460 transmits it onto the MAN EUS link using transmitter 454, followed by the trailer, which was computed by the link handler 460. The link is flow controlled by the NIM to ensure that the NIM packet buffers do not overflow. This transmission process is repeated for each packet. The transmit FIFO 15 contains space for two maximum length packets so that packet transmission may occur at the maximum rate. The user is notified via the EUS interface 451 when the transmission is complete.

8.2.3.2 Reception of Data

Incoming data is received by receiver 458 and loaded at the 150 MB/s link rate into elastic buffer 462. Dual-ported video RAM is utilized for the receive buffer memory 90, and the data is unloaded from the elastic buffer and loaded into the shift register 464 of receive buffer memory 90 via its serial access port. Each packet is then transferred from the shift register into the main memory array 466 of the receive buffer memory under the control of the receiver DMA sequencer 452. The block addresses used to perform these transfers are provided by the network interface processing arrangement 450 of UIM 13 via the buffer memory controller 456, which buffers a small number of addresses in hardware to relieve the strict latency requirements which would otherwise by imposed by back-to-back SUWUs. Block 450 is composed of blocks 530, 540, 542, 550, 552, 554, 556, 558, 560, and 562 of FIG. 19. Because the network interface processing has direct access to the buffer memory via its random access port, headers are not stripped off; rather they are placed into buffer memory along with the data. The receive queue manager 558 within 450 handles the headers and, with input from the memory manager 550, keeps track of the various SUWUs and LUWUs as they arrive. The EUS is notified of the arrival of data by the network interface processing arrangement 450 via the EUS interface. The details of how data is delivered to the EUS are a function of the particular EUS interface being employed, and are described, for example, in section 8.3.3.2.

8.3 UIM - EUS Interfaces 8.3.1 Philosophy

This section describes the "half" of the network interface that is EUS dependent. The basic function of the EUS interface is the delivery of data between the EUS memory and the UIM network interface, in both directions. Each particular EUS interface will define the protocol to effect delivery, the format of data and control messages, and the physical path for control and data. Each side of the interface has to implement a flow control mechanism to protect itself from being overrun. The EUS must be able to control its own memory and the flow of data into it from the network, and the network has to be able to protect itself as well. Only at this basic functional level is it possible to talk about commonality in EUS interfaces. EUS interfaces will be different because of EUS hardware and system software differences. The needs of the applications using the network, coupled with the capabilities of the EUS, will also force interface design decisions dealing with performance and flexibility. There will be numerous interface choices even for a single type of EUS.

This set of choices means that the interface hardware can range from simple designs with few components to complex designs including sophisticated buffering and memory management schemes. Control functions in the interface can range from simple EUS interfaces to handling network level 3 protocols and even higher level protocols for distributed applications. Software in the EUS can also range from straightforward data transmission schemes that fit underneath existing networking software, to more extensive new EUS software that would allow very flexible uses of the network and allow the highest performance that the network has to offer. These interfaces must be tailored to the specific existing EUS hardware and software systems, but there must also be an analysis of the cost of interface features in comparison to the benefits they would deliver to the network applications running in these EUSs.

8.3.2 EUS Interface Design Options

The tradeoff between a front end processor (FEP) and EUS processing is one example of different interface approaches to accomplish the same basic function. Consider variations in receive buffering. A specialized EUS architecture with a high performance system bus could receive network packet messages directly from the network links. However, usually the interface will at least buffer packet messages as they come off the link, before they are delivered into EUS memory. Normally EUSs, either transmitting to or receiving from the network, do not know (or want to know) anything about the internal packet message. In that case, the receiving interface might have to buffer multiple packets that come from the LUWU of data that is the natural sized transmission unit between the transmit and receive EUSs. Each one of these three receive buffering situations is possible and each would require a significantly different EUS interface to transfer data into the EUS memory. If the EUS has a particular need to process network packet messages and has the processing power and system bus performance to devote to that task then the EUS dependent portion of the network interface would be simple. However, often it will be desirable to off-load that processing into the EUS interface and improve the EUS performance.

Different transmit buffering approaches also illustrate the tradeoff between FEP and EUS processing. For a specialized application, an EUS with high performance processor and bus could send network packet messages directly into the network. But if the application used EUS transaction sizes that were much larger that the packet message size, it might take too much of the EUS processing to produce packet messages on its own. An FEP could offload that work of doing this level 3 network protocol formatting. This would also be the case where the EUS wishes to be independent of the internal network message size, or where it has a diverse set of network applications with a great variation in transmission size.

Depending on the hardware architecture of the EUS, and the level of performance desired, there is the choice between programmed I/O and DMA to move data between EUS memory and the network interface. In the programmed I/O approach, probably both control and data will move over the same physical path. In the DMA approach there will be some kind of shared memory interface to move control information in an EUS interfacing protocol, and a DMA controller in the EUS interface to move data between buffer memory and EUS memory over the EUS system bus without using EUS processor cycles.

There are several alternatives that exist for the location of EUS buffering for network data. The data could be buffered on a front end processor network controller circuit board with its own private memory. This memory can be connected to the EUS by busses using DMA transfer oR dual ported memory acceSsed via a bus or dual ported memory located on the CPU side of a bus using prIvate busses. The application now must access the data. Various techniques are available; some involve mapping the end user work space directly to the address space used by the UIM to store the data. Other techniques require the operating system to further buffer the data and recopy into the user's private address space.

Options exist in writing the driver level software in the EUS that is responsible for moving control and data information over the interface. The driver could also implement the EUS interface protocol processing as well as just moving bits over the interface. For the driver to still run efficiently the protocol processing in the driver might not be very flexible. For more flexibility based on a particular application, the EUS interface protocol processing could be moved up to a higher level. Closer to the application, more intelligence could be applied to the interface decisions, at the expense of more EUS processing time. The EUS could implement various interface protocol approaches for delivery of data to and from the network: prioritization, preemption, etc. Network applications that did not require such flexibility could use a more direct interface to the driver and the network.

So, there are a variety of choices to be made at different levels in the system in both the hardware and the software.

8.3.3 Implementation Example: SUN Workstation Interface

To illustrate the EUS dependent portion of the interface we describe one specific interface. The interface is to the Sun-3 VME bus based workstations manufactured by Sun Microsystems, Inc. This is an example of a single EUS connected to a single network interface. The EUS also allows connection directly to its system bus. The UIM hardware is envisioned as a single circuit board that plugs into the VME bus system bus.

First, there follows a description of the Sun I/O architecture, and then a description of the choices made in designing the interface hardware, the interface protocol, and the connection to new and existing network applications software.

8.3.3.1 SUN Workstation I/O Architecture

The Sun-3's I/O architecture, based on the VME bus structure and its memory management unit (MMU), provides a DMA approach called direct virtual memory access (DVMA). FIG. 17 shows the Sun DVMA. DVMA allows devices on the system bus to do DMA directly to Sun processor memory, and also allow main bus masters to do DMA directly to main bus slaves without going through processor memory. It is called "virtual" because the addresses that a device on the system bus uses to communicate with the kernel are virtual addresses similar to those the CPU would use. The DVMA approach makes sure that all addresses used by devices on the bus are processed by the MMU, just as if they were virtual addresses generated by the CPU. The slave decoder 512 (FIG. 18) responds to the lowest megabyte of VME bus address space (0x0000 0000→0x000f ffff, in the 32 VME bit address space) and maps this megabyte into the most significant megabyte of the system virtual address space (0xff0 0000→0xfff ffff in the 28 bit virtual address space). (OX means that the subsequent characters are hexadecimal characters.) When the driver needs to send the buffer address to the device, it must strip off the high 8 bits from the 28 bit address, so that the address that the device puts on the bus will be in the low megabyte (20 bits) of the VME address space.

Figure 18:
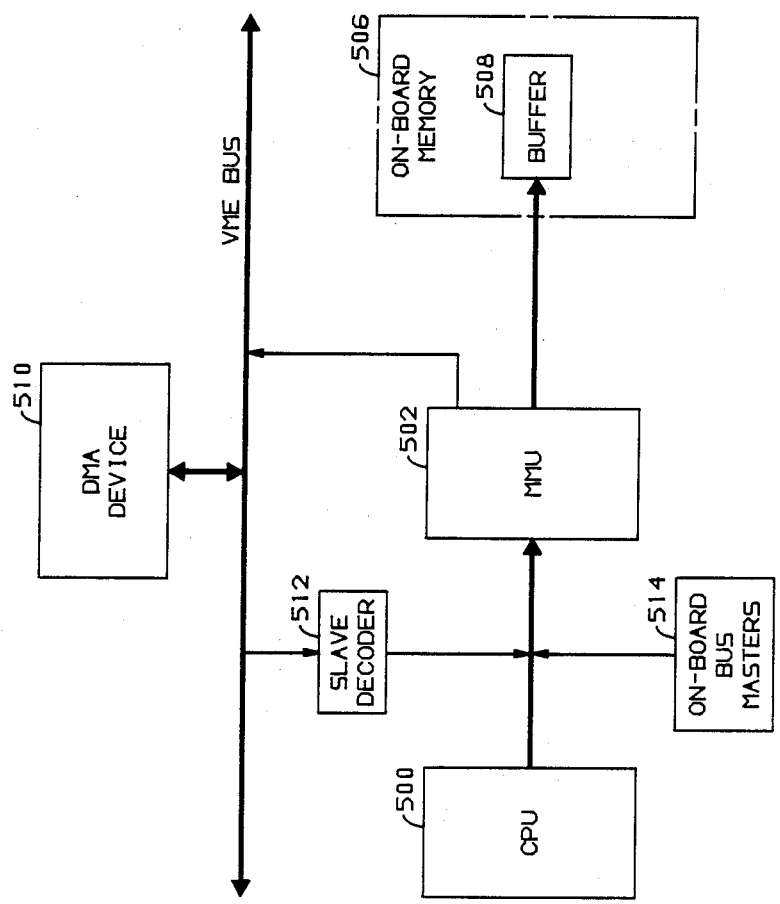
FIG. 18 is a block diagram of a typical end user system.

In FIG. 18, the CPU 500 drives a memory management unit 502, which is connected to a VME bus 504 and on board memory 506 that includes a buffer 508. The VME bus communicates with DMA devices 510. Other on board bus masters, such as an ETHERNET access chip can also access memory 508 via MMU 502. Thus, devices can only make DVMA transfers in memory buffers that are reserved as DVMA space in these low (physical) memory areas. The kernel does however support redundant mapping of physical memory pages into multiple virtual addresses. In this way, a page of user memory (or kernel memory) can be mapped into DVMA space in such a way that the data appears in (or comes from) the address space of the process requesting that operation. The driver uses a routine called mbsetup to set up the kernel page maps to support this direct user space DVMA.

8.3.3.2 SUN UIM - EUS Interface Approach

As mentioned above there are many options in designing a particular interface. With the Sun-3 interface, a DMA transfer approach was designed, an interface with FEP capabilities, an interface with high performance matching the system bus, and an EUS software flexibility to allow various new and existing network applications to use the network. FIG. 19 shows an overview of the interface to the Sun-3.

The Sun-3's are systems with potentially many simultaneous processes running in support of the window system, and multiple users. The DMA and FEP approachs were chosen to offload the Sun processor while the network transfers are taking place. The UIM hardware is envisioned as a single circuit board that plugs into the VME bus system bus. With the chance to connect directly to the system bus it is desirable to attempt the highest performance interface possible. Sun's DVMA provides a means to move data efficiently to and from processor memory. There is a DMA controller 92 in the UIM (FIG. 4) to move data from the UIM to EUS memory and data from EUS memory to the UIM over the bus, and there will be a shared memory interface to move control information in the host interfacing protocol. The front end processor (FEP) approach means that the data from the network is presented to the EUS at a higher level. Level 3 protocol processing has been performed and packets have been linked together into LUWUs, the user's natural sized unit of transmission. With the potential variety of network applications that could be running on the Sun the FEP approach means that EUS software does not have to be tightly coupled to the internal network packet format.

The Sun-3 DVMA architecture will limit the EUS transaction sizes to a maximum of one megabyte. If user buffers are not locked in, then kernel buffers would be used, as an intermediate step between the device and the user, with the associated performance penalty for the copy operation. If transfers are going to be made directly to user space, using the "mbsetup" approach, the user's space will be locked into memory, not available for swapping, during the whole transfer process. This is a tradeoff; it ties up the resources in the machine, but it may be more efficient if it avoids a copy operation from some other buffer in the kernel.

The Sun system has existing network applications running on ETHERNET, for example, their Network File System (NFS). To run these existing applications on MAN but still leave open the possibility for new applications that could use the expanded capabilities of MAN, we needed flexible EUS software and a flexible interface protocol to be able to simultaneously handle a variety of network applications.

FIG. 19 is a functional overview of the operation and interfaces among the NIM, UIM, and EUS. The specific EUS shown in this illustrative example is a Sun-3 workstation, but the principles apply to other end user systems having greater or lesser sophistication. Consider first the direction from the MINT via the NIM and UIM to the EUS. As shown in FIG. 4, data that is received from MINT 11 over link 3 is distributed to one of a plurality of UIMs 13 over links 14 and is stored in receive buffer memory 90 of such a UIM, from which data is transmitted in a pipelined fashion over an EUS bus 92 having a DMA interface to the appropriate EUS. The control structure for accomplishing this transfer of data is shown in FIG. 19, which shows that the input from the MINT is controlled by a MINT to NIM link handler 520, which transmits its output under the control of router 522 to one of a plurality of NIM to UIM link handlers (N/U LH) 524. MINT/NIM link handler (M/N LH) 520 supports a variant on the Metrobus physical layer protocol. The NIM to UIM link handler 524 also supports the Metrobus physical layer protocol in this implementation, but other protocols could be supported as well. It is possible that different protocols could coexist on the same NIM. The output of the N/U LH 524 is sent over a link 14 to a UIM 13, where it is buffered in receive buffer memory 90 by NIM/UIM link handler 552. The buffer address is supplied by memory manager 550, which manages free and allocated packet buffer lists. The status of the packet reception is obtained by N/U LH 552, which computes and verifies the checksum over header an data, and outputs the status information to receive packet handler 556, which pairs the status with the buffer address received from memory manager 550 and queues the information on a received packet list. Information about received packets is then transfered to reveive queue manager 558, which assembles packet information into queues per LUWU and SUWU, and which also keeps a queue of LUWUs and SUWUs about which the EUS has not yet been notified. Receive queue manager 558 is polled for information about LUWUs and SUWUs by the EUS via the EUS/UIM link handler (E/U LH) 540, and responds with notification messages via UIM/EUS link handler (U/E LH) 562. Messages which notify the EUS of the reception of a SUWU also contain the data for the SUWU thus completing the reception process. In the case of a LUWU, however, the EUS allocates its memory for reception, and issues a receive request via E/U LH 540 to receive request handler 560, which formulates a receive worklist and sends it to resource manager 554, which controls the hardware and effects the data transfer over EUS bus 92 (FIG. 4) via a DMA arrangement. Note that the receive request from the EUS need not be for the entire amount of data in the LUWU; indeed, all of the data may not have even arrived at the UIM when the EUS makes its first receive request. When subsequent data for this LUWU arrives, the EUS will again be notified and will have an opportunity to make additional receive requests. In this fashion, the reception of the data is pipelined as much as possible in order to reduce latency. Following data transfer, receive request handler 560 informs the EUS via U/E LH 562, and directs memory manager 550 to de-allocate the memory for that portion of the LUWU that was delivered, thus making that memory available for new incoming data.

In the reverse direction, i.e., from EUS 26 to MINT 11, the operation is controlled as follows: driver 570 of EUS 26 sends a transmit request to transmit request handler 542 via U/E LH 562. In the case of a SUWU, the transmit request itself contains the data to be transmitted, and transmit request handler 542 sends this data in a transmit worklist to resource manager 554, which computes the packet header and writes both header and data into buffer 15 (FIG. 4), from which it is transmitted to NIM 2 by UIM/NIM link handler 546 when authorized to do so via the flow control protocol in force on link 14. The packet is received at NIM 2 by UIM/NIM link handler 530 and stored in buffer 94. Arbiter 532 then selects among a plurality of buffers 94 in NIM 2 to select the next packet or SUWU to be transmitted under the control of NIM/MINT link handler 534 on MINT link 3 to MINT 11. In the case of a LUWU, transmit request handler 542 decomposes the request into packets and sends a transmit worklist to resource manager 554, which, for each packet, formulates the header, writes the header into buffer 15, controls the hardware to effect the transfer of the packet data over EUS bus 92 via DMA, and directs U/N LH 546 to transmit the packet when authorized to do so. The transmission process is then as described for the SUWU case. In either case, transmit request handler 542 is notified by resource manager 554 when transmission of the SUWU or LUWU is complete, whereupon driver 570 is notified via U/E LH 562 and may release its transmit buffers if desired.

FIG. 19 also shows details of the internal software structure of EUS 26. Two types of arrangements are shown, in one of which blocks 572, 574, 576, 578, 580 the user system performs level 3 and higher functions. Shown in FIG. 19 is an implementation based on Network of the Advanced Research Projects Administration of the U.S. Department of Defense (ARPAnet) protocols including an internet protocol 580 (level 3), transmission control protocol (TCP) and user datagram protocol (UDP) block 578 (TCP being used for connection oriented service and UDP being arranged for connectionless service). At higher levels are the remote procedure call (block 576), the network file server (block 574) and the user programs 572. Alternatively, the services of the MAN network can be directly invoked by user (block 582) programs which directly interface with driver 570 as indicated by the null block 584 between the user and the driver.

8.3.3.3 EUS Interface Functions

The main functional parts of the transmit EUS interface are a control interface with the EUS, and a DMA interface to transfer data between the EUS and the UIM over the system bus. When transmitting into the network, control information is received that describes a LUWU or SUWUs to be transmitted and information about the EUS buffers where the data resides. The control information from the EUS includes destination MAN address, destination group (virtual network), LUWU length, and type fields for type of service and higher level protocol type. The DMA interface moves the user data over from the EUS buffers into the UIM. The network interface poreion is responsible for formatting the LUWUs and SUWUs into packets and transmitting the packets on the link to the network. The control interface could have several variations for flow control, multiple outstanding requests, priority, and preemption. The UIM is in control of the amount of data that it takes from the EUS memory and sends into the network.

On the receive side, the EUS polls for information about packets that have been received and the control interface responds with LUWU information from the packets header and current information about how much of the EUS transaction has arrived. Over the control interface, the EUS requests to receive data from these messages, and the DMA interface will send the data from memory on the UIM into the EUS memory buffers. The poll and response mechanism in the interface protocol on the receive side allows a lot of EUS flexibility for receiving data from the network. The EUS can receive either partial or entire transactions that have come from the source EUS. It also provides the flow control mechanism for the EUS on receive. The EUS is in control of what it receives, when it receives it, and in what order.

8.3.3.4 SUN Software

This section describes how a typical end user system, a SUN-3 workstation, is connectable to MAN. Other end user systems would use different software. The interface to MAN is relatively straightforward and efficient for a number of systems which have been studied.

8.3.3.4.1 Existing Network Software

The Sun UNIX ® operating system is derived from the 4.2 BSD UNIX system from the University of California at Berkeley. Like 4.2 BSD it contains as part of the kernel, an implementation of the ARPAnet protocols: internet protocol (IP), transmission control protocol (TCP) for connection-oriented service on top of IP. Current Sun systems use IP as an internet sublayer in the top half of the network layer. The bottom half of the network layer is a network specific sublayer. It currently consists of driver level software that interfaces to a specific network hardware connection, namely an ETHERNET controller, where the link layer MAC protocol is implemented. ETHERNET is the network currently used to connect Sun workstations. To connect Sun workstations with a MAN network, it is necessary to fit into the framework of this existing networking software. The software for the MAN network interface in the Sun will be driver level software.

The MAN network is naturally a connectionless or datagram type of network. LUWU data with control information forms the EUS transaction crossing the interface into the network. Existing network services can be provided using the MAN network datagram LUWUs as a basis. Software in the Sun will build up both connectionless and connection-oriented transport and application services on top of a MAN datagram network layer. Since the Sun already has a variety of network application software, the MAN driver will provide a basic service with the flexibility to multiplex multiple upper layers. This multiplexing capability will be necessary not just for existing applications but for additional new applications that will use MAN's power more directly.

There needs to be an address translation service function in the EUS at the driver level in the host software. It would allow for IP addresses to be translated into MAN addresses. The address translation service is similar in function to the current Sun address resolution protocol (ARP), but different in implementation. If a particular EUS needs to update its address translation tables, it sends a network message with an IP address to a well known address translation server. The corresponding MAN address will be returned. With a set of such address translation services, MAN can then act as the underlying network for many different, new and existing, network software services in the Sun environment.

8.3.3.4.2 Device Driver

On the top side, the driver multiplexes several different queues of LUWUs from the higher protocols and applications for transmission and queues up received LUWUs in several different queues for the higher layers. On the hardware side, the driver sets up DMA transfers to and from user memory buffers. The driver must communicate with the system to map user buffers into memory that can be accessed by the DMA controller over the main system bus.

On transmit, the driver must do address translation on the outgoing LUWUs for those protocol layers that are not using MAN addresses, i.e., the ARPAnet protocols. The MAN destination address and destination group is included in MAN datagram control information that is sent when a LUWU is to be transmitted. Other transmit control information will be LUWU length, fields indicating type of service and higher level protocol, along with the data location for DMA. The UIM uses this control information to form packet headers and to move the LUWU data out of EUS memory.

On receive, the driver will implement a poll/response protocol with the UIM notifying the EUS of incoming data. The poll response will contain control information that gives source address, total LUWU length, amount of data that has arrived up to this point, the type fields indicating higher protocol layers, and some agreed on amount of the data from the message. (For small messages, the whole user message could arrive in this poll response.) The driver itself has the flexibility based on the type field to decide how to receive this message and which higher level entity to pass it on up to. It may be, that based on a certain type field, it may just deliver the announcement, and pass the reception decision on up to a higher layer. Which ever approach is used, eventually a control request for the delivery of the data from the UIM to the EUS memory is made, which results in a DMA operation by the UIM. EUS buffers to receive the data may preallocated for the protocol types where the driver handles the reception in a fixed fashion, or the driver may have to get buffer information from a higher layer in the case where it has just passed the announcement on up. This is the type of flexibility we need in the driver to handle both existing and new applications in the Sun environment.

8.3.3.4.3 Raw MAN Interface Software

Later, as applications are written that wish to directly use the capabilities of the MAN network, the address translation function will not be necessary. The MAN datagram control information will be specified directly by special MAN network layer software.

9 MAN Protocols

9.1 Overview

The MAN protocol provides for the delivery of user data from source UIM across the network to destination UIM. The protocol is connectionless, asymmetric for receive and send, implements error detection without correction, and discards layer purity for high performance.

9.2 Message Scenario

The EUS sends datagram transactions called LUWUs into the network. The data that comes from the EUS resides in EUS memory. A control message from the EUS specifies to the UIM the data length, the destination address for this LUWU, the destination group and a type field which could contain information like the user protocol and the network class of service required. Together, the data and the control information form the LUWU. Depending on the type of EUS interface, this data and control can be passed to the UIM in different ways, but it is likely that the data is passed in a DMA transfer.

The UIM will transmit this LUWU into the network. To reduce potential delay, larger LUWUs are not sent into the network as one contiguous stream. The UIM breaks up the LUWU into fragments called packets that can be up to a certain maximum size. An UWU smaller than the maximum size is called a SUWU and will be contained in a single packet. Several EUSs are concentrated at the NIM and packets are transmitted over the link from the UIM to the NIM (the EUSL). Packets one from UIM can be demand multplexed on the link from the NIM to the MINT (the XL) with packets from other EUSs. Delays are reduced because no EUS has to wait for the completion of a long LUWU from another EUS sharing the link to the MINT. The UIM generates a header for every packet that contains information from the original LUWU transaction, so that each packet can pass through the network from source UIM to destination UIM and be recombined into the same LUWU that was passed into the network by the source EUS. The packet header contains the information for the network layer protocol in the MAN network.

Before the NIM sends the packet to the MINT on the XL, it adds a NIM/MINT header to the packet message. The header contains the source port number identifying the physical port on the NIM where a particular EUS/UIM is connected. This header is used by the MINT to verify that the source EUS is located at the port where he is authorized to be. This type of additional check is especially important for a data network that serves one or more virtual networks, to ensure privacy for such virtual networks. The MINT uses the packet header to determine the route for the packet, as well as other potential services. The MINT does not change the contents of the packet header. When the ILH in the MINT passes the packet out through the switch to be sent out on the XL to the destination NIM, it places a different port number in the NIM/MINT header. This port number is the physical port on the NIM where the destination EUS/UIM is connected. The destination NIM uses this port number to route the packet on the fly to the proper EUSL.

The various sections of a packet are identified by delimiters according to the link format. Such delimiters occur between the NIM/MINT header 600 and the MAN header 610, and between the MAN header and the rest of the packet. The delimiter at the MAN header/rest of packet border is required to signal the header check sequence circuit to insert or check the header check. The NIM broadcasts a received packet to all ports in the NIM/MINT header field.

When the packet arrives at the destination UIM, the packet header contains the original information from the source UIM necessary to reassemble the source EUS transaction. There is also enough information to allow a variety of EUS receive interface approaches including pipelining or other variations of EUS transaction size, prioritization, and preemption.

9.3 MAN Protocol Description

9.3.1 Link Layer Functions

The link functions are described in Section 5. The functions of message beginning and end demarcation, data transparency, and message check sequences on the EUSL and XL links are discussed there.

A check sequence for the whole packet message is performed at the link level, but instead of corrective action being taken there, an indication of the error is passed on up to the network layer for handling there. A message check sequence error results only in incrementing an error count for administrative purposes, but the message transmission continues. A separate header check sequence is calculated in hardware in the UIM. A header check sequence error detected by the MINT control results in the message being thrown away and an error count being incremented for administrative purposes. At the destination UIM a header check sequence error also results in the message being thrown away. The data check sequence result can be conveyed to the EUS as part of the LUWU arrival notification, and the EUS can determine whether of not to receive the message. These violations of layer purity have been made to simplify the processing at the link layer to increase speed and overall network performance.

Other "standard" link layer functions like error correction and flow control are not performed in the conventional manner. There are no acknowledgement messages returned at the link level for error correction (retransmission requests) or for flow control. Flow control is signaled using special bits in the framing pattern. The complexity of X0.25-like protocols at the link level can be tolerated for low speed links where the processing overhead will not reduce performance and does increase the reliability of links that have high error rates. However, it is felt that an acceptable level of error-free throughput will be achieved by the low bit error rates in the fiber optic links in this network (Bit Error Rate less than 10 errors per trillion bits.) Also, because of the large amounts of buffer memory in the MINT and the UIM necessary to handle data from the high-speed links, it was felt that flow control messages would not be necessary or effective.

9.3.2 Network Layer

9.3.2.1 Functions

The message unit that leaves the source UIM and travels all the way to the destination UIM is the packet. The packet is not altered once it leaves the source UIM.

The information in the UIM to UIM message header will allow the following functions to be performed:
 fragmentation of LUWUs at the source UIM,
 recombination of LUWUs at the destination UIM,
 routing to the proper NIM at the MINT,
 routing to the proper UIM/EUS port at the destination NIM,
 MINT transmission of variable length messages (e.g., SUWU, packet, n packets),
 destination UIM congestion control and arrival announcement,
 detection and handling of message header errors,
 addressing of network entities for internal network messages,
 EUS authentication for delivery of network services only to authorized users.

9.3.2.2 Format

FIG. 20 shows the UIM to MINT Message format. The MAN header 610 consists of the Destination Address 612, the Source Address 614, the group (virtual network) identifier 616, group name 618, the type of service 620, the Packet Length (the header plus data in bytes) 622, a type of service indicator 623, a protocol identifier 624 for use by end user systems for identifying the contents of EUS to EUS header 630, and the Header Check Sequence 626. The header is of fixed length, seven 32-bit words or 224 bits long. The MAN header is followed by an EUS to EUS header 630 to process message fragmentation. This header includes a LUWU identifier 632, a LUWU length indicator 634, the packet sequence number 636, the protocol identifier 638 for identifying the contents of the internal EUS protocol which is the header of user data 640, and the number 639 of the initial byte of data of this packet within the total LUWU of information. Finally, user data 640 may be preceded for appropriate user protocols by the identity of the destination port 642 and source port 644. The fields are 32 bits because that is the most efficient length (integers) for present network control processors. Error checking is performed on the header in control software; this is the Header Check Sequence. At the link level, error checking done over the whole message; this is the Message Check Sequence 634. The NIM/MINT header 600 (explained below) is also shown in the figure for completeness.

The destination address, group identification, type of service, and the source address are placed as the first five fields in the message for efficiency in MINT processing. The destination and group identification are used for routing, the size for memory management, the type fields for special processing, and the source is used for service authentication.

9.3.2.2.1 Destination Address

The Destination Address 612 is a MAN address that specifies to which EUS the packet is being sent. A MAN address is 32 bits long and is a flat address that specifies an EUS connected to the network. (In internal network messages, if the high order bit in the MAN address is set, the address specifies an internal network entity like a MINT or NIM, instead of an EUS.) A MAN address will be permanently assigned to an EUS and will identify an EUS even if it moves to different physical location on the network. If an EUS moves, it must sign in with a well-known routing authentication server to update the correspondence between its MAN address and the physical port on which it is located. Of course, the port number is supplied by the NIM so the EUS cannot cheat about where it is located.

In the MINT the destination address will be used to determine a destination NIM for routing the message. In the destination NIM the destination address will be used to determine a destination UIM for routing the message.

9.3.2.2.2 Packet Length

The Packet Length 622 is 16 bits long and represents the length in bytes of this message fragment including the fixed length header and the data. This length is used by the MINT for transmitting the message. It is also used by the destination UIM to determine the amount of data available for delivery to the EUS.

9.3.2.2.3 Type Fields

The type of service field 623 is 16 bits long and contains the type of service specified in the original EUS request. The MINT may look at the type of service and handle the message differently. The destination UIM may also look at the type of service to determine how to deliver the message to the destination EUS, i.e., deliver even if in error. The user protocol 624 assists the EUS driver in multiplexing various streams of data from the network.

9.3.2.2.4 Packet Sequence Number

This is a Packet Sequence Number 636 for this particular LUWU transmission. It helps the receiving UIM recombine the incoming LUWU, so that it can determine if any fragments of the transmission have been lost because of error. The sequence number is incremented for each fragment of the LUWU. The last sequence number is negative to indicate the last packet of a LUWU. (An SUWU would have −1 as the sequence number.) If an infinite length LUWU is being sent, the Packet Sequence Number should wrap around. (See UWU Length, Section 9.3.2.2.7, for an explanaton of an infinite length LUWU.)

9.3.2.2.5 Source Address

The Source Address 614 is 32 bits long and is a MAN address that specifies the EUS that sent the message. (See Destination Address for an explanation of MAN address.) The Source Address will be needed in the MINT for network accounting. Coupled with the Port Number 600 from the NIM/MINT header, it is used by the MINT to authenticate the source EUS for network services. The Source Address will be delivered to the destination EUS so that it knows the network address of the EUS that sent the message.

9.3.2.2.6 UWU ID

The UWU ID 632 is a 32 bit number that is used by the destination UIM to recombine a UWU. Note that the recombination job is made easier because fragments cannot get out of order in the network. The UWU ID, along with the Source and Destination Addresses, identifies packets of the same LUWU, or in other words, fragments of the original datagram transaction. The ID must be unique for the source and destination pair for the time that any fragment is in the network.

9.3.2.2.7 UWU Length

The UWU Length 634 is 32 bits long and represents the total length of UWU data in bytes. In the first packet of a LUWU this will allow the destination UIM to do congestion control, and if the LUWU is pipelined into the EUS, it will allow the UIM to begin a LUWU announcement and delivery before the complete LUWU arrives at the UIM.

A Length that is negative indicates an infinite length LUWU, which is like an open channel between two EUSs. Closing down an infinite length LUWU is done by sending a negative Packet Sequence Number. An infinite length LUWU only makes sense where the UIM controls the DMA into EUS memory.

9.3.2.2.8 Header Check Sequence

There is a header check sequence 626, calculated by the transmitting UIM for header information so that the MINT and the destination UIM can determine if the header information was received correctly. The MINT or the destination UIM will not attempt delivery of a packet with a header check sequence error.

9.3.2.2.9 User Data

The user data 640 is the portion of the user UWU data that is transmitted in this fragment of the transmission. Following the data is the overall message check sequence 646 calculated at the link level.

9.3.3 NIM/MINT Layer

9.3.3.1 Functions

This protocol layer consists of a header containing a NIM port number 600. The port number has a one to one correspondence to an EUS connection on the NIM and is prepended by the NIM in block 403 (FIG. 16) so that the user cannot enter false data therein. This header is positioned at the front of a packet message and is not covered by the overall packet message check sequence. It is checked by a group of parity bits in the same word to enhance its error reliability. The incoming message to the MINT contains the source NIM port number to assist in user authentication for network services that might be requested in the type fields. The outgoing message from the MINT contains the destination NIM port number in place of the source port 600 in order to speed the demultiplexing/routing by the NIM to the proper destination EUS. If the packet has a plurality of destination ports in one NIM, a list of these ports is placed at the beginning of the packet so that section 600 of the header becomes several words long.

10 LOGIN PROCEDURES AND VIRTUAL NETWORKS

10.1 General

A system such as MAN is naturally most cost effective when it can serve a large number of customers. Such a large number of customers is likely to include a number of sets of users who require protection from outsiders. Such users can conveniently be grouped into virtual networks. In order to provide still further flexibility and protection, individual users may be given access to a number of virtual networks. For example, all the users of one company may be on one virtual network and the payroll department of that company may be on a separate virtual network. The payroll department users should belong to both of these virtual networks since they may need access to general data about the corporation but the users outside the payroll department should not be members of the virtual network of the payroll department virtual network since they should not have access to payroll records.

The login procedure method of source checking and the method of routing are the arrangements which permit the MAN system to support a large number of virtual networks while providing an optimum level of protection against unauthorized data access. Further, the arrangement whereby the NIM prepends the user port to every packet, gives additional protection against access of a virtual network by an unauthorized user by preventing aliasing.

10.2 Building Up the Authorization Data Base

FIG. 15 illustrates the administrative control of the MAN network. A data base is stored in disk 351 accessed via operation, administration, and maintenance (OA&M) system 350 for authorizing users in response to a login request. For a large MAN network, OA&M system 350 may be a distributed multiprocessor arrangement for handling a large volume of login requests. This data base is arranged so that users cannot access restricted virtual networks of which they are not members. The data base is under the control of three types of super users. A first super user who would in general be an employee of the common carrier that is supplying MAN service. This super user, referred to for convenience herein as a level 1 super user, assigns a block of MAN names which would in general consist of a block of numbers to each user group and assigns type 2 and type 3 super users to particular ones of these names. The level 1 super user also assigns virtual networks to particular MAN groups. Finally, a level 1 super user has the authority to create or destroy a MAN supplied service such as electronic "yellow page" service. A type 2 super user assigns valid MAN names from the block assigned to the particular user community, and assigns physical port access restrictions where appropriate. In addition, a type 2 super user has the authority to restrict access to certain virtual networks by sets of members of his customer community.

Type 3 super users who are broadly equal in authority to type 2 super users, have the authority to grant MAN names access to their virtual networks. Note that such access can only be granted by a type 3 super user if the MAN name's type 2 super user has allowed this MAN name user the capability of joining this group by an appropriate entry in table 370.

The data base includes table 360 which provides for each user identification 362, the password 361, the group 363 accessible using that password, a list of ports and, for special cases, directory numbers 364 from which that user may transmit and/or receive, and the type of service 365, i.e., receive only, transmit only, or receive and transmit.

The data base also includes user-capability tables 370,375 for relating users (table 370) to groups (table 375) potentially authorizable for each user. When a user is to be authorized by a super user to access a group, this table is checked to see if that group is in the list of table 370; if not the request to authorize that user for that group will be rejected. Super users have authority to enter data for their group and their groups in tables 370,375. Super users also have the authority for their user to move a group from table 375 into the list of groups 363 of the user/group authorization table 360. Thus, for a user to access an outside group, super users from both groups would have to authorize this access.

10.3 Login Procedure

At login time, a user who has previously been appropriately authorized according to the arrangements described above, sends an initial login request message to the MAN network. This message is destined not for any other user, but for the MAN network itself. Effectively, this message is a header only message which is analyzed by the MINT central control. The password, type of login service being requested, MAN group, MAN name and port number are all in the MAN header of a login request, replacing other fields. This is done because only the header is passed by the XLH to the MINT central control, for further processing by the OA&M central control. The login data which includes the MAN name, the requested MAN group name (virtual network name), and the password are compared against the login authorization data base 351 to check whether the particular user is authorized to access that virtual network from the physical port to which that user is connected (the physical port was prepended by the NIM prior to reception of the login packet by the MINT). If the user is in fact properly authorized, then the tables in source checker 307 and in router 309 (FIG. 14) are updated. Only the source checker table of the checker that processes the login user's port is updated from a login for terminal operations. If a login request is for receive functions, then the routing tables of all MINTs must be updated to allow that source to receive data from any authorized connectable user of the same group who may be connected to other MINTs to respond to requests. The source checker table 308 includes a list of authorized name/group pairs for each port connected to the NIM that sends the data stream to the XLH for that source checker. The router tables 310, all include entries for all users authorized to receive UWUs. Each entry includes a name/group pair, and the corresponding NIM and port number. The entries in the source checker list are grouped by group identification numbers. The group identification number 616 is part of the header of subsequent packets from the logged in user, and is derived by the OA&M system 350 at login time and sent back by the OA&M system via the MAN switch 10 to the login user. The OA&M system 350 uses the MINT central control's 20 access 19 to the MINT memory 18 to enter the login acknowledge to the login user. On subsequent packets, as they are received in the MINT, the source checker checks the port number, MAN name and MAN group against the authorization table in the source checker with the result that the packet is allowed to proceed or not. The router then checks to see if the destination is an allowable destination for that input by checking the virtual network group name and the destination name. As a result, once a user is logged in, the user can reach any destination that is in the routing tables, i.e., that has previously logged in for access in the read only mode or the read/write mode, and that has the same virtual network group name as requested in the login; in contrast unauthorized users are blocked in every packet.

While in the present embodiment, the checking is done for each packet, it could also be done for each user work unit (LUWU or SUWU), with a recorded indication that all subsequent packets of a LUWU whose original packet was rejected are also to be rejected, or by rejecting all LUWUs whose initial packet is missing at the user system.

Those super user logins which are associated with making changes in the login data base are checked in the same way as conventional logins except that it is recognized in OA&M system 350 as a login request for a user who has authority for changing the data base stored on disk 351.

Super users types 2 and 3 get access to the OA&M system 350 from a computer connected to a user port of MAN. OA&M system 350 derives statistics on billing, usage, authorizations and performance which the super users can access from their computers.

The MAN network can also serve special types of users such as transmit only users and receive only users. An example of a transmit only user is a broadcast stock quotation system or a video transmitter. Outputs of transmit only users are only checked in source checker tables. Receive only units such as printers or monitoring devices are authorized by entries in the routing tables.

11 APPLICATION OF MAN TO VOICE SWITCHING

Figure 22:
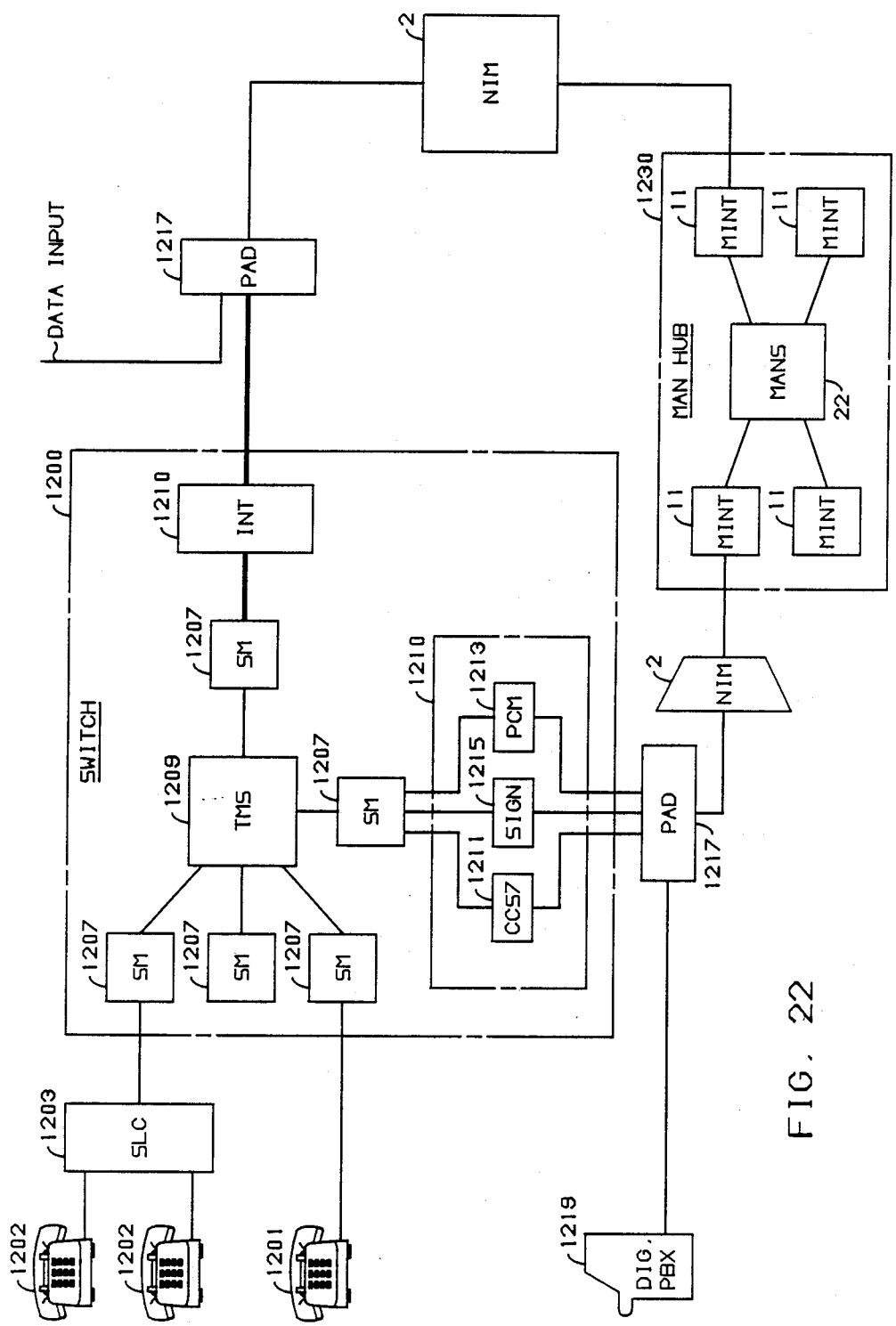
FIG. 22 is a block diagram illustrating arrangements for using MAN to switch voice as well as data.

FIG. 22 shows an arrangement for using the MAN architecture to switch voice as well as data. In order to simplify the application of this architecture to such services, an existing switch in this case, the 5ESS® switch manufactured by AT&T Network Systems, is used. The advantage of using an existing switch is that it avoids the necessity for developing a program to control a local switch, a very large development effort. By using an existing switch as the interface between the MAN and voice users, this effort can be almost completely eliminated. Shown on FIG. 22 is a conventional customer telephone connected to a switching module 1207 of 5ESS switch 1200. This customer telephone could also be a combined integrated services digital network (ISDN) voice and data customer station which can also be connected to a 5ESS switch. Other customer stations 1202 are connected through a subscriber loop carrier system 1203 which is connected to a switching module 1207. The switching modules 1207 are connected to a time multiplex switch 1209 which sets up connections between switching modules. Two of these switching modules are shown connected to an interface 1210 comprising Common Channel Signaling 7 (CCS 7) signaling channels 1211, pulse code modulation (PCM) channels 1213, an special signaling channels 1215. These are connected to a packet assembler and disassembler 1217 for interfacing with an MAN NIM 2. The function of the PAD is to interface between the PCM signals which are generated in the switch and the packet signals which are switched in the MAN network. The function of the special signaling channel 1215 is to inform PAD 1217 of the source and destination associated with each PCM channel. The CCS 7 channels transmit packets which require further processing by PAD 1217 to get them into the form necessary for switching by the MAN network. To make the system less vulnerable against the failure of equipment or transmission facilities, the switch is shown as being connected to two different NIMs of the MAN network. A digital PBX 1219 also interfaces with packet assembler disassembler 1217 directly. In a subsequent upgrade of the PAD, it would be possible to interface directly with SLC 1203 or with telephones such as integrated services digital network (ISDN) telephones that generate a digital voice bit stream directly.

The NIMs are connected to a MAN hub 1230. The NIMs are connected to MINTs 11 of that hub. The MINTs 11 are interconnected by MAN switch 22.

For this type of configuration, it is desirable to switch substantial quantities of data as well as voice in order to utilize the capabilities of the MAN hub most effectively. Voice packets, in particular, have very short delay requirements in order to minimize the total delay encountered in transmitting speech from a source to a destination and in order to ensure that there is no substantial interpacket gap which would result in the loss of a portion of the speech signal.

The basic design parameters for MAN have been selected to optimize data switching, and have been adapted in a most straightforward manner as shown in FIG. 22. If a large amount of voice packet switching is required, one or more of the following additional steps can be taken:

1. A form of coding such as adaptive differential PCM (ADPCM) which offers excellent performance at 32K bit/second could be used instead of 64K bit PCM. Excellent coding schemes are also available which require fewer than 32K bit/sec. for good performance.

2. Packets need only be sent when a customer is actually speaking. This reduces the number of packets that must be sent by at least 2:1.

3. The size of the buffer for buffering voice samples could be increased above the storage for 256 voice samples (a two packet buffer) per channel. However, longer voice packets introduce more delay which may or may not be tolerable depending on the characteristics of the rest of the voice network.

4. Voice traffic might be concentrated in specialist MINTs to reduce the number of switch setup operations for voice packets. Such an arrangement may enlarge the number of customers affected by a failure of a NIM or MINT and might require arrangements for providing alternate paths to another NIM and/or MINT.

5. Alternate hub configurations can be used.

Figure 24:
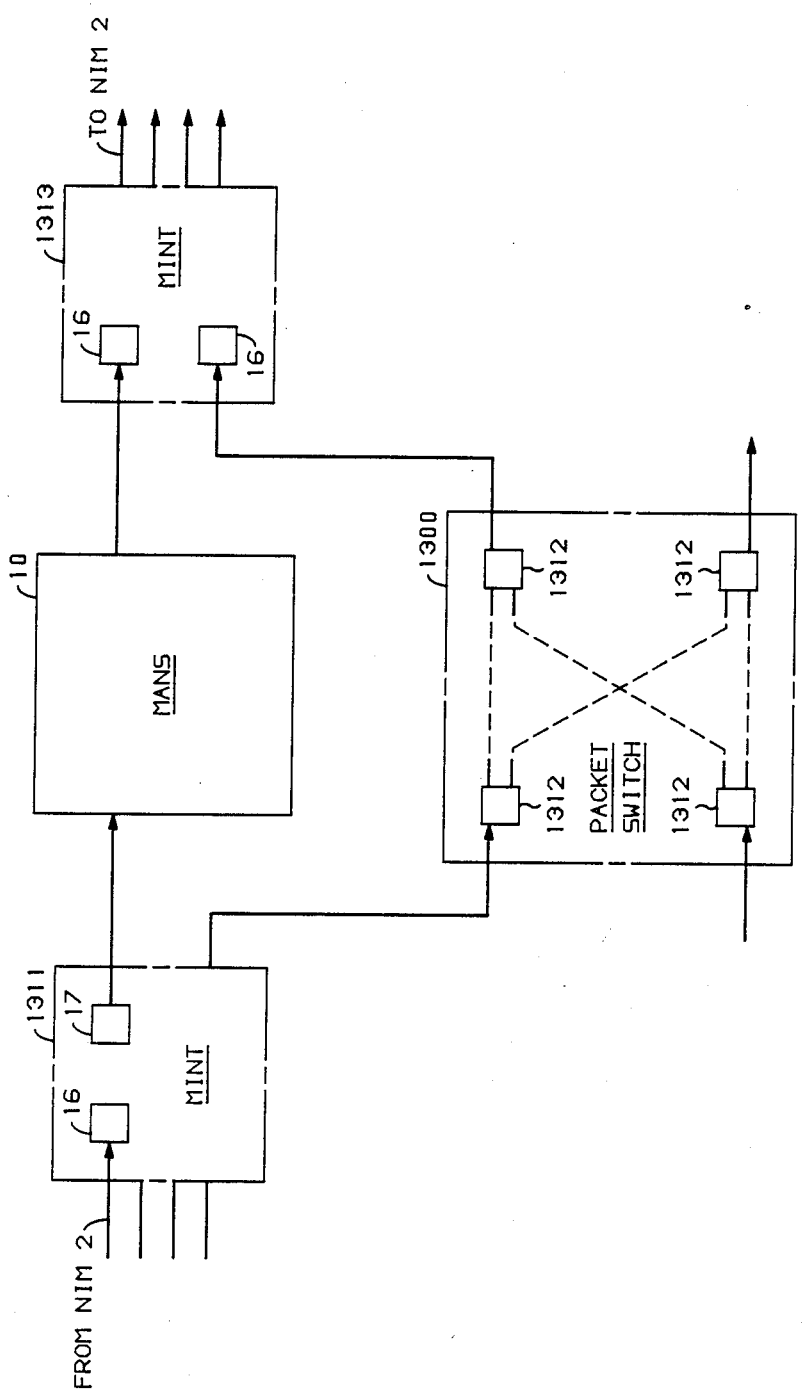
FIG. 24 illustrates an alternate arrangement for the hub for switching packetized voice and data.

The alternate hub configuration of FIG. 24 is an example of a step 5 solution. A basic problem of switching voice packets is that in order to minimize delay in transmitting voice, the voice packets must represent only a short segment of speech, as low as 20 milliseconds according to some estimates. This corresponds to as many as 50 packets per second for each direction of speech. If a substantial fraction of the input to a MINT represented such voice packets, the circuit switch setup time might be too great to handle such traffic. If only voice traffic were being switched, a packet switch which would not require circuit setup operations might be needed for high traffic situations.

One embodiment of such a packet switch 1300 comprises a group of MINTs 1313 interconnected like a conventional array of space division switches wherein each MINT 1313 is connected to four others, and enough stages are added to reach all output MINTs 1312 that carry heavy voice traffic. For added protection against equipment failure, the MINTs 1313 of the packet switch 1300 could be interconnected through MANS 10 in order to route traffic around a defective MINT 1313 and to use a spare MINT 1313 instead.

The output bit stream of NIM 2 is connected to one of the inputs (XL) of an input MINT 1311. The packet data traffic leaving input MINT 1311 can continue to be switched through MANS 10. In this embodiment, the data packet output of MANS 10 is merged with the voice packet output of data switch 1300 in an output MINT 1312 which receives the outputs of MANS 10 and data switch 1300 on the XL 16 (input) side and whose IL 17 output is the input bit stream of NIM 2, produced by a PASC circuit 290 (FIG. 13). Input MINT 1311 does not contain the PASC circuit 290 (FIG. 13) for generating the output bit stream to NIM 2. For output MINT 1312 the inputs to the XLs from MANS 10 pass through a phase alignment circuit 292 (FIG. 13) such as that shown in FIG. 23, since such inputs come from many different sources through circuit paths that insert different delay.

This arrangement can also be used for switching high priority data packets through the packet switch 1300 while retaining the circuit switch 10 for switching low priority data packets. With this arrangement, it is not necessary to connect the packet switch 1300 to output MINTs 1312 carrying no voice traffic; in that case, high priority packets to MINTs carrying no voice traffic would have to be routed through circuit switch MANS 10.

12 MINT ACCESS CONTROL TO MAN SWITCH CONTROL

Figure 21:
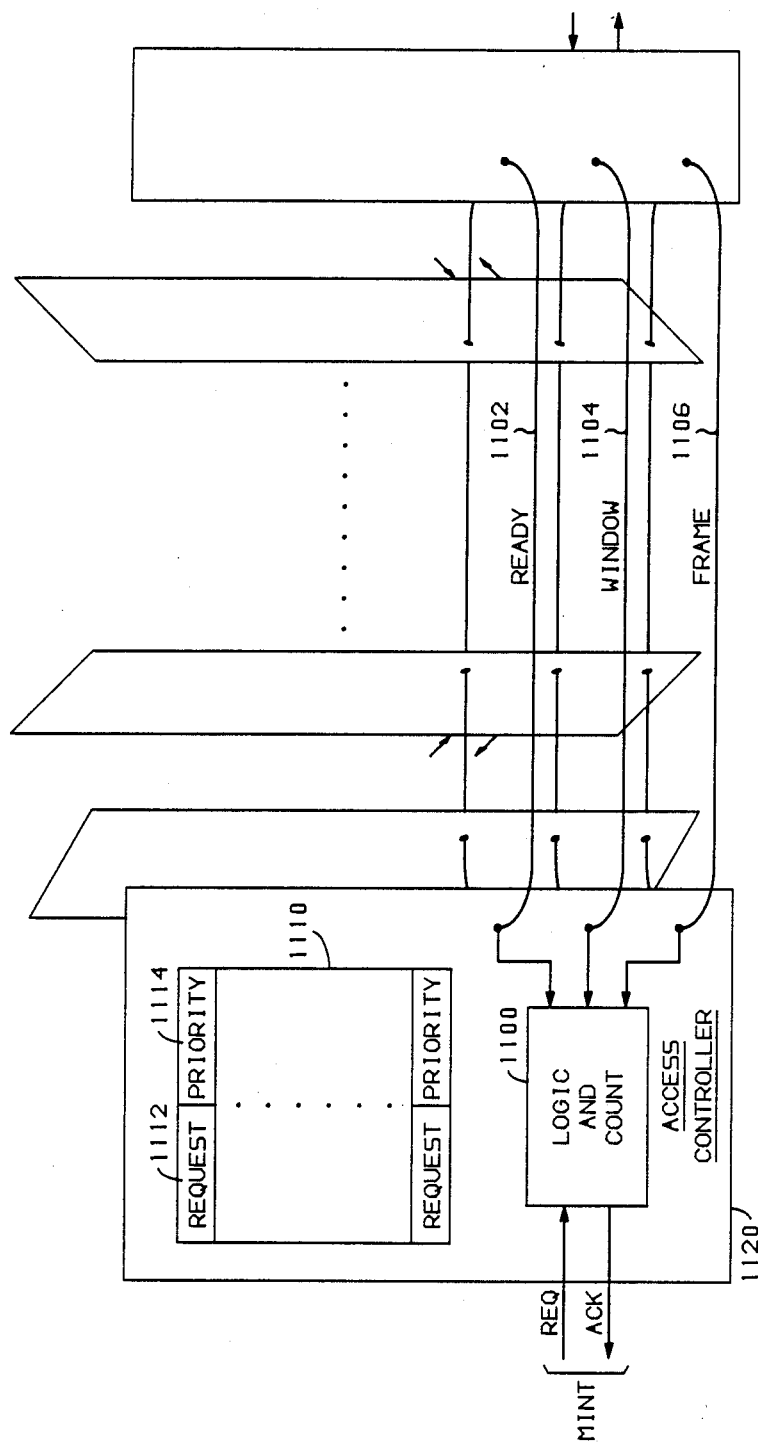
FIG. 21 illustrates an alternate arrangement for controlling access from the data distribution switches to the circuit switch control.

FIG. 21 illustrates one arrangement for controlling access by MINTs 11 to the MAN switch control 22. Each MINT has an associated access controller 1120. A data ring 1102,104,1106 distributes data indicating the availability of output links to each logic and count circuit 1110 of each access controller. Each access controller 1120 maintains a list 1110 of output links such as 1112 to which it wants to send data, each link having an associated priority indicator 1114. A MINT can seize an output link of that list by marking the link unavailable in ring 1102 and transmitting an order to the MAN switch control 22 to set up a path from an ILH of that MINT to the requested output link. When the full data block to be transmitted to that output link has been so transmitted, the MINT marks the output link available in the data transmitted by data ring 1102 which thereby makes that output link available for access by other MINTs.

A problem with using only availability data is that during periods of congestion the time before a particular MINT may get access to an output link can be excessive. In order to even the accessibility of any output link to any MINT, the following arrangement is used. Associated with each link availability indication, called a ready bit transmitted in ring 1102, is a window bit transmitted in ring 1104. The ready bit is controlled by any MINT that seizes or releases an output link. The window bit is controlled by the access controller 1120 of only a single MINT called, for the purposes of this description, the controlling MINT. In this particular embodiment, the controlling MINT for a given output link is the MINT to which the corresponding output link is routed.

The effect of an open window (window bit=1) is to let the first access controller on the ring that wants to seize an output link and recognizes its availability as the ready bit passes the controller, seize such a link, and to let any controller which tries to seize an unavailable link set the priority indicator 1114 for that unavailable link. The effect of a closed window (window bit=0) is to permit only controllers which have a priority indicator set for a corresponding available link to seize that available link. The window is closed by the access controller 1120 of the controlling MINT whenever the logic and count circuit 1100 of that controller detects that the output link is not available (ready bit=0) and is opened whenever that controller detects that that output link is available (ready bit=1).

The operation of an access controller seizing a link is as follows. If the link is unavailable (ready bit=0) and the window bit is one, the access controller sets the priority indicator 1114 for that output link. If the link is unavailable and the window bit is zero, the controller does nothing. If the link is available and the window bit is one, the controller seizes the link and marks the ready bit zero to ensure that no other controller seizes the same link. If the link is available and the window bit is zero, then only a controller whose priority indicator 1114 is set for that link can seize that link and will do so by marking the ready bit zero. The action of the access controller of the controlling MINT on the window bit is simpler: that controller simply copies the value of the ready bit into the window bit.

In addition to the ready and window bits, a frame bit is circulated in ring 1106 to define the beginning of a frame of resource availability data, hence, to define the count for identifying the link associated with each clear and window bit. Data on the three rings 1102, 1104 and 1106 circulates serially and in synchronism through the logic and count circuit 1100 of each MINT.

The result of this type of operation is that those access controllers which are trying to seize an output link and which are located between the unit that first successfully seized that output link and the access controller that controls the window bit have priority and will be served in turn before any other controllers that subsequently may make a request to seize the specific output link. As a result, an approximately fair distribution of access by all MINTs to all output links is achieved.

If this alternative approach to controlling MINT 11 access control to the MANSC 22 is used, priority is controlled from the MINT. Each MINT maintains a priority and a regular queue for queuing requests, and makes requests for MANSC services first from the MINT priority queue.

13 CONCLUSION

It is to be understood that the above description is only of one preferred embodiment of the invention. Numerous other arrangements may be devised by one skilled in the art without departing from the spirit and scope of the invention. The invention is thus limited only as defined in the accompanying claims.

APPENDIX A
ACRONYMS AND ABBREVIATIONS

| | |
|---|---|
| 1SC | First Stage Controller |
| 2SC | Second Stage Controller |
| ACK | Acknowledge |
| ARP | Address Resolution Protocol |
| ARQ | Automatic Repeat Request |
| BNAK | Busy Negative Acknowledge |
| CC | Central Control |
| CNAK | Control Negative Acknowledge |
| CNet | Control Network |
| CRC | Cyclic Redundancy Check or Code |
| DNet | Data Network |
| DRAM | Dynamic Random Access Memory |
| DVMA | Direct Virtual Memory Access |
| EUS | End User System |
| EUSL | End User Link (Connects NIM and UIM) |
| FEP | Front End Processor |
| FIFO | First In First Out |
| FNAK | Fabric Blocking Negative Acknowledge |
| IL | Internal Link (Connects MINT and MANS) |
| ILH | Internal Link Handler |
| IP | Internet Protocol |
| LAN | Local Area Network |
| LUWU | Long User Work Unit |
| MAN | Exemplary Metropolitan Area Network |
| MANS | MAN Switch |
| MANSC | MAN/Switch Controller |
| MINT | Memory and Interface Module |
| MMU | Memory Management Unit |
| NAK | Negative Acknowledge |
| NIM | Network Interface Module |
| OA&M | Operation, Administration and Maintenance |
| PASC | Phase Alignment and Scramble Circuit |
| SCC | Switch Control Complex |
| SUWU | Short User Work Unit |
| TCP | Transmission Control Protocol |
| TSA | Time Slot Assigner |
| UDP | User Datagram Protocol |
| UIM | User Interface Module |
| UWU | User Work Unit |
| VLSI | Very Large Scale Integration |
| VME ® bus | An IEEE Standard Bus |
| WAN | Wide Area Network |
| XL | External Link (Connects NIM to MINT) |

-continued

APPENDIX A
ACRONYMS AND ABBREVIATIONS

| XLH | External Link Handler |
|---|---|
| XPC | Crosspoint Controller |

What is claimed is:

1. Apparatus for deriving a non-continuous sequence of digital signal streams, each stream synchronized to a common clock, from a sequence of non-continuous unsynchronized digital signal streams, each unsynchronized stream having an arbitary phase with respect to said clock, without losing information of any pulse of any of said unsynchronized signal streams, comprising:
   means for detecting time displacement between a time of transition of said clock and an initial time of transition of any of said non-continuous unsynchronized digital signal streams; and
   means, responsive to said means for detecting, for delaying said any unsynchronized digital signal stream to generate one of said synchronized digital signal streams without losing information of any pulse of said any unsynchronized signal stream.

2. Apparatus for deriving a digital signal synchronized to a clock from a non-continuous unsynchronized digital signal without losing information of any pulse of said unsynchronized signal, comprising:
   means for detecting time displacement between a time of transition of said clock and an initial time of transition of said non-continuous unsynchronized digital signal; and
   means, responsive to said means for detecting, for delaying said unsynchronized digital signal to generate said synchronized digital signal without losing information of any pulse of said unsynchronized signal;
   wherein said means for detecting comprises:
   means for generating a series of time displaced signals from said unsynchronized digital signal; and
   means for detecting at least one of the identities of the last of said series coinciding with a first state of said unsynchronized signal and the first of said series coinciding with a second state of said unsynchronized signal.

3. The apparatus of claim 2 wherein said means for delaying comprises means for selecting one of said time displaced signals displaced by a predetermined amount from said one of said identified series of time displaced signals for generating said synchronized signal.

4. Apparatus for deriving a phase aligned bit stream from an unaligned bit stream, comprising:
   a reference clock signal to which said unaligned bit stream is to be aligned;
   an inverse reference clock signal 180 degrees out of phase with said reference clock;
   a delay line with a plurality of taps connected to said unaligned bit stream;
   a first group and a second group of latches connected to the tap outputs of said delay line;
   a selection logic circuit, comprising a group of internal latches whose inputs are gated from outputs of said first group of latches, a priority circuit for detecting a rank of a highest ranking member of said group of internal latches having a logical 1 at its output, and a translator for converting said rank to a binary signal;
   a clear signal for resetting said internal latches after the completion of said unaligned bit stream, and for gating said first group of latches to said group of internal latches until the first logical 1 appears on said unaligned bit stream; and
   a selector connected to said second group of latches and to said binary signal from said selection logic for connecting an output of a member of said second group of latches to an output signal representing said phase aligned bit stream;
   wherein signals from said tapped delay line are gated to members of said first group of latches by said inverse clock signal; and
   wherein signals from said tapped delay line are gated to said second group of latches by said reference clock signal.

5. A method of synchronizing a non-continuous sequence of unsynchronized digital signal streams to a common clock, each unsynchronized stream having an arbitrary phase with respect to said clock, without losing information of any pulse of any of said unsynchronized non-continuous digital signal streams comprising the steps of:
   detecting a time displacement between a time of transition of said clock and a time of initial transition of any said unsynchronized digital signal streams, each unsynchronized stream having an arbitrary phase with respect to said clock; and
   responsive to said time displacement detected in said detecting step, delaying said any unsynchronized digital signal stream by an amount determined by said time displacement without losing information of any pulse of said unsynchronized digital signal stream.

6. The apparatus of claim 2 wherein said means for detecting comprises:
   a tapped delay line having a plurality of taps;
   a group of latches connected to the taps of the delay line; and
   means for gating an initial signal comprising a transition occurring at said initial time of transition from the taps of the delay line to the group of latches.

7. The apparatus of claim 3 wherein said means for delaying comprises:
   a tapped delay line having a plurality of taps;
   a group of latches whose input is gated by the clock and supplied by the taps of the delay line; and
   means, responsive to the means for detecting at least one of the identities, for selecting one of the members of the group of latches as the synchronized digital signal.

8. A method of synchronizing a non-continuous digital signal stream to a clock without losing information of any pulse of said non-continuous digital signal stream comprising the steps of:
   detecting a time displacement between a time of transition of said clock and a time of initial transition of said non-continuous digital signal stream; and
   responsive to said time displacement detected in said detecting step, delaying said digital signal stream by an amount determined by said time displacement without losing information of any pulse of said non-continuous digital signal stream;
   wherein the step of delaying said digital signal stream comprises the steps of:
   passing said non-continuous digital signal stream through a tapped delay line having a plurality of taps; and selecting one of the taps as the source of a synchronized digital signal stream.

9. The method of claim 5 wherein the detecting step comprises the step of:
  passing said non-continuous digital signal stream through a tapped delay line having a plurality of taps;
  gating, using the clock as a gating signal, an initial signal of said non-continuous digital bit stream from the output of the taps to a group of latches; and
  detecting at least one of the identities of the last of said group coinciding with a first state of said unsynchronized signal and the first of said group coinciding with a second state of said unsynchronized signal.

* * * * *